US012624741B1

(12) United States Patent
Elias et al.

(10) Patent No.: US 12,624,741 B1
(45) Date of Patent: May 12, 2026

(54) VIBRATION ABSORBER

(71) Applicant: STEADIWEAR INC., Toronto (CA)

(72) Inventors: Mark Elias, Toronto (CA); Stephen Kimanzi, Orleans (CA); Leonardo Miguel Araneta, Etobicoke (CA); Emile Maamary, Toronto (CA)

(73) Assignee: STEADIWEAR INC., Toronto (CA)

( * ) Notice: Subject to any disclaimer, the term of this patent is extended or adjusted under 35 U.S.C. 154(b) by 0 days.

(21) Appl. No.: 19/201,735

(22) Filed: May 7, 2025

(51) Int. Cl.
F16F 15/03 (2006.01)
F16F 6/00 (2006.01)

(52) U.S. Cl.
CPC .......... F16F 15/03 (2013.01); *F16F 2222/06* (2013.01); *F16F 2230/08* (2013.01); *F16F 2230/18* (2013.01); *F16F 2232/08* (2013.01)

(58) Field of Classification Search
CPC .... F16F 15/03; F16F 2222/06; F16F 2230/08; F16F 2230/18; F16F 2232/08; F16F 6/005; F16F 6/00
See application file for complete search history.

(56) References Cited

U.S. PATENT DOCUMENTS

| | | | |
|---|---|---|---|
| 3,573,517 A * | 4/1971 | Osterstrom .......... | H02K 49/108 310/103 |
| 5,283,682 A * | 2/1994 | Ostaszewski ........ | G02B 7/1821 310/22 |
| 5,427,362 A * | 6/1995 | Schilling ................ | H02K 33/18 188/267 |
| 5,924,312 A | 7/1999 | Vande Haar | |

(Continued)

FOREIGN PATENT DOCUMENTS

| | | |
|---|---|---|
| IN | 418579 A1 | 1/2023 |

OTHER PUBLICATIONS

Cichaczewski et al., Electrophysiologic characteristics of tremor in Parkinson's disease and essential tremor. Arq Neuropsiquiatr. Apr. 2014;72(4):301-6. doi: 10.1590/0004-282x20140006. PMID: 24760095 (6 pages).

(Continued)

*Primary Examiner* — Robert A. Siconolfi
*Assistant Examiner* — James K Hsiao
(74) *Attorney, Agent, or Firm* — SMART & BIGGAR LP; Nicholas Aitken; Justin Philpott

(57) ABSTRACT

A dynamically tuned vibration absorber includes a magnetic dynamic mass, a repulsive magnetic system, and an attractive magnetic system. The repulsive magnetic system includes one or more repulsive magnets positioned to resist translation of the dynamic mass away from an equilibrium position by magnetic repulsion. The attractive magnetic system includes one or more attractive magnets positioned to aid the translation of the dynamic mass away from the equilibrium position by magnetic attraction. The magnetic repulsion and the magnetic attraction collectively exert a net repulsive force on the dynamic mass that resists the translation of the dynamic mass away from the equilibrium position. One of the repulsive and attractive magnetic systems is a dynamically variable. The dynamically variable system includes at least one field manipulation actuator configured to move the one or more magnets of the dynamically variable system to adjust the net repulsive force exerted on the dynamic mass.

20 Claims, 36 Drawing Sheets

(56)  References Cited

U.S. PATENT DOCUMENTS

| | | | | |
|---|---|---|---|---|
| 6,054,788 | A * | 4/2000 | Dombrovski | H02K 49/108 |
| | | | | 310/75 D |
| 6,232,689 | B1 * | 5/2001 | Fujita | F16F 6/005 |
| | | | | 310/80 |
| 7,009,752 | B1 * | 3/2006 | Lorell | G02B 7/1821 |
| | | | | 359/290 |
| 7,102,474 | B2 * | 9/2006 | Lerner | F16F 1/361 |
| | | | | 335/229 |
| 8,662,266 | B2 * | 3/2014 | Kim | F16F 7/1011 |
| | | | | 188/380 |
| 8,714,324 | B2 | 5/2014 | Shimoda et al. | |
| 10,724,598 | B2 * | 7/2020 | Kishimoto | G05B 19/404 |
| 10,731,725 | B2 * | 8/2020 | Inoue | F16F 15/08 |
| 10,844,923 | B2 * | 11/2020 | Inoue | F16F 1/361 |
| 11,021,049 | B2 * | 6/2021 | Inoue | B29C 45/14491 |
| 11,466,745 | B2 | 10/2022 | Elias et al. | |
| 11,586,231 | B2 * | 2/2023 | Takahara | H02K 11/33 |
| 2007/0051576 | A1 * | 3/2007 | Shimoda | F16F 15/073 |
| | | | | 188/380 |
| 2008/0306332 | A1 * | 12/2008 | Choi | H02K 33/16 |
| | | | | 600/38 |
| 2011/0057367 | A1 * | 3/2011 | Hasegawa | H02K 33/16 |
| | | | | 267/140.14 |
| 2011/0180980 | A1 * | 7/2011 | Urayama | F16F 7/1011 |
| | | | | 267/140.14 |
| 2013/0328254 | A1 * | 12/2013 | Kojima | F16F 15/022 |
| | | | | 267/140.15 |
| 2014/0268383 | A1 * | 9/2014 | Bullard | G02B 7/182 |
| | | | | 108/1 |
| 2015/0014477 | A1 * | 1/2015 | Yoshizaki | B64C 27/001 |
| | | | | 244/17.11 |
| 2015/0200582 | A1 * | 7/2015 | Headstrom | H02K 33/06 |
| | | | | 310/25 |
| 2017/0219039 | A1 * | 8/2017 | Inoue | F16F 15/002 |
| 2018/0269767 | A1 * | 9/2018 | Diehl | H02K 49/00 |
| 2019/0059733 | A1 | 2/2019 | Nguyen | |
| 2019/0089059 | A1 * | 3/2019 | Pelrine | H01Q 7/06 |
| 2020/0122561 | A1 * | 4/2020 | Ueki | B60K 5/1208 |
| 2020/0220446 | A1 * | 7/2020 | Clymer | F16F 6/005 |
| 2020/0386289 | A1 * | 12/2020 | Clymer | H02K 49/108 |
| 2020/0386290 | A1 * | 12/2020 | Koyama | H02K 33/16 |
| 2021/0141404 | A1 * | 5/2021 | Takahara | H02N 2/142 |
| 2022/0054349 | A1 | 2/2022 | Narula | |

OTHER PUBLICATIONS

Wang et al., Experimental study on adaptive-passive tuned mass damper with variable stiffness for vertical human-induced vibration control. Engineering Structures 280 (2023) 115714 (14 pages).

Gsell et al., Adaptive Tuned Mass Damper based on Pre-stressable Leaf-springs. Journal of Intelligent Material Systems and Structures, vol. 18, Aug. 2007. pp. 845-851.

* cited by examiner

9286

| Processor |
| --- |
| 9290 |

| Memory |
| --- |
| 9292 |

| Input Device | | Frequency Sensor |
| --- | --- | --- |
| 9294 | | 9288 |

| Driver | | Actuator(s) |
| --- | --- | --- |
| 9296 | | 9284 |

15220

15100

15100

15222

15100

15224

15100     15226

15228

15100

15230

15100

VIBRATION ABSORBER

FIELD

The teachings disclosed herein relate to devices that absorb vibrations and mitigate the negative effects thereof.

BACKGROUND

U.S. Pat. No. 8,714,324 (Shimoda et al.) purports to disclose a dynamic vibration absorber. The vibration absorber includes a weight, a frame body which surrounds the weight, a total of four pairs of vertically mounted U-shaped leaf springs which are interposed between the frame body and the weight so as to hold the weight with respect to the frame body movably with respect to all directions in a horizontal plane and immovably in a vertical direction, and a damping mechanism for damping the vibration of the weight in the horizontal plane.

U.S. Pub. No. 2022/0054349 (Narula) purports to disclose devices, systems, and methods to treat tremor in an outer extremity, typically a hand, of a subject. A wearable base or glove is provided with one or more tremor damping mechanisms, which can be of different or the same types, in the case of a plurality of tremor damping mechanisms. One or more frictional damping mechanisms can be provided and/or one or more tuned mass damping mechanisms can be provided. The frictional dampening mechanism can simply be the viscoelastic material of the wearable base that deforms and interferes with tremor movement. The frictional dampening mechanism can be one or more tension elements provided within the body of the wearable base. The tuned damping mechanism may comprise one or more resonators held within a housing coupled to the wearable base. The tremor damping mechanisms can be self-adjusting and/or adjustable by the wearer.

U.S. Pub. No. 2019/0059733 (Nguyen) purports to disclose a wearable tremor reduction device that reduces tremor by internally generating forces which cancel or reduce the magnitude force of the tremor experienced by the person wearing the device. The device may be worn on a wrist, arm, ankle or leg. The device has a plurality of housing members which are connected together. Each housing member contains a mass which is translatable along an axis between a proximal limit and a distal limit, and a neutral position approximately midway between the proximal limit and the distal limit. Following imposition of a force having a component along the axis, a biasing means returns the mass to the neutral position.

U.S. Pat. No. 11,466,745 (Elias et al.) purports to disclose an apparatus for suppressing oscillations of an oscillating body. The apparatus includes a magnetic base and a magnetic stabilizing mass pivotably coupled to the magnetic base by a pivot assembly. The pivot assembly defines a pivot axis about which the magnetic stabilizing mass is pivotable, relative to the magnetic base, between a first position and a second position. The magnetic stabilizing mass has an equilibrium position between the first position and the second position. The magnetic base produces magnetic fields that magnetically repel the magnetic stabilizing mass away from the first position at least when the magnetic stabilizing mass is offset from the equilibrium position toward the first position, and that magnetically repel the magnetic stabilizing mass away from the second position at least when the magnetic stabilizing mass is offset from the equilibrium position toward the second position.

SUMMARY

The following summary is intended to introduce the reader to various aspects of the applicant's teaching, but not to define any invention.

In one broad aspect, a vibration absorber includes a base and a magnetic dynamic mass translatable relative to the base. The magnetic dynamic mass has an equilibrium position relative to the base. The vibration absorber further includes a first elastic element positioned to resist translation of the magnetic dynamic mass away from the equilibrium position in a first direction. The first elastic element has a first elastic element proximal end secured to the magnetic dynamic mass, and a second elastic element distal end opposite the first elastic element proximal end. The vibration absorber further includes a first static magnetic portion oriented in attraction to the magnetic dynamic mass. The translation of the magnetic dynamic mass away from the equilibrium position in the first direction is aided by magnetic attraction between the first static magnetic portion and the magnetic dynamic mass.

In some examples, the vibration absorber further includes a second elastic element positioned to resist translation of the magnetic dynamic mass away from the equilibrium position in a second direction. The second elastic element has a second elastic element proximal end secured to the magnetic dynamic mass, and a second elastic element distal end opposite the second elastic element proximal end.

In some examples, the vibration absorber further includes a second static magnetic portion oriented in attraction to the magnetic dynamic mass. The translation of the magnetic dynamic mass away from the equilibrium position in the second direction is aided by magnetic attraction between the second static magnetic portion and the magnetic dynamic mass.

In another broad aspect, a vibration absorber includes a base and a magnetic dynamic mass translatable relative to the base. The magnetic dynamic mass has an equilibrium position relative to the base. The vibration absorber further includes a first elastic element having a first elastic element proximal end secured to the magnetic dynamic mass, and a first elastic element distal end opposite the first extension element proximal end. The vibration absorber further includes a second elastic element having a second elastic element proximal end secured to the magnetic dynamic mass, and a second elastic element distal end opposite the second elastic element proximal end. The vibration absorber further includes a first static magnetic portion positioned away from the first elastic element proximal end. The vibration absorber further includes a second static magnetic portion positioned away from the second elastic element proximal end. Translation of the magnetic dynamic mass in a first direction away from the equilibrium position is resisted by one of the first and second elastic elements and aided by magnetic attraction between the first static magnetic portion and the magnetic dynamic mass. Translation of the magnetic dynamic mass in a second direction, opposite the first direction, away from the equilibrium position is resisted by the other of the first and second elastic elements and aided by magnetic attraction between the second static magnetic portion and the magnetic dynamic mass.

In some examples, the first elastic element is configured to exert only one of tensile force or compressive force on the magnetic dynamic mass, and the second elastic element is configured to exert only one of tensile force or compressive force on the magnetic dynamic mass.

In another broad aspect, a vibration absorber includes a magnetic static ring. The vibration absorber further includes a magnetic dynamic mass positioned within the magnetic static ring and translatable radially away from an equilibrium position relative to the magnetic static ring. The vibration absorber further includes a plurality of elastic elements positioned to resist radial translation of the magnetic dynamic mass away from the equilibrium position. The radial translation of the magnetic dynamic mass away from the equilibrium position is aided by magnetic attraction between the magnetic static ring and the magnetic dynamic mass.

In some examples, each of the elastic elements is configured to exert only one of tensile force or compressive force on the magnetic dynamic mass.

In some examples, each of the elastic elements includes an extension spring having a proximal end secured to the magnetic dynamic mass to act only in tension, and a distal end opposite the spring proximal end.

In another broad aspect, a dynamically tuned vibration absorber includes a magnetic dynamic mass having an equilibrium position. The magnetic dynamic mass is translatable away from the equilibrium position. The vibration absorber further includes a repulsive magnetic system and an attractive magnetic system. The repulsive magnetic system includes one or more repulsive magnetic elements positioned to resist translation of the magnetic dynamic mass away from the equilibrium position by magnetic repulsion between the one or more repulsive magnetic elements and the magnetic dynamic mass. The attractive magnetic system includes one or more attractive magnetic elements positioned to aid the translation of the magnetic dynamic mass away from the equilibrium position by magnetic attraction between the one or more attractive magnetic elements and the magnetic dynamic mass. The magnetic repulsion and the magnetic attraction collectively exert a net magnetic repulsive force on the magnetic dynamic mass that resists the translation of the magnetic dynamic mass away from the equilibrium position. One of the repulsive magnetic system and the attractive magnetic system is a first dynamically variable magnetic system. The first dynamically variable magnetic system includes at least one field manipulation actuator coupled to the one or more magnetic elements of the first dynamically variable magnetic system and configured to move the one or more magnetic elements of the first dynamically variable magnetic system to adjust the net magnetic repulsive force exerted on the magnetic dynamic mass.

In some examples, the net magnetic repulsive force increases generally linearly with displacement of the magnetic dynamic mass from the equilibrium position.

In another broad aspect, a dynamically tuned vibration absorber includes a magnetic dynamic mass having an equilibrium position. The magnetic dynamic mass is translatable away from the equilibrium position. The vibration absorber further includes a repulsive magnetic system and an attractive magnetic system. The repulsive magnetic system includes one or more repulsive magnetic elements positioned to resist translation of the magnetic dynamic mass away from the equilibrium position by magnetic repulsion between the one or more repulsive magnetic elements and the magnetic dynamic mass. The attractive magnetic system includes one or more attractive magnetic elements positioned to aid the translation of the magnetic dynamic mass away from the equilibrium position by magnetic attraction between the one or more attractive magnetic elements and the magnetic dynamic mass. The magnetic repulsion and the magnetic attraction collectively exert a net magnetic repulsive force on the magnetic dynamic mass that resists the translation of the magnetic dynamic mass away from the equilibrium position. One of the repulsive magnetic system and the attractive magnetic system is a dynamically variable magnetic system. Each of the one or more magnetic elements of the dynamically variable magnetic system is an electromagnet, and the net magnetic repulsive force exerted on the magnetic dynamic mass is adjustable based on an electrical current supplied to the one or more electromagnets of the dynamically variable magnetic system.

In some examples, the vibration absorber further includes a current source electrically coupled to the one or more electromagnets of the dynamically variable magnetic system. The current source is configured to supply the one or more electromagnets of the dynamically variable magnetic system with the electrical current.

In other broad aspect, a dynamically tuned vibration absorber includes a magnetic dynamic mass having an equilibrium position. The magnetic dynamic mass is translatable away from the equilibrium position and includes one or more electromagnets. The vibration absorber further includes a repulsive magnetic system and an attractive magnetic system. The repulsive magnetic system includes one or more repulsive magnets positioned to resist translation of the magnetic dynamic mass away from the equilibrium position by magnetic repulsion between the one or more repulsive magnets and the one or more electromagnets of the magnetic dynamic mass. The attractive magnetic system includes one or more attractive magnetic elements positioned to aid the translation of the magnetic dynamic mass away from the equilibrium position by magnetic attraction between the one or more attractive magnetic elements and the magnetic dynamic mass. The magnetic repulsion and the magnetic attraction collectively exert a net magnetic repulsive force on the magnetic dynamic mass that resists the translation of the magnetic dynamic mass away from the equilibrium position. The net magnetic repulsive force exerted on the magnetic dynamic mass is adjustable based on an electrical current supplied to the one or more electromagnets of the magnetic dynamic mass.

In other broad aspect, a dynamically tuned vibration absorber includes a magnetic dynamic mass having an equilibrium position. The magnetic dynamic mass is translatable away from the equilibrium position and includes one or more electromagnets. The vibration absorber further includes a repulsive magnetic system and an attractive magnetic system. The repulsive magnetic system includes one or more repulsive magnets positioned to resist translation of the magnetic dynamic mass away from the equilibrium position by magnetic repulsion between the one or more repulsive magnets and the magnetic dynamic mass. The attractive magnetic system includes one or more attractive magnetic elements positioned to aid the translation of the magnetic dynamic mass away from the equilibrium position by magnetic attraction between the one or more attractive magnetic elements and the one or more electromagnets of the magnetic dynamic mass. The magnetic repulsion and the magnetic attraction collectively exert a net magnetic repulsive force on the magnetic dynamic mass that resists the translation of the magnetic dynamic mass away from the equilibrium position. The net magnetic repulsive force exerted on the magnetic dynamic mass is adjustable based on an electrical current supplied to the one or more electromagnets of the magnetic dynamic mass.

DRAWINGS

For a better understanding of the described examples and to show more clearly how they may be carried into effect, reference will now be made, by way of example, to the accompanying drawings in which.

Figure 1:
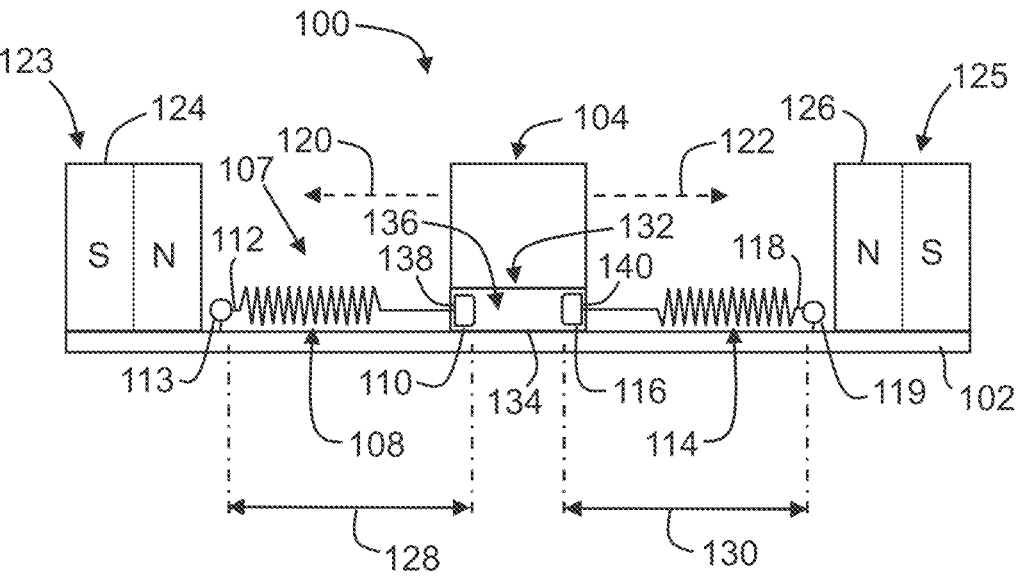
FIG. 1 is a front view of an example vibration absorber according to aspects of the teaching disclosed herein.

The drawings included herewith are for illustrating various examples of apparatuses and methods of the teaching of the present specification and are not intended to limit the scope of what is taught in any way.

DESCRIPTION OF VARIOUS EXAMPLES

Various apparatuses or processes will be described below to provide an example of each claimed invention. No example described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an example of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

The terms "including", "comprising" and variations thereof mean "including but not limited to", unless expressly specified otherwise. A listing of items does not imply that any or all of the items are mutually exclusive, unless expressly specified otherwise. The terms "a", "an" and "the" mean "one or more", unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Unwanted vibrations can present challenges in a wide variety of applications. For example, vibrations of a 3D printer print head during printing can reduce the accuracy of the printed object. Similarly, the vibrations of a robotic arm in a manufacturing process can create manufacturing defects. Other objects that encounter unwanted vibrations include, for example, home appliances (washing machines, dryers, etc.), and high-rise structures (i.e. tall buildings).

Furthermore, a portion of the world's population suffers from involuntary hand or forearm oscillations such as hand or elbow tremors. Depending on severity, involuntary hand motions may impede daily activities and reduce quality of life of those affected. Involuntary hand and forearms motions may involve rhythmic muscle movement resulting in hand or forearm oscillation. Involuntary hand and forearm motions may be symptoms of those with Parkinson's disease and Essential Tremor.

Various vibration absorbers are disclosed herein. The vibration absorbers are securable to objects that experience unwanted vibrations (e.g. such as those noted above) to lessen the negative effects of such vibrations. In some examples, the vibration absorbers have characteristics of a "dampener" in that they dampen vibration amplitude.

Vibration absorbers can be classified as either tuned or broadband. Tuned vibration absorbers generally consist of a stabilizing mass connected to a set of springs which resist movement of the mass in response to a vibration. Tuned vibration absorbers can be "tuned" to a specific frequency, for example, by selecting a mass and spring stiffness that collectively provide a system frequency that matches the frequency targeted for absorption. Spring design and positioning for tuned vibration absorbers may require significant trial and error to achieve the targeted spring stiffness for the intended application.

Tuned vibration absorbers perform well at a single frequency (i.e., the natural frequency resulting from the combination of the springs and mass). For example, a tuned vibration absorber may be designed to absorb vibrations at frequencies of 5 Hz. Such absorbers may effectively absorb vibrations at 5 Hz; however, performance drops off considerably with only slight variations from the tuned frequency. To target a different frequency, the mass and spring combinations of the tuned vibration absorber may require reconfiguration.

In many cases, objects do not vibrate at one constant frequency. Objects may vibrate at different frequencies at different times. As one example, a washing machine may vibrate at a higher frequency during a spin cycle than during a rinse cycle. As another example, a tremor in the arm of one with Parkinson's disease may worsen (increase in frequency) at times of stress or fatigue. In other cases, an object may continuously vibrate at different frequencies. For example, a loudspeaker may continuously vibrate at different frequencies over the course of a single song.

As their name suggests, broadband vibration absorbers seek to absorb vibrations across a broader range of frequencies than tuned vibration absorbers. Broadband vibration absorbers can be used for applications where the limited performance bandwidth of tuned vibration absorbers is poorly matched.

Some of the examples disclosed herein are directed vibration absorbers shown to effectively mitigate vibrations over a broadband of frequencies. As will be described in more detail subsequently herein, these vibration absorbers include a non-linear spring system that resists translation of a magnetic dynamic mass away from an equilibrium position. The non-linearity of the spring system increases the performance bandwidth of the vibration absorber by altering the effective spring stiffness as the dynamic mass translates away from the equilibrium position.

The non-linear spring systems include at least one 'linear' elastic element, and a pair of 'non-linear' magnetic elements orientated in attraction. The linear elastic element(s) and magnetic elements exert opposing forces on the magnetic dynamic mass as it moves away from an equilibrium position. Translation of the magnetic dynamic mass away from the equilibrium is resisted by strain in the elastic element (e.g., tension or compression in a string, elastic band, etc.). At the same time, the translation away from the equilibrium position is aided by magnetic attraction between the magnetic dynamic mass and a static magnetic element. Since it is directed in the opposite direction, the magnetic attraction "softens" the tensile or compressive force exerted by the one or more elastic elements on the dynamic mass.

The tensile or compressive force exerted by a spring follows a linear relationship with respect to displacement (i.e., extension). This means that the force exerted by the spring is directly proportional to its displacement. In contrast, as the distance between two magnetic elements changes, the force of attraction does not vary proportionally. The magnetic force produced by the magnetic attraction between the magnetic dynamic mass and the static magnetic element therefore follows a non-linear relationship with displacement. For example, the force of attraction between the magnetic dynamic mass and the static magnet element may follow an inverse square relationship, where the magnetic force decreases by one-quarter as the distance between the magnetic dynamic mass and the static magnet element doubles. With the spring and magnetic forces combined, the resulting system behaves in a non-linear fashion with respect to displacement. This has been shown to expand the performance bandwidth of the vibration absorber relative to those with a linear spring system.

Figure 2A:
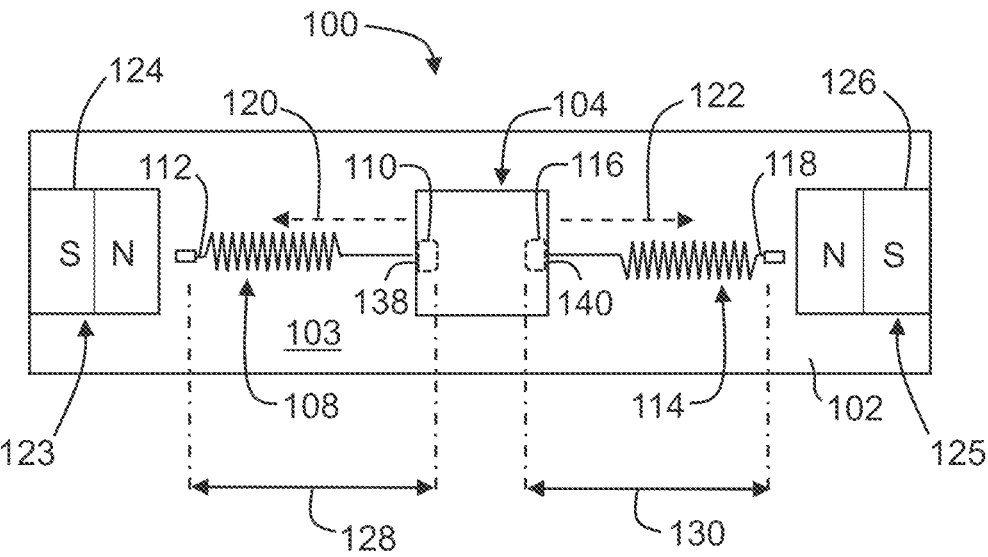
FIGS. 2A-2C are top views of the vibration absorber of FIG. 1, showing the magnetic dynamic mass of the vibration absorber in different positions.
Figure 2B:
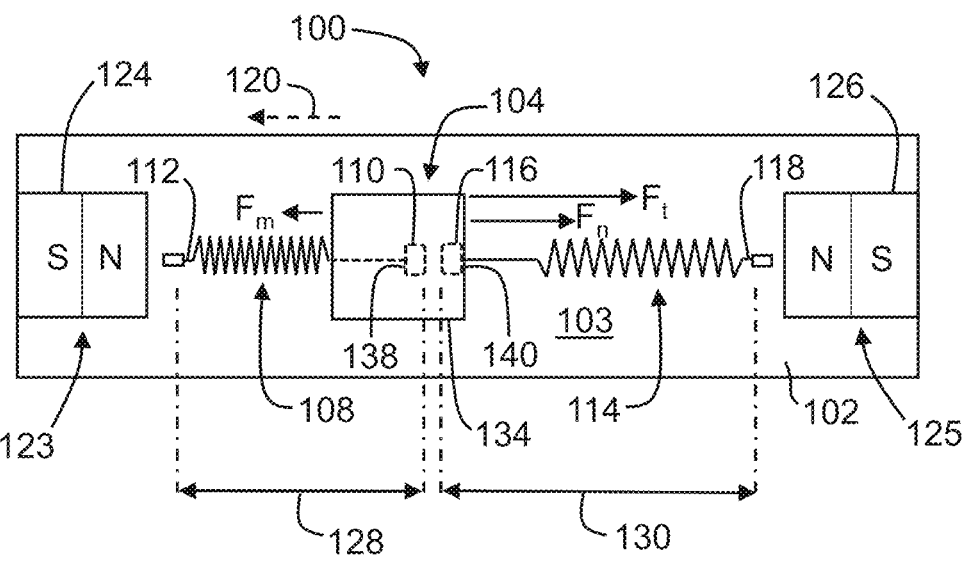
Figure 2C:
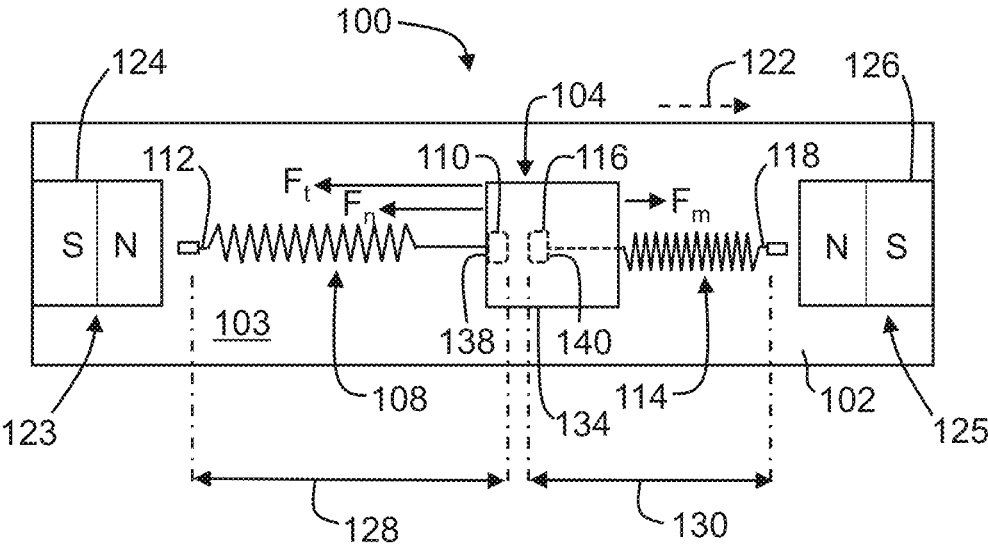

Referring to FIGS. 1 to 2C, an example broadband vibration absorber 100 in accordance with aspects of the teaching disclosed herein includes a base 102, and a magnetic dynamic mass 104 translatable relative to the base 102. The vibration absorber 100 is securable to any object that experiences unwanted vibrations (e.g., limbs of those with Parkinson's disease, washing machines, robotic arms, etc.). The vibration absorber 100 can be secured to the object in any manner that provides a rigid, non-slip, connection therebetween (e.g., with screws, clamps, adhesive, straps, or a combination thereof). In other examples, the vibration absorber 100 is integrally formed with the object. In use, the magnetic dynamic mass 104 translates relative to the base 102 in a direction opposite to that of the vibration. Resistance to this translation of the magnetic dynamic mass 104 acts to absorb the vibration and thereby lessen its amplitude.

The vibration absorber 100 includes a plurality of elastic elements 107 which resist translation of the magnetic dynamic mass away from an equilibrium position, secured to the magnetic dynamic mass 104. In the illustrated example, the vibration absorber 100 includes two elastic elements 107. In some examples, each elastic element includes one or more elastic bands, gas springs, compression springs, torsional springs or other suitable biasing mechanisms that can be arranged to resist translation of the magnetic dynamic mass.

In the illustrated example, the first elastic element includes a first extension spring 108 and the second elastic element includes a second extension spring 114. The first and second extension springs 108, 114 are coil extension springs (also known as tension springs). Each coil extension spring includes a length of helically wound coils that stretch when force is applied to absorb and store energy from the force. When the force is removed, the coil extension spring returns to its original shape and redistributes the stored energy.

The first extension spring 108 has a first spring proximal end 110 secured to the magnetic dynamic mass 104 to act only in tension, a first spring distal end 112 opposite the first spring proximal end 110, and a first spring length 128 between the first spring proximal and distal ends 110, 112. Similarly, the second extension spring 114 has a second spring proximal end 116 secured to the magnetic dynamic mass 104 to act only in tension, a second spring distal end 118 opposite the second spring proximal end 116, and a second spring length 130 between the second spring proximal and distal ends 116, 118.

In the example illustrated, the first extension spring 108 extends from the first spring proximal end 110 in a first direction 120 to the first spring distal end 112, and the second extension spring 114 extends from the second spring proximal end 116 in a second direction 122 to the second spring distal end 118. The second direction 122 is opposite the first direction 120. In other examples, the first extension spring 108 extends from the first spring proximal end 110 to the first spring distal end 112 at an angle relative to the first direction 120. Alternatively, or in addition, the second extension spring 114 may extend from the second spring proximal end 116 to the second spring distal end 118 at an angle relative to the second direction 122.

In the example illustrated, the vibration absorber 100 includes first and second static magnetic portions 124, 126 positioned away from the first and second spring proximal ends 110, 116, respectively. In the example illustrated, the first static magnetic portion 124 is positioned away from the first spring proximal end 110 in the first direction 120 and the second static magnetic portion 126 is positioned away from the second spring proximal end 116 in the second direction 122.

The term "magnetic", as used in connection with the magnetic dynamic mass 104 and the first and second magnetic static portions 124, 126, means that these elements comprise at least one magnet (permanent or otherwise) and/or are made at least in part from a material that is attracted to magnetic fields (e.g., iron, nickel, cobalt, etc.).

In the illustrated example, the vibration absorber 100 includes a first static magnet 123 having the first static magnetic portion 124 and a second static magnet 125 having the second static magnetic portion 126. The first and second static magnets 123, 125 are affixed to the base 102. In other examples, the first and second static magnets 123, 125 are secured to the base 102 indirectly (i.e., through another component of the vibration absorber 100 which is itself directly affixed to the base 102). In other examples, the first and second static magnets 123, 125 are not secured to the base 102.

Each static magnet 123, 125 is oriented to produce a magnetic field that attracts the magnetic dynamic mass 104. In the illustrated example, the north pole (N) of each of the first and second static magnets 123, 125 is oriented toward the magnetic dynamic mass 104. The magnetic dynamic mass 104 is, in the illustrated example, made from a material that is attracted to the magnetic fields produced by the first and second static magnets 123, 125.

In the example illustrated, each of the first and second spring distal ends 112, 118 are secured to the base 102. Each of the first and second spring distal ends 112, 118 is optionally fitted with a loop 113, 119 (FIG. 1) to facilitate attachment to the base 102. In other examples, the first and second spring distal ends 112, 118 are not secured to the base 102. For example, the first and second spring distal ends 112, 118 can be secured directly to a respective one of the first and second static magnetic portions 124, 126. In other examples, the first and second spring distal ends 112, 118 are secured to the base 102 indirectly (i.e., through another component of the vibration absorber 100 which is itself directly fixed to the base 102).

FIGS. 2A-2C illustrate the magnetic dynamic mass 104 in different positions. Referring to FIG. 2A, the magnetic dynamic mass 104 is in an equilibrium position relative to the base 102. In the equilibrium position, the forces acting on the magnetic dynamic mass 104 are balanced (i.e., no net force in any direction). In some examples, the magnetic dynamic mass 104 comprises a dense metal (e.g. having a density greater than 6 g/cm³), such as a tungsten alloy (e.g. 80% or more tungsten, and the remainder is other metal(s) such as nickel, copper, or iron).

Comparing FIG. 2B to FIG. 2A, the magnetic dynamic mass 104 has translated in the first direction 120 away from the equilibrium position. Translation of the magnetic dynamic mass 104 in the first direction 120 away from the equilibrium position is resisted by tension in the second extension spring 114 and aided by magnetic attraction between the first static magnetic portion 124 and the magnetic dynamic mass 104. The translation of the magnetic dynamic mass 104 in the first direction 120 away from the equilibrium position increases the second spring length 130 and stores tension in the second extension spring 114. The tension in the second extension spring 114 resists the translation of the magnetic dynamic mass 104 in the first direction 120 and urges the magnetic dynamic mass 104 toward the equilibrium position.

Referring to FIG. 2B, the tension in the second extension spring 114 exerts a tensile force $F_t$ on the magnetic dynamic mass 104 (in a direction opposite the first direction 120). The tensile force $F_t$ urges the magnetic dynamic mass 104 toward the equilibrium position. Tensile force follows a linear relationship with respect to spring displacement. Therefore, the tensile force $F_t$ exerted by the second extension spring 114 is directly proportional to the displacement of the spring 114 from its natural, non-extended, position.

Translation of the magnetic dynamic mass 104 in the first direction 120 away from the equilibrium position increases the magnetic attraction between the magnetic dynamic mass 104 and the first static magnet 123 by decreasing a distance therebetween. The magnetic attraction between the first static magnet 123 and the magnetic dynamic mass 104 exerts a magnetic force $F_m$ on the magnetic dynamic mass 104 that opposes the tensile force $F_t$. Unlike tensile force, magnetic force follows a non-linear relationship with respect to the distance between a pair of magnetically attracted elements. The magnetic force $F_m$ increases non-linearly (e.g., accelerating, exponentially, etc.) as the distance between the magnetic dynamic mass 104 and the first static magnet 123 decreases.

Comparing FIG. 2C to FIG. 2A, the magnetic dynamic mass 104 has translated in the second direction 122 away from the equilibrium position. Translation of the magnetic dynamic mass 104 in the second direction 122 away from the equilibrium position is resisted by tension in the first extension spring 108 and aided by magnetic attraction between the second static magnetic portion 126 and the magnetic dynamic mass 104. The translation of the magnetic dynamic mass 104 in the second direction 122 away from the equilibrium position increases the first spring length 128 and stores tension in the first extension spring 108. The tension in the first extension spring 108 resists the translation of the magnetic dynamic mass 104 in the second direction 122 and urges the magnetic dynamic mass 104 toward the equilibrium position.

Referring to FIG. 2C, the tension in the first extension spring 108 exerts a tensile force $F_t$ on the magnetic dynamic mass 104 (in a direction opposite the second direction 122). The tensile force $F_t$ urges the magnetic dynamic mass 104 toward the equilibrium position. The tensile force $F_t$ exerted by the first extension spring 108 is directly proportional to the displacement of the spring 108 from its natural, non-extended, position.

Translation of the magnetic dynamic mass 104 in the second direction 122 away from the equilibrium position increases the magnetic attraction between the magnetic dynamic mass 104 and the second static magnet 125 by decreasing a distance therebetween. The magnetic attraction between the second static magnet 125 and the magnetic dynamic mass 104 exerts a magnetic force $F_m$ on the magnetic dynamic mass 104 which opposes the tensile force $F_t$. The magnetic force $F_m$ increases non-linearly (e.g., accelerating, exponentially, etc.) as the distance between the magnetic dynamic mass 104 and the second static magnet 125 decreases.

Referring to FIGS. 2B and 2C, the magnetic force $F_m$ opposes the tensile force $F_t$. No matter the displacement of the magnetic dynamic mass 104 away from the equilibrium position, the tensile force $F_t$ always exceeds the magnetic force $F_m$. When the tensile force $F_t$ and magnetic force $F_m$ are added together, the resulting net spring force $F_n$ urges the magnetic dynamic mass 104 toward the equilibrium position. In this way, the magnetic force $F_m$ acts to "soften" the tensile force $F_t$ exerted on the magnetic dynamic mass 104. This softening effect has shown to expand the performance bandwidth of the vibration absorber 100 (e.g., see FIG. 3).

Figure 3:
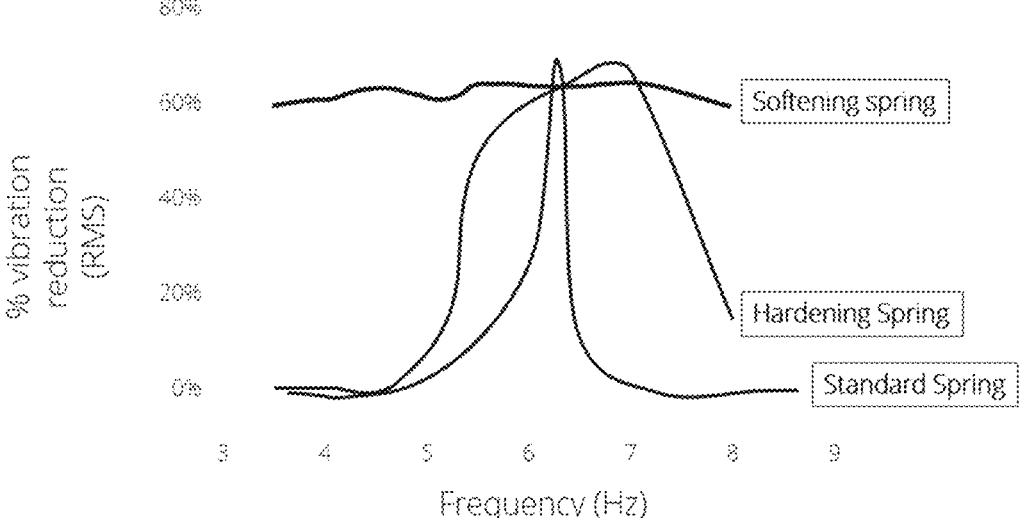
FIG. 3 is a graphical illustration plotting percentage vibration reduction against frequency for various spring configurations.

The graphical illustration of FIG. 3 plots percent vibration reduction (y-axis) against frequency (x-axis) for three different spring configurations. A "Standard Spring" configuration is traditionally used in tuned vibration absorbers. Tuned vibration absorbers are "tuned" to a specific frequency, for example, by selecting a mass and spring stiffness that collectively provide a system frequency that matches the frequency targeted for absorption. As expected, the "Standard Spring" curve demonstrates excellent vibration reduction (about 70%) at a frequency of 6 Hz (i.e., the tuned frequency). However, the percent vibration reduction for the "Standard Spring" configuration falls off considerably when the frequency is even slightly higher or lower than the tuned frequency.

Experiments were also conducted in which the magnetic dynamic mass was placed in repulsive orientation with the static magnetic portions. In this configuration, the magnetic repulsion force exerted on the dynamic mass increases with decreasing distance between the magnetic dynamic mass and either of the first or second static magnetic portions. The magnetic repulsive force is exerted on the dynamic mass in the same direction as the tensile force in the springs. This results in a "Hardening Spring" configuration. Compared to the "Standard Spring" curve, the "Hardening Spring" curve shows improved vibration reduction over a broader frequency range. The vibration reduction of the "Hardening Spring" configuration is over 50% between 5.5 and 7.5 Hz; however, outside this range, the performance falls off sharply.

Compared to both the "Standard Spring" and "Hardening Spring" configurations, the "Softening Spring" configuration used in vibration absorber 100 demonstrates enhanced performance over a broader range of frequences. For instance, the "Softening Spring" curve indicates that vibration reduction remains above 60% between 3.5 Hz and 8 Hz.

Referring again to FIG. 1, the magnetic dynamic mass 104 includes a spring mount 132 to facilitate connection of the first and second proximal spring ends 110, 116. Each of the first and second extension springs 108, 114 are secured to the magnetic dynamic mass 104 to act only in tension. This can be achieved in a number of suitable ways. In the example illustrated, the spring mount 132 includes a cage 134 for securing the first and second spring proximal ends 110, 116 to the magnetic dynamic mass 104 so that the first and second extension springs 108, 114 only act in tension. Each of the first and second spring proximal ends 110, 116 have a respective head 138, 140 that is trapped within the cage 134. The cage 134 has a plurality of slots in communication with an interior cage cavity 136. The slots are sized to prevent egress of the heads 138, 140 from the interior cage cavity 136, and thereby prevent disconnection of the first and second spring proximal ends 110, 116 from the spring mount 132.

Referring to FIG. 2B, the second spring proximal end 116 translates with the magnetic dynamic mass 104 as the magnetic dynamic mass 104 translates away from the equilibrium position in the first direction 120. This occurs because the head 140 of the second extension spring 114 engages the cage 134 throughout the translation. As a result, the second spring length 130 increases as the magnetic dynamic mass 104 translates away from the equilibrium position in the first direction 120 and tension builds in the second extension spring 114.

In contrast, the first spring proximal end 110 does not translate with the magnetic dynamic mass 104 as the magnetic dynamic mass 104 translates away from the equilibrium position in the first direction 120. This is because the head 138 of the first extension spring 108 does not engage the cage 134 during the translation. Instead, the head 138 of the first extension spring 108 "floats" within the cage 134 (e.g., see FIG. 2B). As a result, the first spring length 128 is unchanged by the translation of the magnetic dynamic mass 104 away from the equilibrium position in the first direction 120. The first extension spring 108 experiences no compression when the magnetic dynamic mass 104 translates away from the equilibrium position in the first direction 120.

Referring to FIG. 2C, the first spring proximal end 110 translates with the magnetic dynamic mass 104 as the magnetic dynamic mass 104 translates away from the equilibrium position in the second direction 122. This occurs because the head 138 of the first extension spring 108 engages the cage 134 during the translation. As a result, the first spring length 128 increases as the magnetic dynamic mass 104 translates away from the equilibrium position in the second direction 122 and tension builds in the first extension spring 108.

In contrast, the second spring proximal end 116 does not translate with the magnetic dynamic mass 104 as it translates away from the equilibrium position in the second direction 122. This is because the head 140 of the second extension spring 114 does not engage the cage 134 throughout the translation. Instead, the head 140 of the second extension spring 114 "floats" within the cage 134 (e.g., see FIG. 2C). As a result, the second spring length 130 is unchanged by the translation of the magnetic dynamic mass 104 away from the equilibrium position in the second direction 122. The second extension spring 114 undergoes no compression when the magnetic dynamic mass 104 translates away from the equilibrium position in the second direction 122.

In the example illustrated, the base 102 has a mass support surface 103 directed toward the magnetic dynamic mass 104. The magnetic dynamic mass 104 bears against and is translatable upon the mass support surface 103. In the example illustrated, the spring mount 132 of the magnetic dynamic mass 104 bears against and is translatable upon the mass support surface 103 of the base 102.

In some examples, the mass support surface 103 has a low coefficient of friction (e.g., below 0.2, more preferably below 0.10) to reduce friction generated between the magnetic dynamic mass 104 and the mass support surface 103 as the magnetic dynamic mass 104 translates upon the mass support surface 103. Any friction generated between the base 102 and magnetic dynamic mass 104 results in a conversion of kinetic energy to heat energy which cannot be transferred to one of the extension springs 108, 114. Accordingly, it is preferable for the mass support surface 103 to have as low a coefficient of friction as possible. In some examples, the mass support surface 103 is made of polytetrafluoroethylene or lined with a polytetrafluoroethylene layer.

Figure 4:
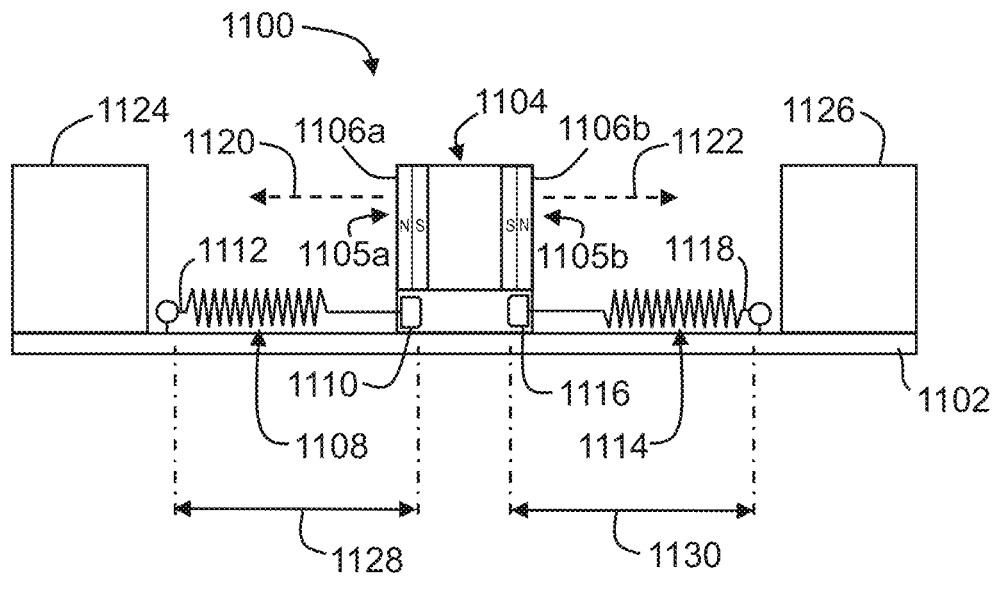
FIG. 4 is a front view of another example vibration absorber according to aspects of the teaching disclosed herein.
Figure 5A:
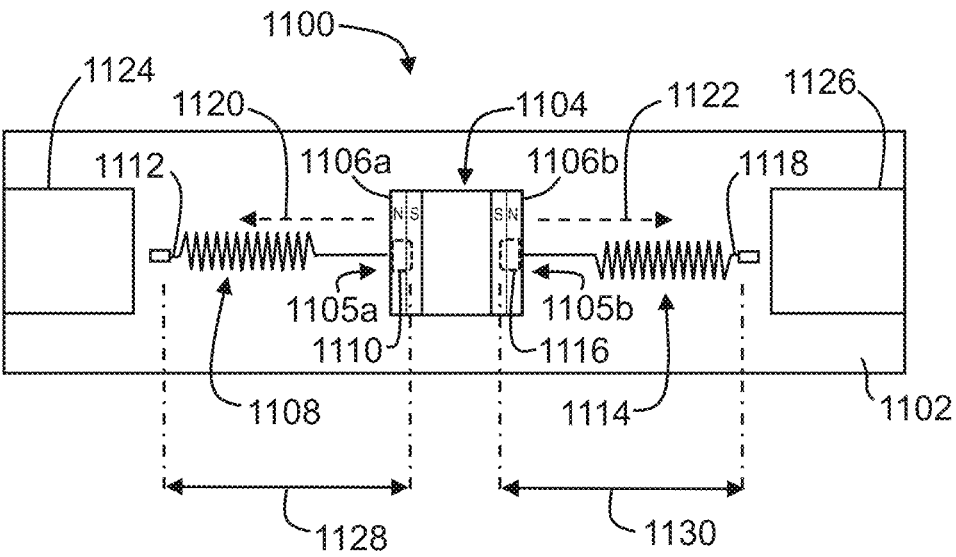
FIGS. 5A-5C are top views of the vibration absorber of FIG. 4, showing the magnetic dynamic mass of the vibration absorber in different positions.
Figure 5B:
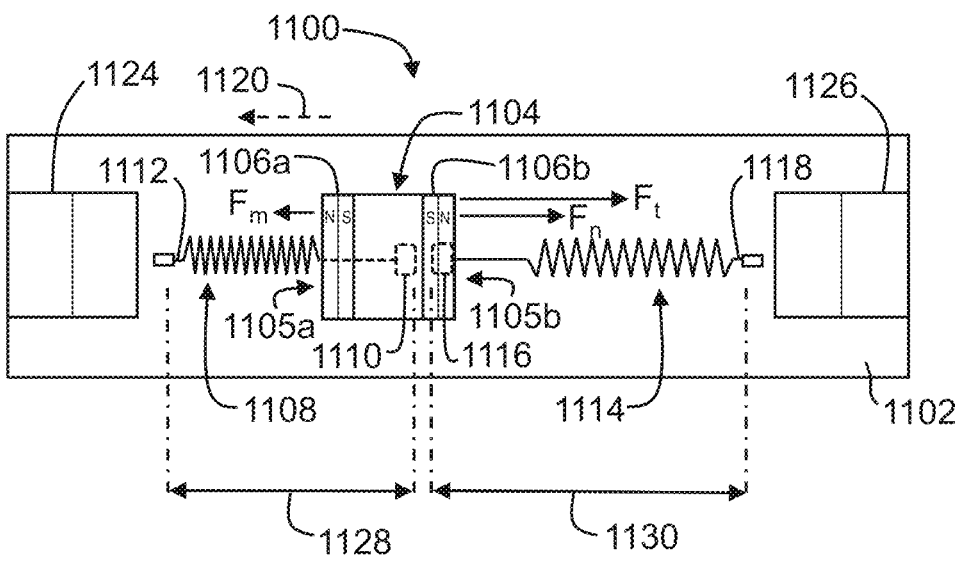
Figure 5C:
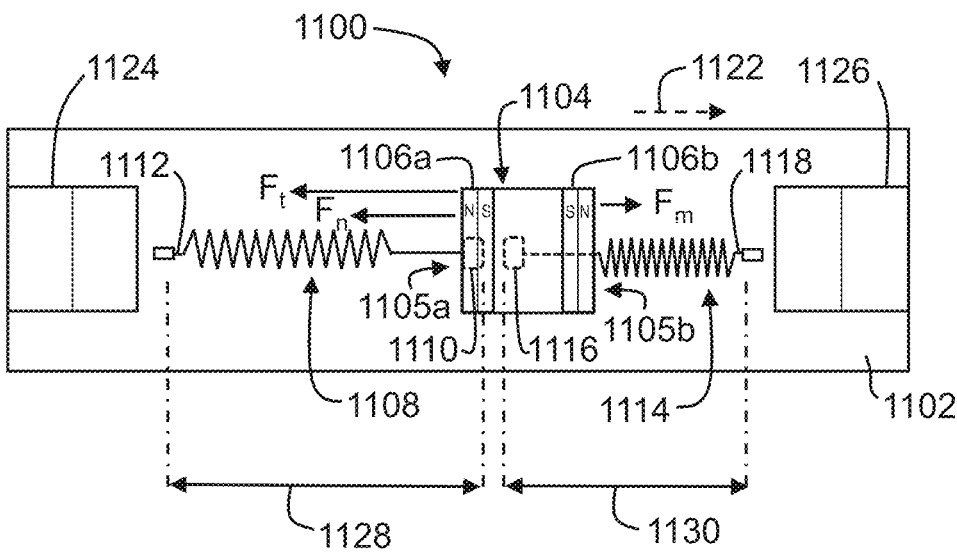

Referring to FIGS. 4-5C, another example of a vibration absorber 1100 according to aspects of the present teaching has some similarity to the vibration absorber 100 with like features identified by like reference characters, incremented by 1000. The vibration absorber 1100 includes a base 1102, a magnetic dynamic mass 1104, first and second extension springs 1108, 1114, and first and second static magnetic portions 1124, 1126.

The first extension spring 1108 has a first spring proximal end 1110, a first spring distal end 1112, and a first spring length 1128 between the first spring proximal and distal ends 1110, 1112. The second extension spring 1114 has a second spring proximal end 1116, a second spring distal end 1118, and a second spring length 1130 between the second spring proximal and distal ends 1116, 1118.

In the example illustrated, the magnetic dynamic mass 1104 includes a first dynamic magnetic portion 1106*a* directed toward the first static magnetic portion 1124 and a second dynamic magnetic portion 1106*b* directed toward the second static magnetic portion 1126. The magnetic dynamic mass 1104, in the illustrated example, includes a first dynamic magnet 1105*a* having the first dynamic magnetic portion 1106*a* and a second dynamic magnet 1105*b* having the second dynamic magnetic portion 1106*b*. The first and second dynamic magnets 1105*a*, 1105*b* are affixed to opposite sides of the magnetic dynamic mass 1104. In other examples, the magnetic dynamic mass 1104 does not have first and second dynamic magnets and the first and second magnetic portions 1106a, 1106b is made at least in part from a material that is attracted to magnetic fields (e.g., iron, cobalt, nickel, etc.).

Each dynamic magnet 1105a, 1105b is oriented to produce a magnetic field that attracts a respective one of the first and second static magnetic portions 1124, 1126. In the illustrated example, the north pole (N) of each of the first and second dynamic magnets 1105a, 1105b is oriented toward the respective one of the first and second static magnetic portions 1124, 1126.

FIGS. 5A-5C illustrate the magnetic dynamic mass 1104 in different positions. Referring to FIG. 5A, the magnetic dynamic mass 1104 is in an equilibrium position relative to the base 1102.

Comparing FIG. 5B to FIG. 5A, the magnetic dynamic mass 1104 has translated in a first direction 1120 away from the equilibrium position. Translation of the magnetic dynamic mass 1104 in the first direction 1120 away from the equilibrium position is resisted by tension in the second extension spring 1114 and aided by magnetic attraction between the first static magnetic portion 1124 and the first dynamic magnetic portion 1106a of the magnetic dynamic mass 1104. The translation of the magnetic dynamic mass 1104 in the first direction 1120 away from the equilibrium position increases the second spring length 1130 and stores tension in the second extension spring 1114. The tension in the second extension spring 1114 resists the translation of the magnetic dynamic mass 1104 in the first direction 1120 and urges the magnetic dynamic mass 1104 toward the equilibrium position. The first spring length 1128 is unchanged by the translation of the magnetic dynamic mass 1104 away from the equilibrium position in the first direction 1120 since the first spring proximal end 1110 is secured to the magnetic dynamic mass 1104 to act only in tension.

Referring to FIG. 5B, the tension in the second extension spring 1114 exerts a tensile force $F_t$ on the magnetic dynamic mass 1104 (in a direction opposite the first direction 1120). The tensile force $F_t$ urges the magnetic dynamic mass 1104 toward the equilibrium position. As previously described, tensile force follows a linear relationship with respect to spring displacement. Therefore, the tensile force $F_t$ exerted by the second extension spring 1114 is directly proportional to the displacement of the spring 1114 from its natural, non-extended, position.

Translation of the magnetic dynamic mass 1104 in the first direction 1120 away from the equilibrium position increases the magnetic attraction between the first static magnetic portion 1124 and the first dynamic magnetic portion 1106a of the magnetic dynamic mass 1104 by decreasing a distance therebetween. The magnetic attraction between the first static magnetic portion 1124 and the first dynamic magnetic portion 1106a of the magnetic dynamic mass 1104 exerts a magnetic force $F_m$ on the magnetic dynamic mass 1104 that softens the tensile force $F_t$. As previously described, magnetic force follows a non-linear relationship with respect to the distance between a pair of magnetically attracted elements. The magnetic force $F_m$ increases non-linearly (e.g., accelerating, exponentially, etc.) as the distance between the first static magnetic portion 1124 and the first dynamic magnetic portion 1106a of the magnetic dynamic mass 1104 decreases.

Comparing FIG. 5C to FIG. 5A, the magnetic dynamic mass 1104 has translated in a second direction 1122, opposite the first direction 1120, away from the equilibrium position. Translation of the magnetic dynamic mass 1104 in the second direction 1122 away from the equilibrium position is resisted by tension in the first extension spring 1108 and aided by magnetic attraction between the second static magnetic portion 1126 and the second dynamic magnetic portion 1106b of the magnetic dynamic mass 1104. The translation of the magnetic dynamic mass 1104 in the second direction 1122 away from the equilibrium position increases the first spring length 1128 and stores tension in the first extension spring 1108. The tension in the first extension spring 1108 resists the translation of the magnetic dynamic mass 1104 in the second direction 1122 and urges the magnetic dynamic mass 1104 toward the equilibrium position. The second spring length 1130 is unchanged by the translation of the magnetic dynamic mass 1104 away from the equilibrium position in the second direction 1122 since the second spring proximal end 1116 is secured to the magnetic dynamic mass 1104 to act only in tension.

Referring to FIG. 5C, the tension in the first extension spring 1108 exerts a tensile force $F_t$ on the magnetic dynamic mass 1104 (in a direction opposite the second direction 1122). The tensile force $F_t$ urges the magnetic dynamic mass 1104 toward the equilibrium position. The tensile force $F_t$ exerted by the first extension spring 1108 is directly proportional to the displacement of the spring 1108 from its natural, non-extended, position.

Translation of the magnetic dynamic mass 1104 in the second direction 1122 away from the equilibrium position increases the magnetic attraction between the second static magnetic portion 1126 and the second dynamic magnetic portion 1106b of the magnetic dynamic mass 1104 by decreasing a distance therebetween. The magnetic attraction between the second static magnetic portion 1126 and the second dynamic magnetic portion 1106b of the magnetic dynamic mass 1104 exerts a magnetic force $F_m$ on the magnetic dynamic mass 1104 that softens the tensile force $F_t$. The magnetic force $F_m$ increases non-linearly (e.g., accelerating, exponentially, etc.) as the distance between second static magnetic portion 1126 and the second dynamic magnetic portion 1106b of the magnetic dynamic mass 1104 decreases.

No matter the displacement of the magnetic dynamic mass 1104 away from the equilibrium position, the tensile force $F_t$ always exceeds the magnetic force $F_m$. Referring to FIGS. 5B and 5C, the magnetic force $F_m$ opposes and thereby softens the tensile force $F_t$. When the tensile force $F_t$ and magnetic force $F_m$ are added together, the resulting net spring force $F_n$ urges the magnetic dynamic mass 1104 toward the equilibrium position.

Figure 6:
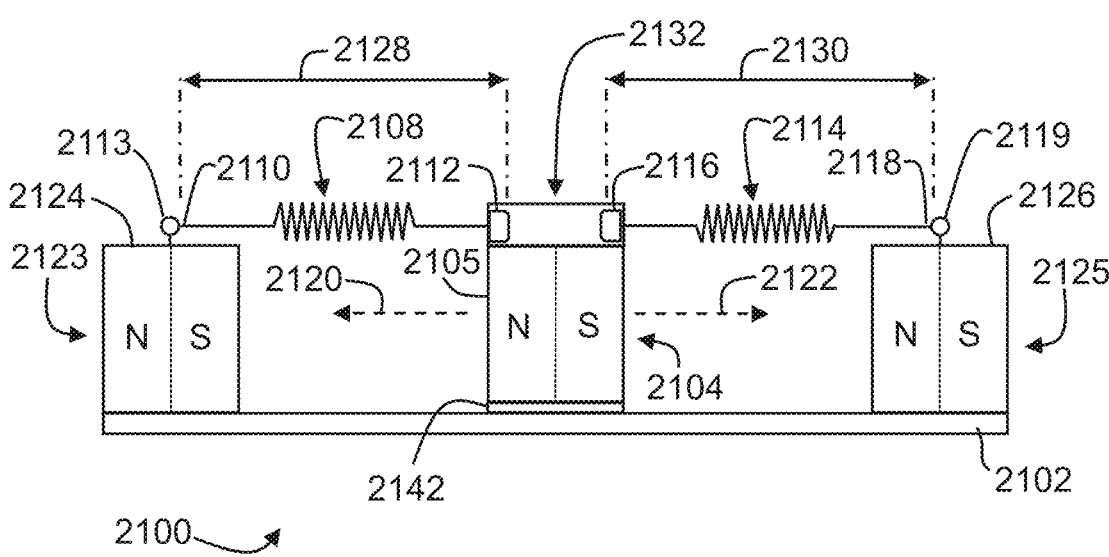
FIG. 6 is a front view of another example vibration absorber according to aspects of the teaching disclosed herein.
Figure 7A:
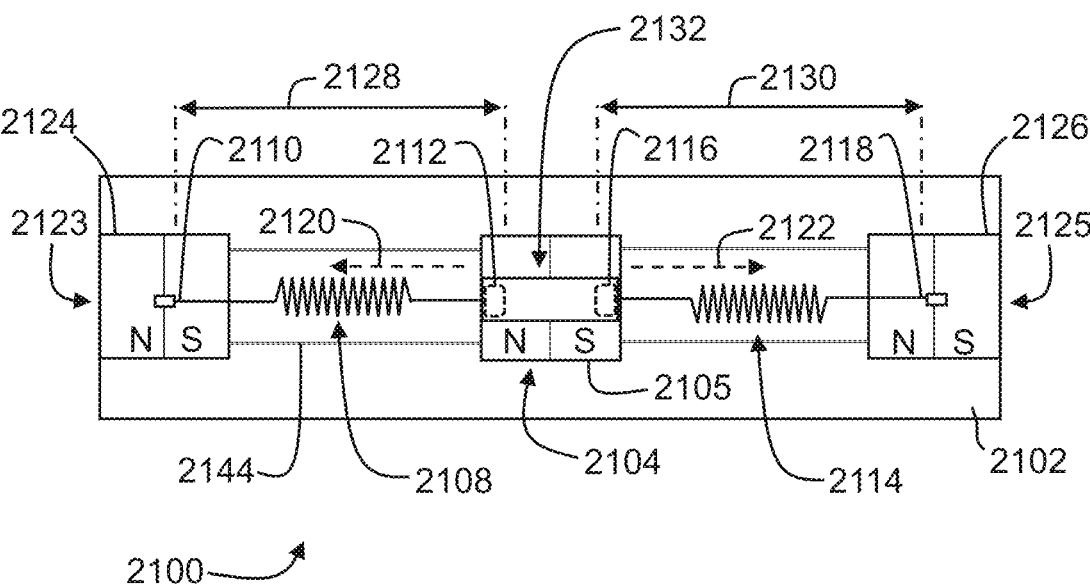
FIGS. 7A-7C are top views of the vibration absorber of FIG. 6, showing the magnetic dynamic mass of the vibration absorber in different positions.
Figure 7B:
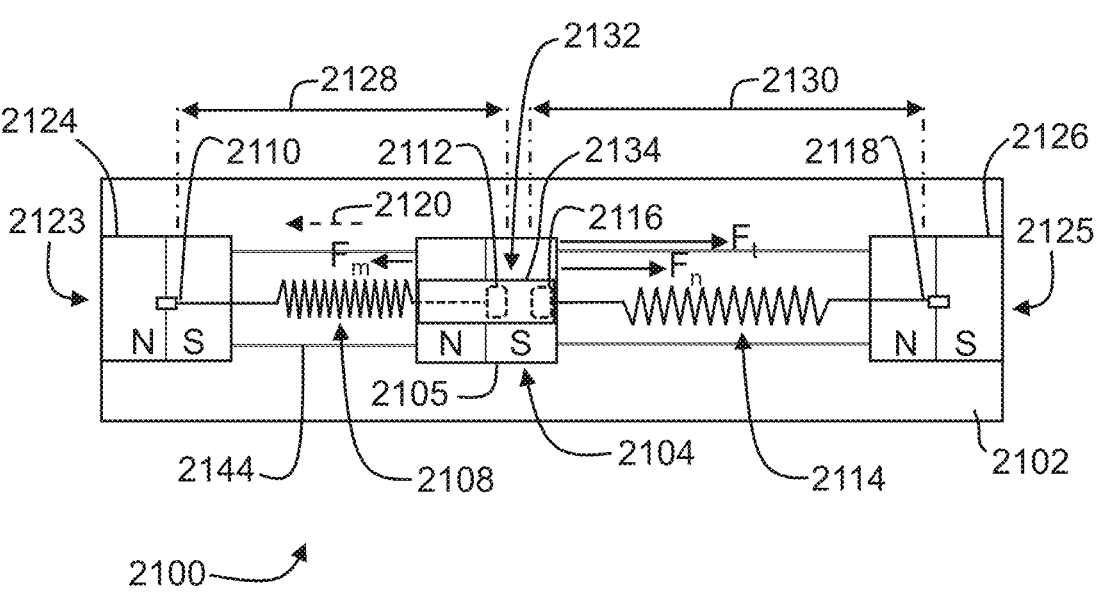
Figure 7C:
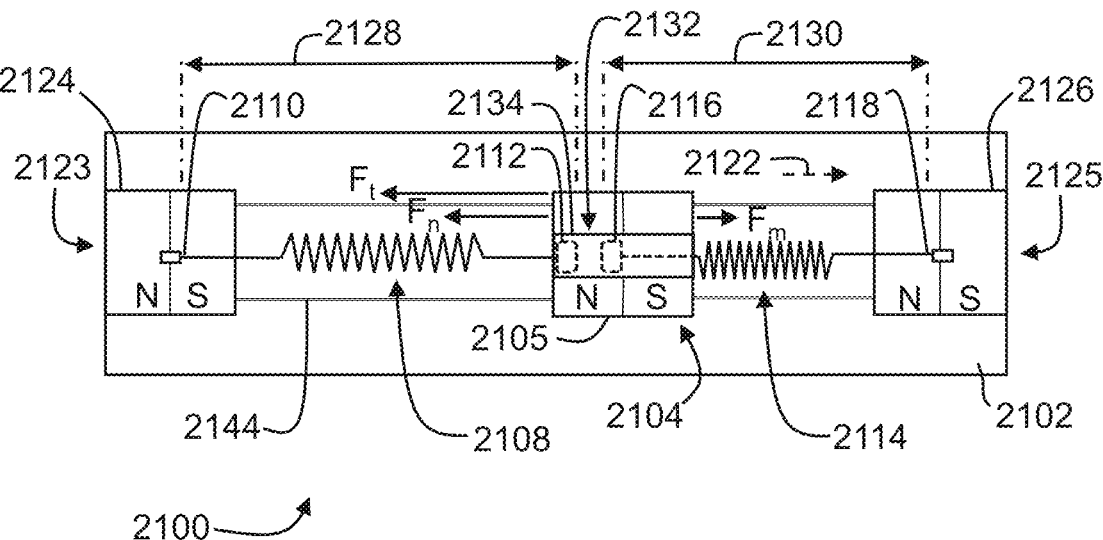

Referring to FIGS. 6-7C, another example of a vibration absorber 2100 according to aspects of the present teaching has some similarity to the vibration absorber 100 with like features identified by like reference characters, incremented by 2000. The vibration absorber 2100 includes a base 2102, a magnetic dynamic mass 2104, first and second extension springs 2108, 2114, and first and second static magnetic portions 2124, 2126.

The first extension spring 2108 has a first spring proximal end 2110, a first spring distal end 2112, and a first spring length 2128 between the first spring proximal and distal ends 2110, 2112. The second extension spring 2114 has a second spring proximal end 2116, a second spring distal end 2118, and a second spring length 2130 between the second spring proximal and distal ends 2116, 2118.

Referring again to FIG. 6, the magnetic dynamic mass 2104 includes a spring mount 2132 to facilitate connection of the first and second spring proximal ends 2110, 2116. As with the vibration absorber 100, each of the first and second extension springs 2108, 2114 are secured to the magnetic dynamic mass 2104 to act only in tension.

The magnetic dynamic mass 2104 includes a carriage 2142. In the illustrated example, the carriage 2142 and the spring mount 2132 are located on opposite ends of the magnetic dynamic mass 2104—the spring mount 2132 at the top and the carriage 2142 at the bottom. With reference to FIGS. 6 and 7A, the base 2102 includes a track 2144 to which the carriage 2142 is slidably connected. The magnetic dynamic mass 2104 is translatable relative to the base 2102 in the first and second directions 2120 and 2122 along the track 2144. In other examples, the magnetic dynamic mass 2104 does not include a carriage and engages directly with the track 2144 of the base 2102. In other examples, the carriage and the track are not included and the magnetic dynamic mass 2104 bears against and translates directly upon the base 2102.

In the example illustrated, the first spring distal end 2112 is secured to the first static magnetic portion 2124 and the second spring distal end 2118 is secured to the second static magnetic portion 2126. Each of the first and second spring distal ends 2112, 2118 is optionally fitted with a loop 2113, 2119 (FIG. 6) to facilitate attachment to the respective one of the static magnetic portions 2124, 2126.

In the example illustrated, the magnetic dynamic mass 2104 includes a dynamic magnet 2105. In this example, the dynamic magnet 2105 makes up a majority of the mass of the dynamic magnetic mass 2104. The dynamic magnet 2105 is oriented to produce a magnetic field that attracts both of the first and second static magnetic portions 2124, 2126. In the illustrated example, the north pole (N) of the dynamic magnet 2105 is oriented toward the first static magnetic portion 2124 and the south pole (S) is oriented toward second static magnetic portion 2126.

In the illustrated example, the vibration absorber 2100 includes a first static magnet 2123 having the first static magnetic portion 2124 and a second static magnet 2125 having the second static magnetic portion 2126. Each static magnet 2123, 2125 is oriented to produce a magnetic field attracted to the magnetic field produced by dynamic magnet 2105 of the magnetic dynamic mass 2104. Opposite poles attract each other. In the illustrated example, the south pole (S) of the first static magnet 2123 is oriented toward the north pole (N) of the dynamic magnet 2105, and the north pole (N) of the second static magnet 2125 is oriented toward the south pole (S) of the dynamic magnet 2105.

FIGS. 7A-7C illustrate the magnetic dynamic mass 2104 in different positions. Referring to FIG. 7A, the magnetic dynamic mass 2104 is in an equilibrium position relative to the base 2102.

Comparing FIG. 7B to FIG. 7A, the magnetic dynamic mass 2104 has translated in a first direction 2120 away from the equilibrium position. Translation of the magnetic dynamic mass 2104 in the first direction 2120 away from the equilibrium position is resisted by tension in the second extension spring 2114 and aided by magnetic attraction between the first static magnet 2123 and the dynamic magnet 2105 of the magnetic dynamic mass 2104. The translation of the magnetic dynamic mass 2104 in the first direction 2120 away from the equilibrium position increases the second spring length 2130 and stores tension in the second extension spring 2114. The tension in the second extension spring 2114 resists the translation of the magnetic dynamic mass 2104 in the first direction 2120 and urges the magnetic dynamic mass 2104 toward the equilibrium position. The first spring length 2128 is unchanged by the translation of the magnetic dynamic mass 2104 away from the equilibrium position in the first direction 2120 since the first spring proximal end 2110 is secured to the magnetic dynamic mass 2104 to act only in tension.

Referring to FIG. 7B, the tension in the second extension spring 2114 exerts a tensile force $F_t$ on the magnetic dynamic mass 2104 (in a direction opposite the first direction 2120). The tensile force $F_t$ urges the magnetic dynamic mass 2104 toward the equilibrium position. As previously described, tensile force follows a linear relationship with respect to spring displacement. Therefore, the tensile force $F_t$ exerted by the second extension spring 2114 is directly proportional to the displacement of the spring 2114 from its natural, non-extended, position.

Translation of the magnetic dynamic mass 2104 in the first direction 2120 away from the equilibrium position increases the magnetic attraction between the first static magnet 2123 and the dynamic magnet 2105 of the magnetic dynamic mass 2104 by decreasing a distance therebetween. The magnetic attraction between the first static magnet 2123 and the dynamic magnet 2105 of the magnetic dynamic mass 2104 exerts a magnetic force $F_m$ on the magnetic dynamic mass 2104 that softens the tensile force $F_t$. As previously described, magnetic force follows a non-linear relationship with respect to the distance between a pair of magnetically attracted elements. The magnetic force $F_m$ increases non-linearly (e.g., accelerating, exponentially, etc.) as the distance between the first static magnet 2123 and the dynamic magnet 2105 of the magnetic dynamic mass 2104 decreases.

Comparing FIG. 7C to FIG. 7A, the magnetic dynamic mass 2104 has translated in a second direction 2122, opposite the first direction 2120, away from the equilibrium position. Translation of the magnetic dynamic mass 2104 in the second direction 2122 away from the equilibrium position is resisted by tension in the first extension spring 2108 and aided by magnetic attraction between the second static magnet 2125 and the dynamic magnet 2105 of the magnetic dynamic mass 2104. The translation of the magnetic dynamic mass 2104 in the second direction 2122 away from the equilibrium position increases the first spring length 2128 and stores tension in the first extension spring 2108. The tension in the first extension spring 2108 resists the translation of the magnetic dynamic mass 2104 in the second direction 2122 and urges the magnetic dynamic mass 2104 toward the equilibrium position. The second spring length 2130 is unchanged by the translation of the magnetic dynamic mass 2104 away from the equilibrium position in the second direction 2122 since the second spring proximal end 2116 is secured to the magnetic dynamic mass 2104 to act only in tension.

Referring to FIG. 7C, the tension in the first extension spring 2108 exerts a tensile force $F_t$ on the magnetic dynamic mass 2104 (in a direction opposite the second direction 2122). The tensile force $F_t$ urges the magnetic dynamic mass 2104 toward the equilibrium position. The tensile force $F_t$ exerted by the first extension spring 2108 is directly proportional to the displacement of the spring 2108 from its natural, non-extended, position.

Translation of the magnetic dynamic mass 2104 in the second direction 2122 away from the equilibrium position increases the magnetic attraction between the second static magnet 2125 and the dynamic magnet 2105 of the magnetic dynamic mass 2104 by decreasing a distance therebetween. The magnetic attraction between the second static magnet 2125 and the dynamic magnet 2105 of the magnetic dynamic mass 2104 exerts a magnetic force $F_m$ on the magnetic dynamic mass 2104 that softens the tensile force $F_t$. The magnetic force $F_m$ increases non-linearly (e.g., accelerating, exponentially, etc.) as the distance between the second static magnet 2125 and the dynamic magnet 2105 of the magnetic dynamic mass 2104 decreases.

No matter the displacement of the magnetic dynamic mass 2104 away from the equilibrium position, the tensile force $F_t$ always exceeds the magnetic force $F_m$. Referring to FIGS. 7B and 7C, the magnetic force $F_m$ opposes and thereby softens the tensile force $F_t$. When the tensile force $F_t$ and magnetic force $F_m$ are added together, the resulting net spring force $F_n$ urges the magnetic dynamic mass 2104 toward the equilibrium position.

Figures 8, 9A, 9B:
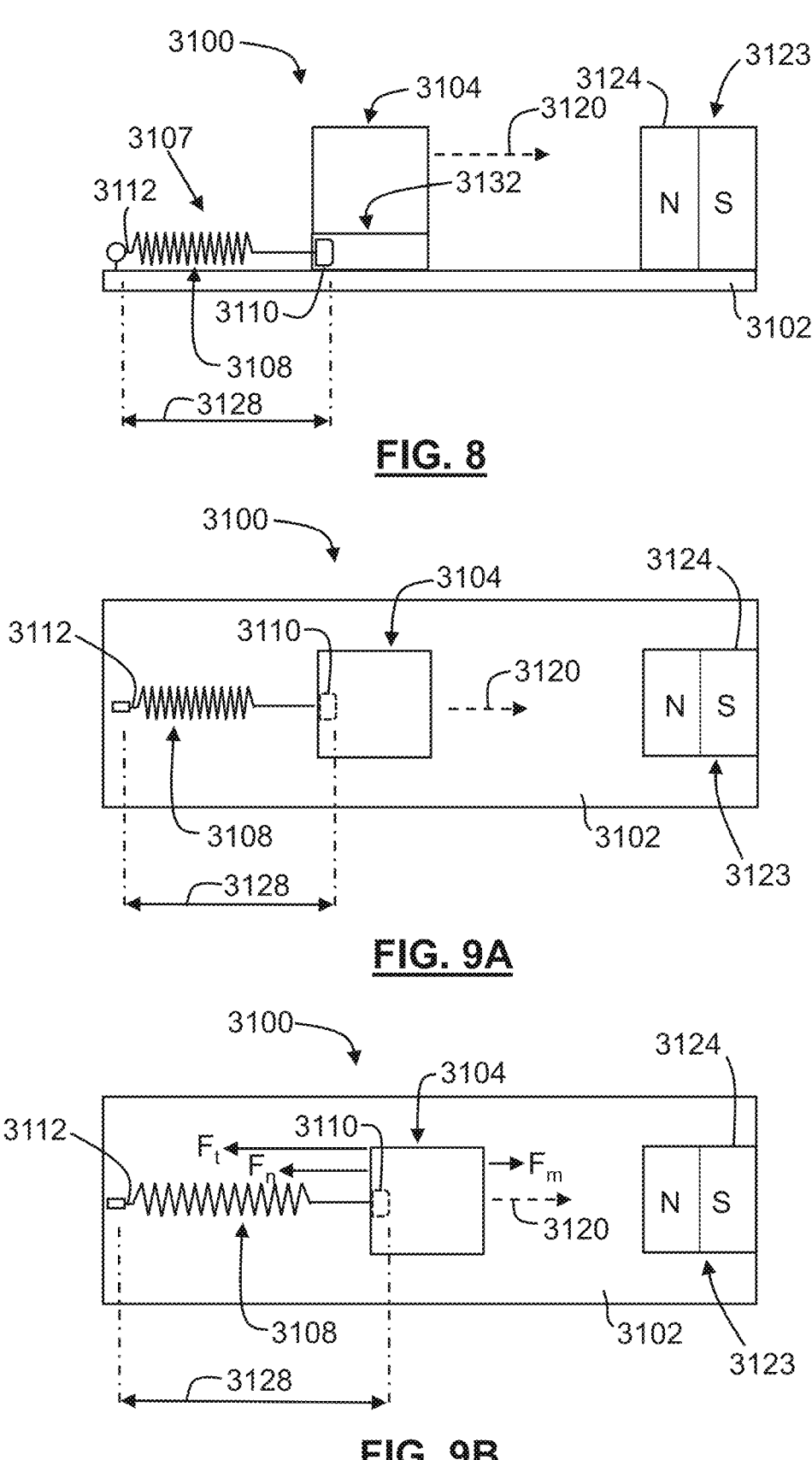
FIG. 8 is a front view of another example vibration absorber according to aspects of the teaching disclosed herein.
FIGS. 9A-9B are top views of the vibration absorber of FIG. 8, showing the magnetic dynamic mass of the vibration absorber in different positions.

Referring to FIGS. 8-9B, another example of a vibration absorber 3100 according to aspects of the present teaching has some similarity to the vibration absorber 100 with like features identified by like reference characters, incremented by 3000. The vibration absorber 3100 includes a base 3102, and a magnetic dynamic mass 3104. Unlike the vibration absorber 100, the vibration absorber 3100 includes a single elastic element 3107 and a single static magnetic portion 3124. The elastic element 3107 is positioned to resist translation of the magnetic dynamic mass 3104 away from an equilibrium position in a first direction 3120.

The static magnetic portion 3124 is oriented in attraction to the magnetic dynamic mass 3104. In the illustrated example, the static magnetic portion 3124 is positioned away from the magnetic dynamic mass 3104 in the first direction 3120. Translation of the magnetic dynamic mass 3104 away from the equilibrium position in the first direction 3120 is aided by magnetic attraction between the static magnetic portion 3124 and the magnetic dynamic mass 3104.

In the illustrated example, the elastic element 3107 includes an extension spring 3108. The extension spring 3108 has a spring proximal end 3110 secured to the magnetic dynamic mass 3104, a spring distal end 3112 opposite the spring proximal end 3110, and a spring length 3128 between the spring proximal and distal ends 3110, 3112. The magnetic dynamic mass 3104 includes a spring mount 3132 to facilitate securing the spring proximal end 3110 to the magnetic dynamic mass 3104

In the illustrated example, the vibration absorber 3100 includes a static magnet 3123 having the static magnetic portion 3124. The static magnet 3123 is affixed to the base 3102. In other examples, the static magnet 3123 is secured to the base 3102 indirectly (i.e., through another component of the vibration absorber 3100 which is itself directly affixed to the base 3102). In other examples, the static magnet 3123 is not secured to the base 3102. The static magnet 3123 is oriented to produce a magnetic field that attracts the magnetic dynamic mass 3104. In the illustrated example, the north pole (N) of the static magnet 3123 is oriented toward the magnetic dynamic mass 3104.

In the example illustrated, the magnetic dynamic mass 3104 is made from a material that is attracted to the magnetic fields produced by the static magnet 3123. In other examples, the magnetic dynamic mass 3104 includes a dynamic magnet oriented in attraction to the static magnet 3123.

In the example illustrated, the spring distal end 3112 is secured to the base 3102. In other examples, the spring distal end 3112 is not secured to the base 3102. For example, the spring distal end 3112 can be secured directly to the static magnetic portion 3124. In other examples, the spring distal end 3112 is secured to the base 3102 indirectly (i.e., through another component of the vibration absorber 3100 which is itself directly fixed to the base 3102).

FIGS. 9A-9B illustrate the magnetic dynamic mass 3104 in different positions. Referring to FIG. 9A, the magnetic dynamic mass 3104 is in an equilibrium position relative to the base 3102. Comparing FIG. 9B to FIG. 9A, the magnetic dynamic mass 3104 has translated in the first direction 3120 away from the equilibrium position. Translation of the magnetic dynamic mass 3104 in the first direction 3120 away from the equilibrium position is resisted by tension in the extension spring 3108 and aided by magnetic attraction between the static magnetic portion 3124 and the magnetic dynamic mass 3104. The translation of the magnetic dynamic mass 3104 in the first direction 3120 away from the equilibrium position increases the spring length 3128 and stores tension in the extension spring 3108. The tension in the extension spring 3108 resists the translation of the magnetic dynamic mass 3104 in the first direction 3120 and urges the magnetic dynamic mass 3104 toward the equilibrium position.

Referring to FIG. 9B, the tension in the extension spring 108 exerts a tensile force $F_t$ on the magnetic dynamic mass 3104 (in a direction opposite the first direction 3120). The tensile force $F_t$ urges the magnetic dynamic mass 3104 toward the equilibrium position. As previously described, tensile force follows a linear relationship with respect to spring displacement. Therefore, the tensile force $F_t$ exerted by the extension spring 3108 is directly proportional to the displacement of the spring 3108 from its natural, non-extended, position.

Translation of the magnetic dynamic mass 3104 in the first direction 3120 away from the equilibrium position increases the magnetic attraction between the magnetic dynamic mass 3104 and the static magnetic portion 3124 by decreasing a distance therebetween. The magnetic attraction between the static magnetic portion 3124 and the magnetic dynamic mass 3104 exerts a magnetic force $F_m$ on the magnetic dynamic mass 3104 that softens the tensile force $F_t$. As previously described, magnetic force follows a non-linear relationship with respect to the distance between a pair of magnetically attracted elements. The magnetic force $F_m$ increases non-linearly (e.g., accelerating, exponentially, etc.) as the distance between the magnetic dynamic mass 3104 and the static magnetic portion 3124 decreases.

No matter the displacement of the magnetic dynamic mass 3104 in the first direction 3120 away from the equilibrium position, the tensile force $F_t$ always exceeds the magnetic force $F_m$. Referring to FIG. 9B, the magnetic force $F_m$ opposes and thereby softens the tensile force $F_t$. When the tensile force $F_t$ and magnetic force $F_m$ are added together, the resulting net spring force $F_n$ urges the magnetic dynamic mass 3104 toward the equilibrium position. The vibration absorber 3100 may be particularly well suited for objects that generally experience unidirectional vibrations (e.g., the recoil of a gun when fired).

Figure 10:
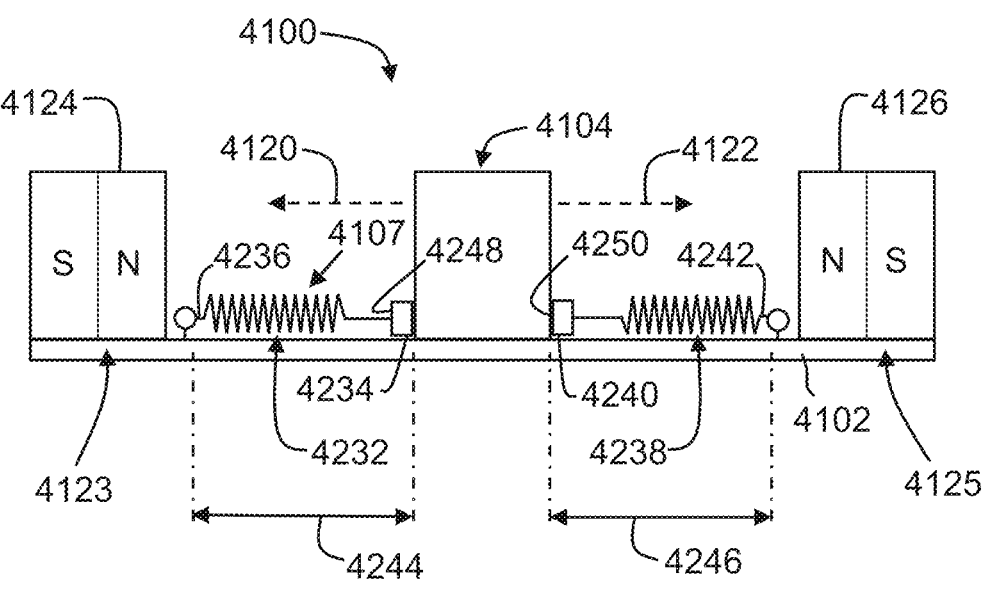
FIG. 10 is a front view of another example vibration absorber according to aspects of the teaching disclosed herein.
Figure 11A:
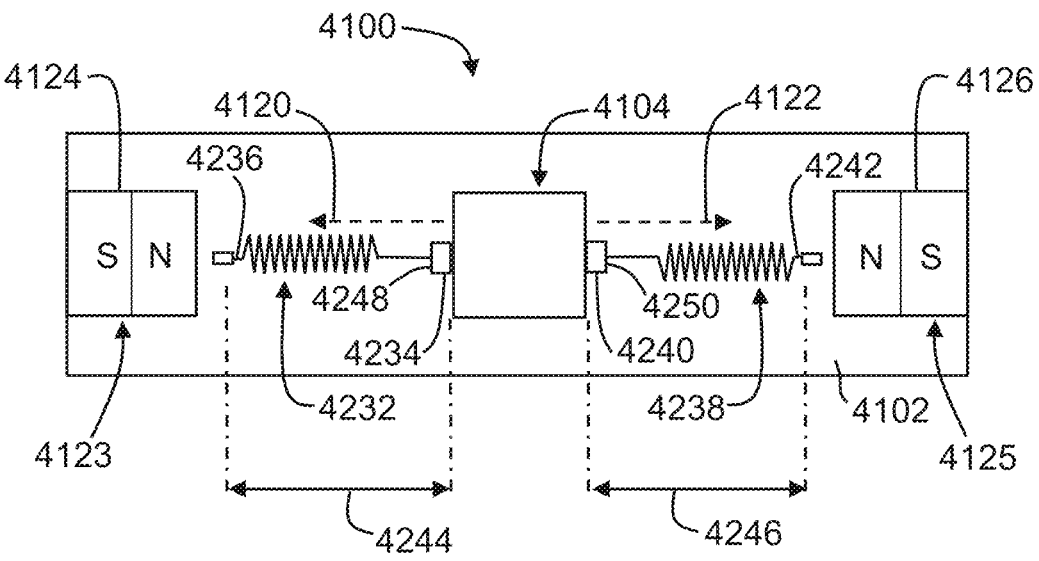
FIGS. 11A-11C are top views of the vibration absorber of FIG. 10, showing the magnetic dynamic mass of the vibration absorber in different positions.
Figure 11B:
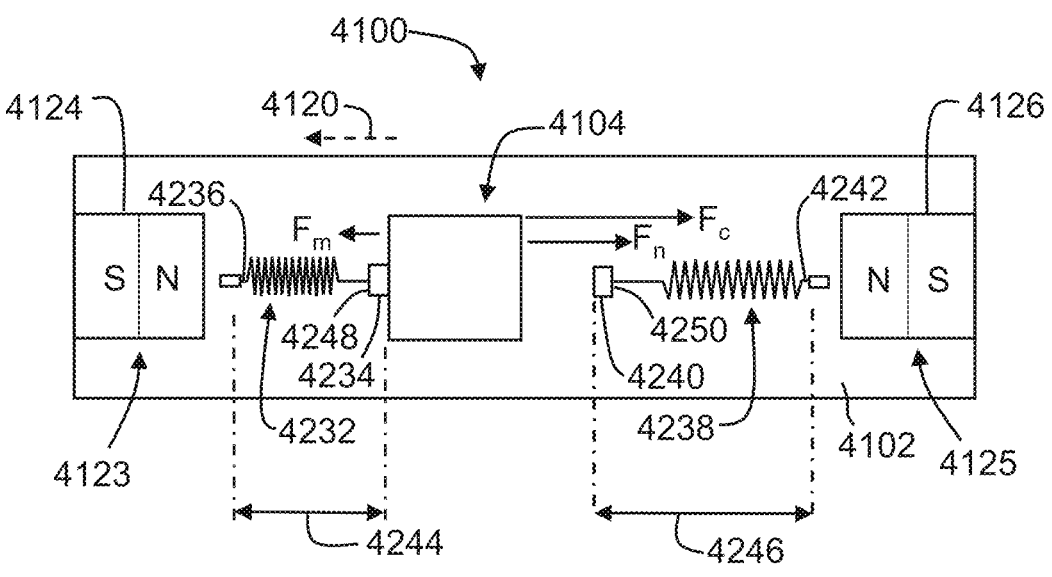
Figure 11C:
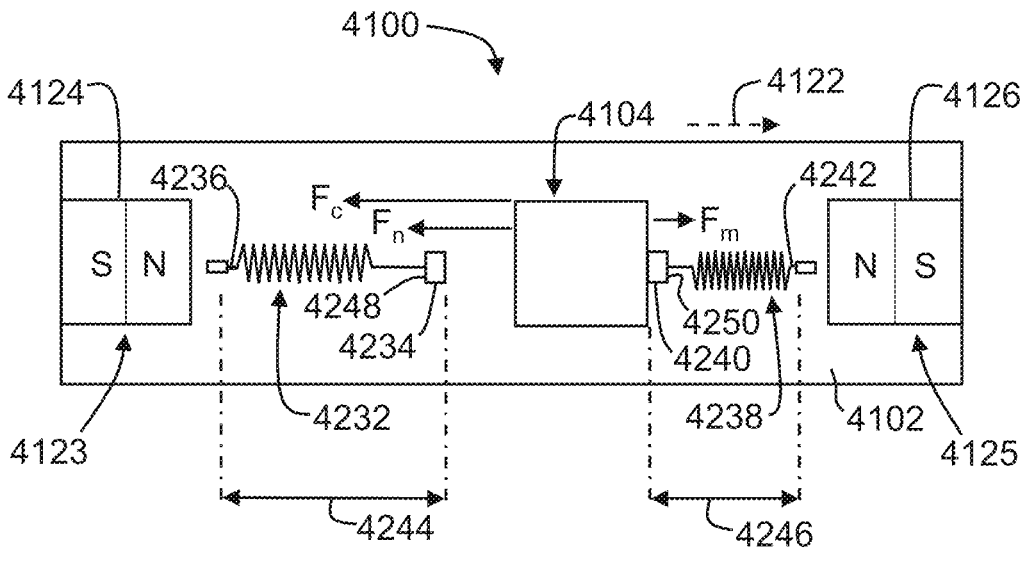

Referring to FIGS. 10-11C, another example of a vibration absorber 4100 according to aspects of the present teaching has some similarity to the vibration absorber 100 with like features identified by like reference characters, incremented by 4000. The vibration absorber 4100 includes a base 4102, a magnetic dynamic mass 4104, first and second elastic elements 4107, and first and second static magnetic portions 4124, 4126.

In the illustrated example, the first elastic element includes a first compression spring 4232 and the second elastic element includes a second compression spring 4238. Each compression spring 4232, 4238 includes a length of helically wound coils that compress when force is applied to absorb and store energy from the force. The first compression spring 4232 has a first spring proximal end 4234 secured to the magnetic dynamic mass 4104, a first spring distal end 4236 opposite the first spring proximal end 4234, and a first spring length 4244 between the first spring proximal and distal ends 4234, 4236. Similarly, the second compression spring 4238 has a second spring proximal end 4240 secured to the magnetic dynamic mass 4104, a second spring distal end 4242 opposite the second spring proximal end 4240, and a second spring length 4246 between the second spring proximal and distal ends 4240, 4242. In the illustrated example, the first and second spring distal ends 4236, 4242 are secured to the base 4102.

In the illustrated example, the vibration absorber 4100 includes a first static magnet 4123 having the first static magnetic portion 4124 and a second static magnet 4125 having the second static magnetic portion 4126. Each of the static magnets 4123, 4125 are affixed to the base 4102 and oriented to produce a magnetic field that attracts the magnetic dynamic mass 4104. In the illustrated example, the north pole (N) of each of the static magnets 4123, 4125 is oriented toward the magnetic dynamic mass 4104. In the example illustrated, the magnetic dynamic mass 4104 is made from a material that is attracted to the magnetic fields produced by the static magnet 4123, 4125. In other examples, the magnetic dynamic mass 4104 includes one or more dynamic magnets oriented in attraction to each of the static magnets 4123, 4125.

FIGS. 11A-11C illustrate the magnetic dynamic mass 4104 in different positions. Referring to FIG. 11A, the magnetic dynamic mass 4104 is in an equilibrium position relative to the base 4102. Comparing FIG. 11B to FIG. 11A, the magnetic dynamic mass 4104 has translated in a first direction 4120 away from the equilibrium position. Translation of the magnetic dynamic mass 4104 in the first direction 4120 away from the equilibrium position is resisted by compression of the first compression spring 4232 and aided by magnetic attraction between the first static magnetic portion 4124 and the magnetic dynamic mass 4104. The translation of the magnetic dynamic mass 4104 in the first direction 4120 away from the equilibrium position decreases the first spring length 4244 and compresses the first compression spring 4232. The compression of the first compression spring 4232 resists the translation of the magnetic dynamic mass 4104 in the first direction 4120 and urges the magnetic dynamic mass 4104 toward the equilibrium position.

Referring to FIG. 11B, the compression of the first compression spring 4232 exerts a compressive force $F_c$ on the magnetic dynamic mass 4104 (in a direction opposite the first direction 4120). The compressive force $F_c$ urges the magnetic dynamic mass 4104 toward the equilibrium position. Like tensile force, compressive force follows a linear relationship with respect to spring displacement. Therefore, the compressive force $F_c$ exerted by the first compression spring 4232 is directly proportional to the displacement of the spring 4232 from its natural, non-compressed, position.

Translation of the magnetic dynamic mass 4104 in the first direction 4120 away from the equilibrium position increases the magnetic attraction between the magnetic dynamic mass 4104 and the first static magnetic portion 4124 by decreasing a distance therebetween. The magnetic attraction between the first static magnetic portion 4124 and the magnetic dynamic mass 4104 exerts a magnetic force $F_m$ on the magnetic dynamic mass 4104 that opposes the compressive force $F_c$. Unlike compressive force, magnetic force follows a non-linear relationship with respect to the distance between a pair of magnetically attracted elements.

The magnetic force $F_m$ increases non-linearly (e.g., accelerating, exponentially, etc.) as the distance between the magnetic dynamic mass 4104 and the first static magnetic portion 4124 decreases.

Comparing FIG. 11C to FIG. 11A, the magnetic dynamic mass 4104 has translated in a second direction 4122, opposite the first direction 4120, away from the equilibrium position. Translation of the magnetic dynamic mass 4104 in the second direction 4122 away from the equilibrium position is resisted by compression of the second compression spring 4238 and aided by magnetic attraction between the second static magnetic portion 4126 and the magnetic dynamic mass 4104. The translation of the magnetic dynamic mass 4104 in the second direction 4122 away from the equilibrium position decreases the second spring length 4246 and compresses the second compression spring 4238. The compression of the second compression spring 4238 resists the translation of the magnetic dynamic mass 4104 in the second direction 4122 and urges the magnetic dynamic mass 4104 toward the equilibrium position.

Referring to FIG. 11C, the compression of the second compression spring 4238 exerts a compressive force $F_c$ on the magnetic dynamic mass 4104 (in a direction opposite the second direction 4122). The compressive force $F_c$ urges the magnetic dynamic mass 4104 toward the equilibrium position. The tensile force $F_c$ exerted by the second compression spring 4238 is directly proportional to the displacement of the spring 4238 from its natural, non-compressed, position.

Translation of the magnetic dynamic mass 4104 in the second direction 4122 away from the equilibrium position increases the magnetic attraction between the magnetic dynamic mass 4104 and the second static magnetic portion 4126 by decreasing a distance therebetween. The magnetic attraction between the second static magnetic portion 4126 and the magnetic dynamic mass 4104 exerts a magnetic force $F_m$ on the magnetic dynamic mass 4104 which opposes the compressive force $F_c$. The magnetic force $F_m$ increases non-linearly (e.g., accelerating, exponentially etc.) as the distance between the magnetic dynamic mass 4104 and the second static magnetic portion 4126 decreases.

Referring to FIGS. 11B and 11C, the magnetic force $F_m$ opposes the compressive force $F_c$. No matter the displacement of the magnetic dynamic mass 4104 away from the equilibrium position, the compressive force $F_c$ always exceeds the magnetic force $F_m$. When the compressive force $F_c$ and the magnetic force $F_m$ are added together, the resulting net spring force $F_n$ urges the magnetic dynamic mass 4104 toward the equilibrium position. In this way, the magnetic force $F_m$ acts to "soften" the compressive force $F_c$ exerted on the magnetic dynamic mass 4104.

In the illustrated example, each of the first and second compression springs 4232, 4238 are secured to the magnetic dynamic mass 5104 to act only in compression. This can be achieved in a number of suitable ways. In the illustrated example, each of the first and spring proximal ends 4234, 4240 have a respective head 4248, 4250 that is secured to the magnetic dynamic mass 4104 when the dynamic magnetic mass 4104 is in the equilibrium position (FIG. 11A). In this position, each compression spring 4232, 4238 is uncompressed (i.e., natural length) and exerts no force on the magnetic dynamic mass 4104.

Referring to FIG. 11B, the first spring proximal end 4234 translates with the magnetic dynamic mass 4104 as the magnetic dynamic mass 4104 translates away from the equilibrium position in the first direction 4120. This occurs because the head 4248 of the first compression spring 4232 engages (i.e., abuts) the magnetic dynamic mass 4104 throughout the translation. As a result, the first spring length 4244 decreases as the magnetic dynamic mass 4104 translates away from the equilibrium position in the first direction 4120 and builds compression in the first compression spring 4232.

In contrast, the second spring proximal end 4240 does not translate with the magnetic dynamic mass 4104 as the magnetic dynamic mass 4104 translates away from the equilibrium position in the first direction 4120. This is because the head 4250 of the second compression spring 4238 is released from the magnetic dynamic mass 4104 during the translation. As a result, the second spring length 4246 is unchanged by the translation of the magnetic dynamic mass 4104 away from the equilibrium position in the first direction 4120. The second compression spring 4238 is not tensioned when the magnetic dynamic mass 4104 translates away from the equilibrium position in the first direction 4120.

Referring to FIG. 12C, the second spring proximal end 4240 translates with the magnetic dynamic mass 4104 as the magnetic dynamic mass 4104 translates away from the equilibrium position in the second direction 4122. This occurs because the head 4250 of the second compression spring 4238 engages (i.e., abuts) the magnetic dynamic mass 4104 during the translation. As a result, the second spring length 4246 increases as the magnetic dynamic mass 4104 translates away from the equilibrium position in the second direction 4122 and compression builds in the second compression spring 4238.

In contrast, the first spring proximal end 4234 does not translate with the magnetic dynamic mass 4104 as the magnetic dynamic mass 4104 translates away from the equilibrium position in the second direction 4122. This is because the head 4248 of the first compression spring 4232 is released from the magnetic dynamic mass 4104 throughout the translation. As a result, the first spring length 4244 is unchanged by the translation of the magnetic dynamic mass 4104 away from the equilibrium position in the second direction 4122. The first compression spring 4232 is not tensioned when the magnetic dynamic mass 4104 translates away from the equilibrium position in the second direction 4122.

Figure 12:
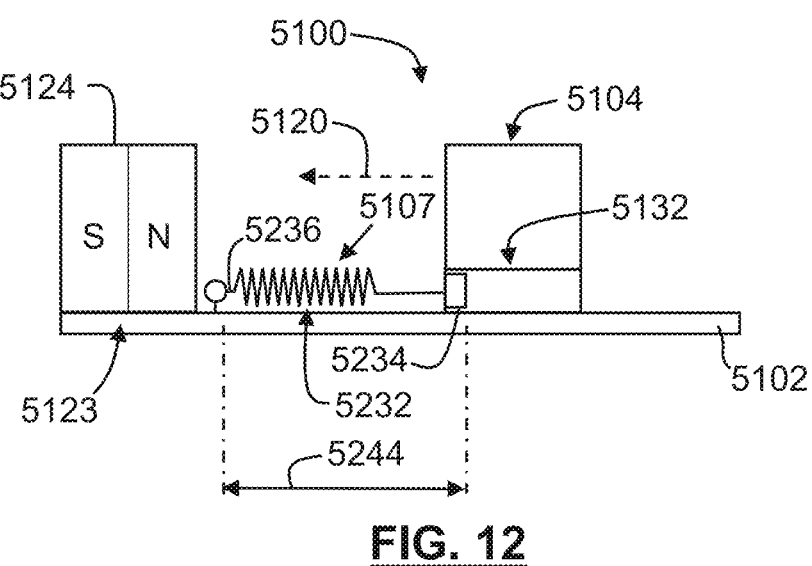
FIG. 12 is a front view of another example vibration absorber according to aspects of the teaching disclosed herein.
Figure 13A:
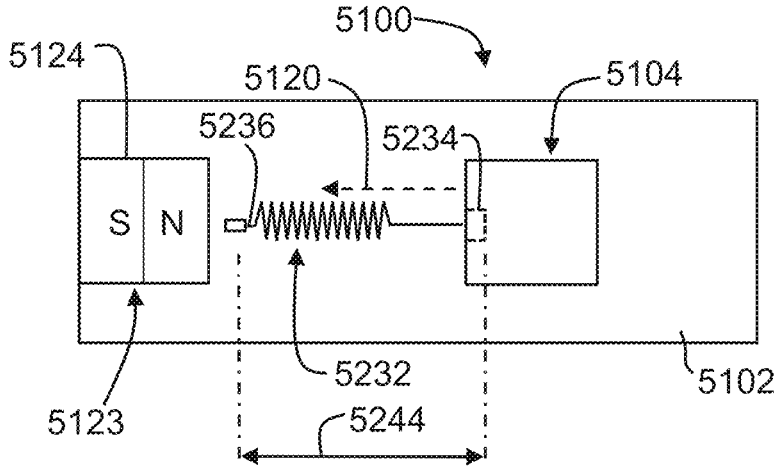
FIGS. 13A-13B are top views of the vibration absorber of FIG. 12, showing the magnetic dynamic mass of the vibration absorber in different positions.
Figure 13B:
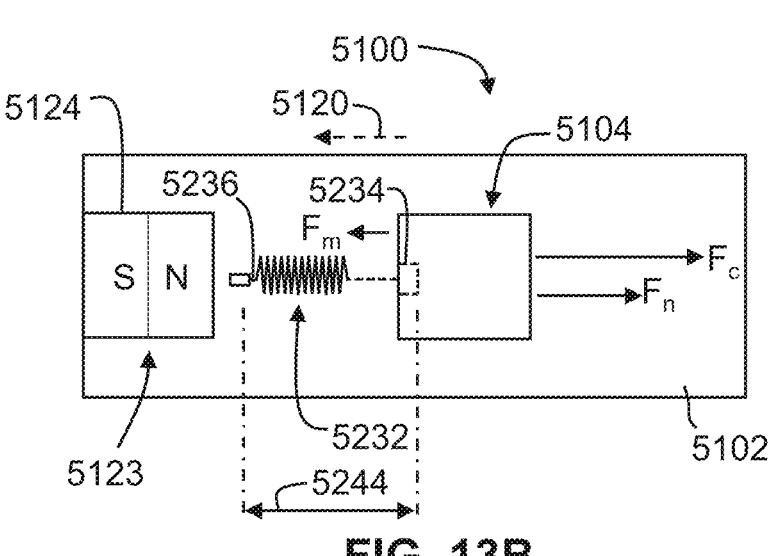

Referring to FIGS. 12-13B, another example of a vibration absorber 5100 according to aspects of the present teaching has some similarity to the vibration absorber 4100 with like features identified by like reference characters, incremented by 1000. The vibration absorber 5100 includes a base 5102, and a magnetic dynamic mass 5104. Unlike the vibration absorber 4100, the vibration absorber 5100 includes a single elastic element 5107 and a single static magnetic portion 5124. The elastic element 5107 is positioned to resist translation of the magnetic dynamic mass 5104 away from an equilibrium position in a first direction 5120.

The static magnetic portion 5124 is oriented in attraction to the magnetic dynamic mass 5104. In the illustrated example, the static magnetic portion 5124 is positioned away from the magnetic dynamic mass 5104 in the first direction 5120. Translation of the magnetic dynamic mass 5104 away from the equilibrium position in the first direction 5120 is aided by magnetic attraction between the static magnetic portion 5124 and the magnetic dynamic mass 5104.

In the illustrated example, the elastic element 5107 includes a compression spring 5232. The compression spring 5232 has a spring proximal end 5234 secured to the magnetic dynamic mass 5104, a spring distal end 5236 opposite the spring proximal end 5234, and a spring length 5244 between the spring proximal and distal ends 5234, 5236. The magnetic dynamic mass 5104 includes a spring mount 5132 to facilitate securing the spring proximal end 5234 to the magnetic dynamic mass 5104. In the illustrated example, the spring distal end 5236 is secured to the base 5102.

In the illustrated example, the vibration absorber 5100 includes a static magnet 5123 having the static magnetic portion 5124. The static magnet 5123 is affixed to the base 5102. The static magnet 5123 is oriented to produce a magnetic field that attracts the magnetic dynamic mass 5104. In the illustrated example, the north pole (N) of the static magnet 5123 is oriented toward the magnetic dynamic mass 5104.

In the example illustrated, the magnetic dynamic mass 5104 is made from a material that is attracted to the magnetic fields produced by the static magnet 5123. In other examples, the magnetic dynamic mass 5104 includes a dynamic magnet oriented in attraction to the static magnet 5123.

FIGS. 13A-13B illustrate the magnetic dynamic mass 5104 in different positions. Referring to FIG. 13A, the magnetic dynamic mass 5104 is in an equilibrium position relative to the base 5102. Comparing FIG. 13B to FIG. 13A, the magnetic dynamic mass 5104 has translated in the first direction 5120 away from the equilibrium position. Translation of the magnetic dynamic mass 5104 in the first direction 5120 away from the equilibrium position is resisted by compression of the compression spring 5232 and aided by magnetic attraction between the static magnetic portion 5124 and the magnetic dynamic mass 5104. The translation of the magnetic dynamic mass 5104 in the first direction 5120 away from the equilibrium position decreases the spring length 5244 and compresses the compression spring 5232. The compression of the compression spring 5232 resists the translation of the magnetic dynamic mass 5104 in the first direction 5120 and urges the magnetic dynamic mass 5104 toward the equilibrium position.

Referring to FIG. 13B, the compression of the compression spring 5232 exerts a compressive force $F_c$ on the magnetic dynamic mass 5104 (in a direction opposite the first direction 5120). The compressive force $F_c$ urges the magnetic dynamic mass 5104 toward the equilibrium position. As previously described, compressive force follows a linear relationship with respect to spring displacement. Therefore, the compressive force $F_c$ exerted by the compression spring 5232 is directly proportional to the displacement of the spring 5232 from its natural, non-compressed, position.

Translation of the magnetic dynamic mass 5104 in the first direction 5120 away from the equilibrium position increases the magnetic attraction between the magnetic dynamic mass 5104 and the static magnetic portion 5124 by decreasing a distance therebetween. The magnetic attraction between the static magnetic portion 5124 and the magnetic dynamic mass 5104 exerts a magnetic force $F_m$ on the magnetic dynamic mass 5104 that softens the compressive force $F_c$. As previously described, magnetic force follows a non-linear relationship with respect to the distance between a pair of magnetically attracted elements. The magnetic force $F_m$ increases non-linearly (e.g., accelerating, exponentially, etc.) as the distance between the magnetic dynamic mass 5104 and the static magnetic portion 5124 decreases.

No matter the displacement of the magnetic dynamic mass 5104 in the first direction 5120 away from the equilibrium position, the compressive force $F_c$ always exceeds the magnetic force $F_m$. Referring to FIG. 13B, the magnetic force $F_m$ opposes and thereby softens the compressive force $F_c$. When the compressive force $F_c$ and magnetic force $F_m$ are added together, the resulting net spring force $F_n$ urges the magnetic dynamic mass 5104 toward the equilibrium position.

Figure 14A:
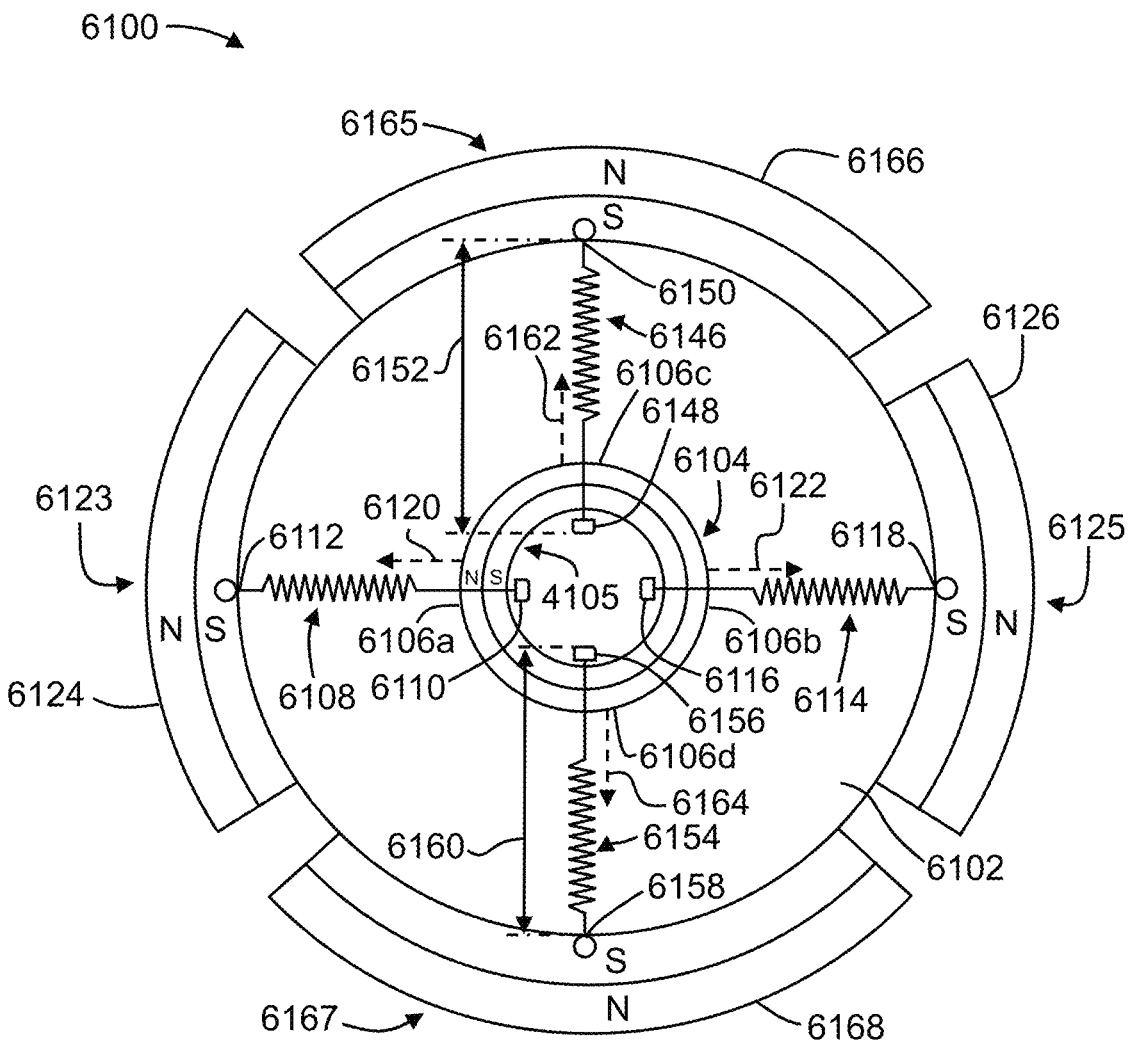
FIG. 14A is a top view of another example vibration absorber according to aspects of the teaching disclosed herein, showing the magnetic dynamic mass of the vibration absorber in an equilibrium position.
Figure 14B:
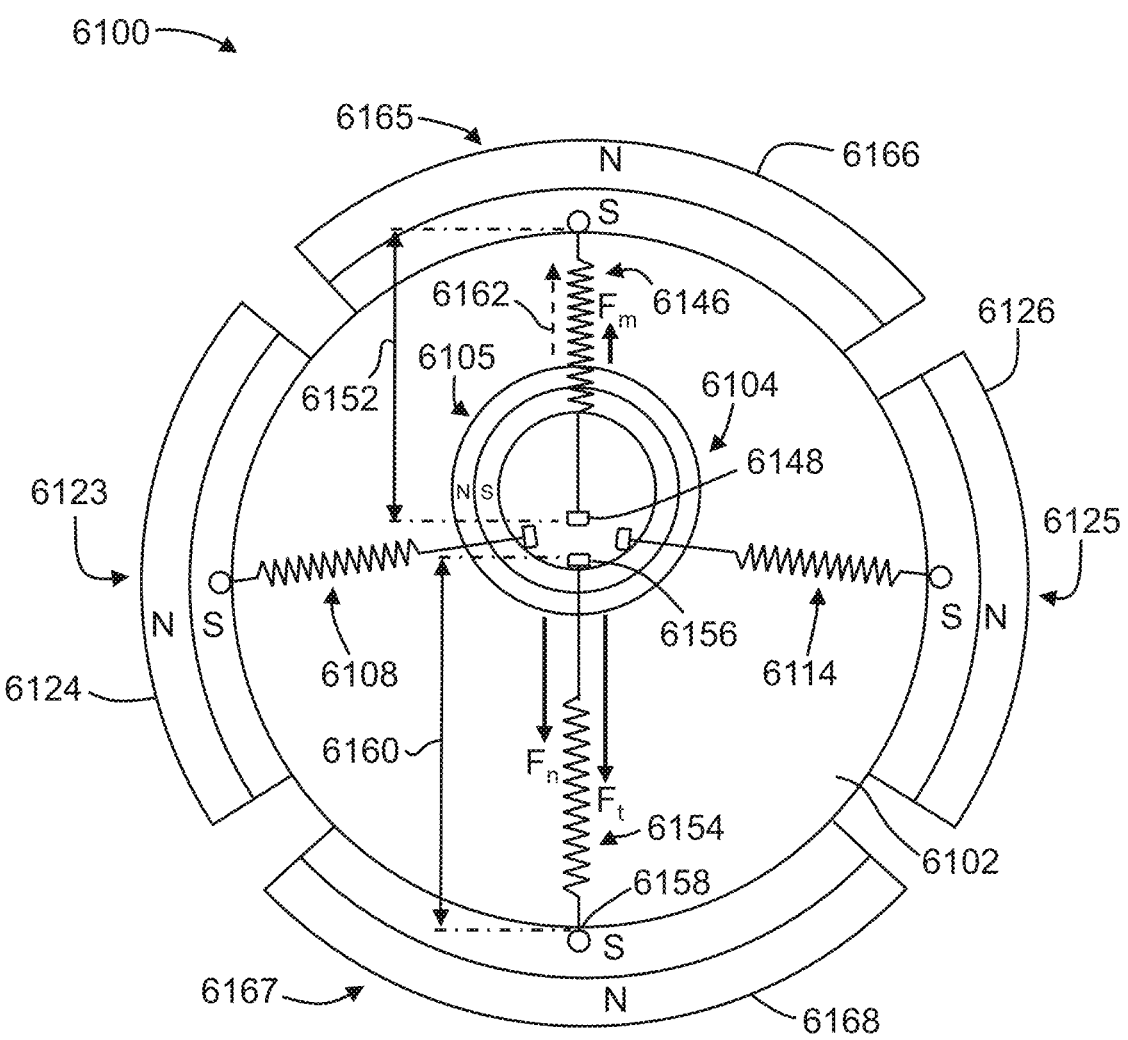
FIGS. 14B and 14C are top views of the vibration absorber of FIG. 14A, showing the magnetic dynamic mass translated in opposite directions away from the equilibrium position.
Figure 14C:
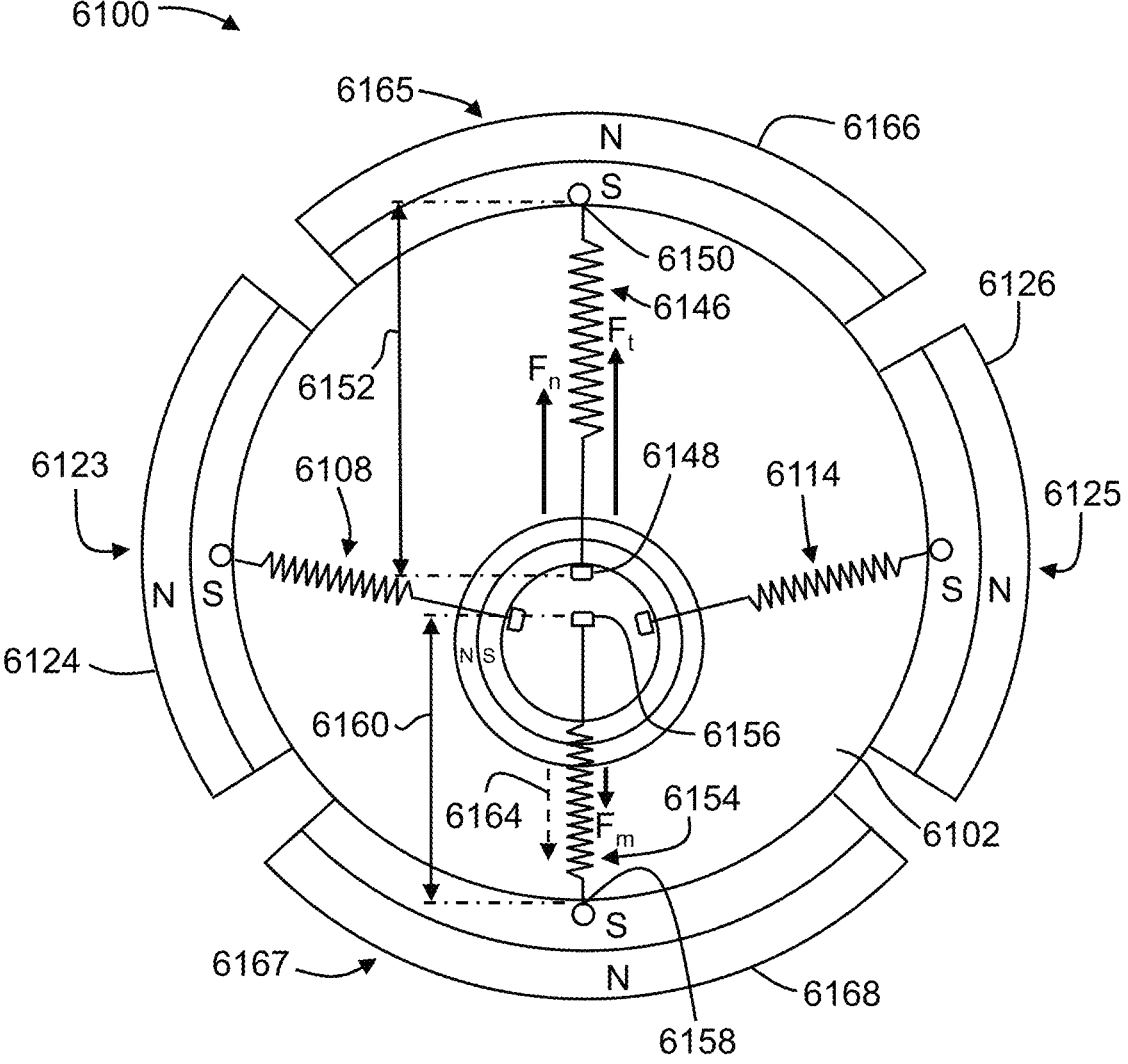

Referring to FIGS. 14A-14C, another example of a vibration absorber 6100 according to aspects of the present teaching has some similarity to the vibration absorber 100 with like features identified by like reference characters, incremented by 6000. The vibration absorber 6100 includes a base 6102, a magnetic dynamic mass 6104, first and second extension springs 6108, 6114, and first and second static magnetic portions 6124, 6126. Referring to FIG. 14A, the first extension spring 4108 extends from a first spring proximal end 6110 in a first direction 6120 to a first spring distal end 6112 and the second extension spring 6114 extends from a second spring proximal end 6116 in a first direction 6120 to a second spring distal end 6118.

The vibration absorber 6100 also includes third and fourth extension springs 6146, 6154. The third extension spring 6146 has a third spring proximal end 6148 secured to the magnetic dynamic mass 6104, a third spring distal end 6150 opposite the third spring proximal end 6148, and a third spring length 6152 between the third spring proximal and distal ends 6148, 4150. Similarly, the fourth extension spring 6154 has a fourth spring proximal end 6156 secured to the magnetic dynamic mass 6104, a fourth spring distal end 6158 opposite the fourth spring proximal end 6156, and a fourth spring length 6160 between the fourth spring proximal and distal ends 6156, 6158. In other examples, the vibration absorber 6100 includes more extension springs (e.g., 5-10 extension springs in total). In other examples, the vibration absorber 6100 includes less extension springs (e.g., 3 extension springs in total). In other examples, the vibration absorber 6100 includes third and fourth compression springs instead of the third and fourth extension springs.

In the example illustrated, the third and fourth extension springs 6146, 6154 are coil extension springs (also known as tension springs). Like the first and second extension springs 108, 114 of vibration absorber 100, each of the first, second, third and fourth extension springs 6108, 6114, 6146, and 6154 are secured to the magnetic dynamic mass 6104 to act only in tension.

Referring still to FIG. 14A, the third extension spring 6146 extends from the third spring proximal end 6148 in a third direction 6162 to the third spring distal end 6150, and the fourth extension spring 6154 extends from the fourth spring proximal end 6156 in a fourth direction 6164 to the fourth spring distal end 6158. The third direction 6162 is opposite the fourth direction 6164. In other examples, the third extension spring 6146 extends from the third spring proximal end 6148 to the third spring distal end 6150 at an angle relative to the third direction 6162. Alternatively, or in addition, the fourth extension spring 6154 may extend from the fourth spring proximal end 6156 to the fourth spring distal end 6158 at an angle relative to the fourth direction 6164.

In some examples, the third and fourth directions 6162, 6164 are transverse to the first and second directions 6120, 6122. As used herein, "transverse" means within 45 degrees of perpendicular. In the example illustrated, the third and fourth directions 6162, 6164 are perpendicular to the first and second directions 6120, 6122.

In the example illustrated, the vibration absorber 6100 also includes third and fourth static magnetic portions 6166, 6168 positioned away from the third and fourth spring proximal ends 6148, 6156, respectively. In the example illustrated, the third static magnetic portion 4166 is positioned away from the third spring proximal end 6148 in the third direction 6162 and the fourth static magnetic portion 6168 is positioned away from the fourth spring proximal end 6156 in the fourth direction 6164.

In the illustrated example, the vibration absorber 6100 includes a first static magnet 6123 having the first static magnetic portion 6124, a second static magnet 6125 having the second static magnetic portion 6126, a third static magnet 6165 having the third static magnetic portion 6166, and a fourth static magnet 6167 having the fourth static magnetic portion 6168. Each of the static magnets 6123, 6125, 6165 and 6167 are arcuate in shape and circumferentially spaced apart for one another. In other examples, the vibration absorber 6100 does not include static magnets and the first, second, third and fourth static magnetic portions 6124, 6126, 6166 and 6168 are made at least in part from a material that is attracted to magnetic fields (e.g., iron, cobalt, nickel, etc.).

The static magnets 6123, 6125, 6165, and 6167 are affixed to the base 6102. In other examples, the static magnets 6123, 6125, 6165, and 6167 are secured to the base 6102 indirectly (i.e., through another component of the vibration absorber 6100 which is itself directly affixed to the base 6102). In other examples, one or more of the static magnets 6123, 6125, 6165, and 6167 are not secured to the base 6102.

Each static magnet 6123, 6125, 6165 and 6167 is oriented to produce a magnetic field that attracts the magnetic dynamic mass 6104. In the illustrated example, the south pole (S) of each static magnet 6123, 6125, 6165 and 6167 is oriented toward the magnetic dynamic mass 6104.

The magnetic dynamic mass 6104 includes a first dynamic magnetic portion 6106$a$ directed toward the first static magnetic portion 6124, a second dynamic magnetic portion 6106$b$ directed toward the second static magnetic portion 6126, a third dynamic magnetic portion 6106$c$ directed toward the third static magnetic portion 6166, and a fourth dynamic magnetic portion 6106$c$ directed toward the fourth static magnetic portion 6168. In the illustrated example, the vibration absorber 6100 includes a dynamic magnet 6105 having the first, second, third and fourth dynamic magnetic portions 6106$a$, 6106$b$, 6106$c$ and 6106$d$. In other examples, the magnetic dynamic mass 6104 does not have a dynamic magnet and the first, second, third and fourth magnetic portions 6106$a$, 6106$b$, 6106$c$ and 6106$d$ are made at least in part from a material that is attracted to magnetic fields (e.g., iron, cobalt, nickel, etc.).

In the illustrated example, the dynamic magnet 6105 is ring-shaped and surrounds the magnetic dynamic mass 6104. The ring-shaped dynamic magnet 6105 (also referred to herein as a dynamic ring magnet) is oriented to produce a magnetic field attracted to the magnetic field generated by each of the static magnets 6123, 6125, 6165, and 6167. In the illustrated example, the north pole (N) of the dynamic ring magnet 6105 is oriented to face the south pole (S) of each of the static magnets 6123, 6125, 6165 and 6167. The opposite poles of the dynamic ring magnet 6105 and the static magnets 6123, 6125, 6165 and 6167 attract each other.

In the example illustrated, each of the first, second, third and fourth spring distal ends 6112, 6118, 6150, and 6158 are circumferentially spaced apart and secured to a respective one of the static magnets 6123, 6125, 6165 and 6167. In other examples, the first, second, third and fourth spring distal ends 6112, 6118, 6150 and 6158 are each secured to the base 6102. The first, second, third and fourth spring distal ends 6112, 6118, 6150, and 6158 may be circumferentially spaced apart at a regular interval (e.g., as in the illustrated example) or an irregular interval.

FIGS. 14A-14C illustrate the magnetic dynamic mass 3104 in different positions. In contrast to vibration absorbers 100, 1100, 2100, 3100, 4100 and 5100, the magnetic dynamic mass 6104 of vibration absorber 6100 is translatable relative to the base 6102 in two degrees of freedom. For simplicity of illustration, in FIGS. 14B and 10C the magnetic dynamic mass 6104 is translated away from the equilibrium position in the third and fourth directions 6162, 6164, respectively. However, the magnetic dynamic mass 6104 is free to translate in any radial direction with respect to the base 6102 in response to a vibration. The ability for the magnetic dynamic mass 6104 to translate in multiple degrees of freedom may improve overall vibration reduction compared to a vibration absorber in which the dynamic mass can translate in one degree of freedom relative to the base.

Referring to FIG. 14A, the magnetic dynamic mass 6104 is in an equilibrium position relative to the base 6102. In the equilibrium position, the forces acting on the magnetic dynamic mass 6104 are balanced (i.e., no net force in any direction). The extension springs 6108, 6114, 6146, and 6154 are positioned to resist radial translation of the magnetic dynamic mass 6104 away from the equilibrium position.

Comparing FIG. 14B to FIG. 14A, the magnetic dynamic mass 6104 has translated in the third direction 6162 away from the equilibrium position. Translation of the magnetic dynamic mass 6104 in the third direction 6162 away from the equilibrium position is resisted by tension in the fourth extension spring 6154 and aided by magnetic attraction between the third static magnetic portion 6166 and the magnetic dynamic mass 6104. The translation of the magnetic dynamic mass 6104 in the third direction 6162 away from the equilibrium position increases the fourth spring length 6160 and stores tension in the fourth extension spring 6154. The tension in the fourth extension spring 6154 resists the translation of the magnetic dynamic mass 6104 in the third direction 6162 and urges the magnetic dynamic mass 6104 toward the equilibrium position. The third spring length 6152 is unchanged by the translation of the magnetic dynamic mass 6104 away from the equilibrium position in the third direction 6162 since the third spring proximal end 6148 is secured to the magnetic dynamic mass 6104 to act only in tension.

Referring to FIG. 14B, the tension in the fourth extension spring 6154 exerts a tensile force $F_t$ on the magnetic dynamic mass 6104 (in a direction opposite the third direction 6162). The tensile force $F_t$ urges the magnetic dynamic mass 6104 toward the equilibrium position. As previously described, tensile force follows a linear relationship with respect to spring displacement. Therefore, the tensile force $F_t$ exerted by the fourth extension spring 6154 is directly proportional to the displacement of the spring 6154 from its natural, non-extended, position.

Translation of the magnetic dynamic mass 6104 in the third direction 6162 away from the equilibrium position increases the magnetic attraction between the third static magnet 6165 and the dynamic ring magnet 6105 of the magnetic dynamic mass 6104 by decreasing a distance therebetween. The magnetic attraction between the third static magnet 6165 and the dynamic ring magnet 6105 of the magnetic dynamic mass 6104 exerts a magnetic force $F_m$ on the magnetic dynamic mass 6104 that softens the tensile force $F_t$. As previously described, magnetic force follows a non-linear relationship with respect to the distance between a pair of magnetically attracted elements. The magnetic force $F_m$ increases non-linearly (e.g., accelerating, exponentially, etc.) as the distance between the third static magnet 6165 and the dynamic ring magnet 6105 of the magnetic dynamic mass 6104 decreases.

Comparing FIG. 14C to FIG. 14A, the magnetic dynamic mass 4104 has translated in the fourth direction 6164 away from the equilibrium position. Translation of the magnetic dynamic mass 6104 in the fourth direction 6164 away from the equilibrium position is resisted by tension in the third extension spring 6146 and aided by magnetic attraction between the fourth static magnetic portion 6168 and the magnetic dynamic mass 6104. The translation of the magnetic dynamic mass 6104 in the fourth direction 6164 away from the equilibrium position increases the third spring length 6152 and stores tension in the third extension spring 6146. The tension in the third extension spring 6146 resists the translation of the magnetic dynamic mass 6104 in the fourth direction 6164 and urges the magnetic dynamic mass 6104 toward the equilibrium position. The fourth spring length 6160 is unchanged by the translation of the magnetic dynamic mass 6104 away from the equilibrium position in the fourth direction 6164 since the fourth spring proximal end 6156 is secured to the magnetic dynamic mass 6104 to act only in tension.

Referring to FIG. 14C, the tension in the third extension spring 6146 exerts a tensile force $F_t$ on the magnetic dynamic mass 6104 (in a direction opposite the fourth direction 6164). The tensile force $F_t$ urges the magnetic dynamic mass 6104 toward the equilibrium position. The tensile force $F_t$ exerted by the third extension spring 6146 is directly proportional to the displacement of the spring 6146 from its natural, non-extended, position.

Translation of the magnetic dynamic mass 6104 in the fourth direction 6164 away from the equilibrium position increases the magnetic attraction between the fourth static magnet 6167 and the dynamic ring magnet 6105 of the magnetic dynamic mass 6104 by decreasing a distance therebetween. The magnetic attraction between the fourth static magnet 6167 and the dynamic ring magnet 6105 of the magnetic dynamic mass 6104 exerts a magnetic force $F_m$ on the magnetic dynamic mass 6104 that softens the tensile force $F_t$. The magnetic force $F_m$ increases non-linearly (e.g., accelerating, exponentially, etc.) as the distance between the fourth static magnet 6167 and the dynamic ring magnet 6105 of the magnetic dynamic mass 6104 decreases.

No matter the displacement of the magnetic dynamic mass 6104 away from the equilibrium position, the tensile force $F_t$ always exceeds the magnetic force $F_m$. Referring to FIGS. 14B and 14C, the magnetic force $F_m$ opposes and thereby softens the tensile force $F_t$. When the tensile force $F_t$ and magnetic force $F_m$ are added together, the resulting net spring force $F_n$ urges the magnetic dynamic mass 6104 toward the equilibrium position.

Figure 15A:
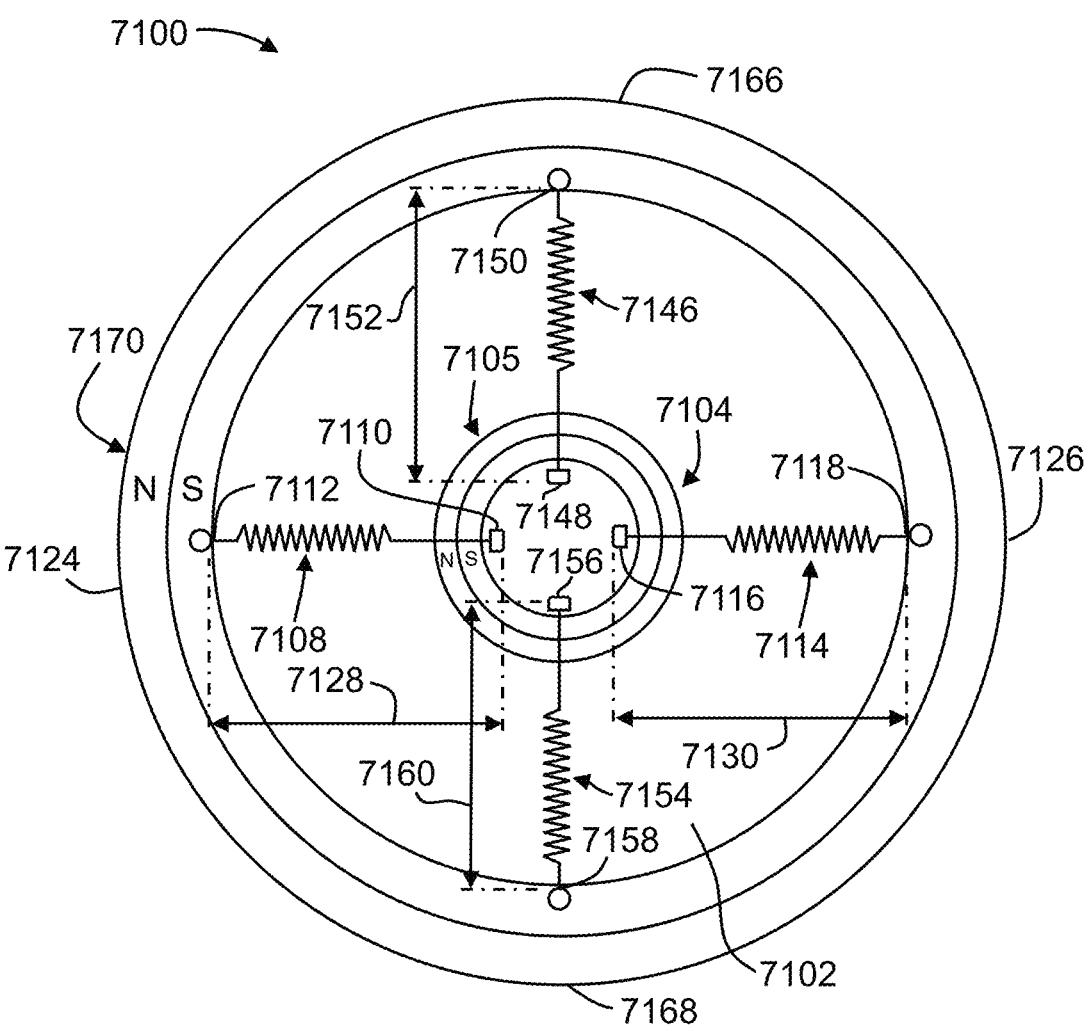
FIG. 15A is a top view of another example vibration absorber according to aspects of the teaching disclosed herein, showing the magnetic dynamic mass of the vibration absorber in an equilibrium position.
Figure 15B:
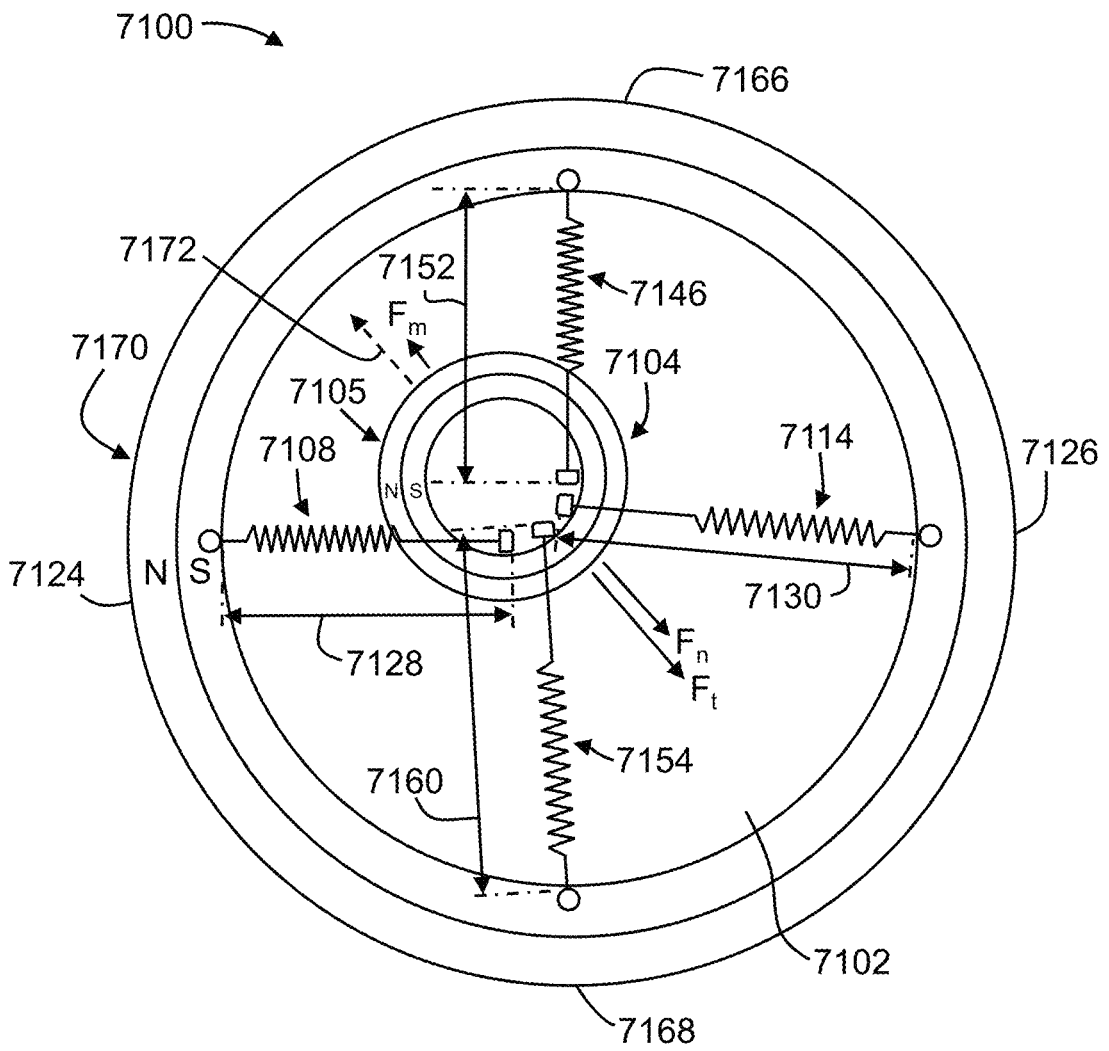
FIG. 15B is a top view of the vibration absorber of FIG. 15A, showing the magnetic dynamic mass translated radially away from the equilibrium position.

Referring to FIGS. 15A-15B, another example of a vibration absorber 7100 according to aspects of the present teaching is similar to the vibration absorber 6100 with like features identified by like reference characters, incremented by 1000. The vibration absorber 7100 includes a base 7102, a magnetic dynamic mass 7104, first, second, third and fourth extension springs 7108, 7114, 7146 and 7154, and first, second, third, and fourth static magnetic portions 7124, 7126, 7166, and 7168. The magnetic dynamic mass 7104 includes a dynamic ring magnet 7105. In the illustrated example, the north pole (N) of the dynamic ring magnet 7105 is oriented to face the south pole (S) of each of the static magnets 7123, 7125, 7165 and 7167.

The vibration absorber 7100 includes a magnetic static ring having the first, second, third, and fourth static magnetic portions 7124, 7126, 7166, and 7168. The magnetic dynamic mass 7104 is positioned within the magnetic static ring. In the illustrated example, the magnetic static ring comprises a ring magnet 7170. The ring magnet 7170 is oriented to produce a magnetic field that attracts the magnetic dynamic mass 7104. In the illustrated example, the south pole (S) of the ring magnet 7170 is oriented toward the north pole (N) of the magnetic dynamic mass 7104. The opposite poles of the dynamic ring magnet 7105 and the static ring magnet 7170 attract each other. In other examples, the static magnetic ring does not have any magnets and is made at least in part from a material that is attracted to magnetic fields (e.g., iron, cobalt, nickel, etc.).

The first extension spring 7108 includes a first spring proximal end 7110, a first spring distal end 7112, and a first spring length 7128 between the first spring proximal and distal ends 7110, 7112. The second extension spring 7114 includes a second spring proximal end 7116, a second spring distal end 7118, and a second spring length 7130 between the second spring proximal and distal ends 7116, 7118. The third extension spring 7146 includes a third spring proximal end 7148, a third spring distal end 7150, and a third spring length 7152 between the third spring proximal and distal ends 7148, 7150. The fourth extension spring 7154 includes a fourth spring proximal end 7156, a fourth spring distal end 7158, and a fourth spring length 7160 between the fourth spring proximal and distal ends 7156, 7158.

FIGS. 15A-15B illustrate the magnetic dynamic mass 7104 in different positions. The magnetic dynamic mass 7104 is free to translate in any radial direction with respect to the base 7102 in response to a vibration. Referring to FIG. 15A, the magnetic dynamic mass 7104 is in an equilibrium position relative to the base 7102. The extension springs 7108, 7114, 7146, and 7154 are positioned to resist radial translation of the magnetic dynamic mass 7104 away from the equilibrium position.

Comparing FIG. 15B to FIG. 15A, the magnetic dynamic mass 7104 has translated in a radial direction 7172 away from the equilibrium position. Translation of the magnetic dynamic mass 7104 in the radial direction 7172 away from the equilibrium position is resisted by tension in the second and fourth extension springs 7114, 7154 and aided by magnetic attraction between the static ring magnet 7170 and the dynamic ring magnet 7105 of the magnetic dynamic mass 7104.

The translation of the magnetic dynamic mass 7104 in the radial direction 7172 away from the equilibrium position increases the second and fourth spring lengths 7130, 7160 and stores tension in the second and fourth extension springs 7114, 7154. The tension in each of the second and fourth extension springs 7114, 7154 resists the translation of the magnetic dynamic mass 7104 in the radial direction 7172 and urges the magnetic dynamic mass 7104 toward the equilibrium position. Each of the first and third spring lengths 7128, 7152 is unchanged by the translation of the magnetic dynamic mass 7104 away from the equilibrium position in the radial direction 7172 since each of the first and third spring proximal ends 7110, 7148 is secured to the magnetic dynamic mass 7104 to act only in tension.

Referring to FIG. 15B, the tension in each of the second and fourth extension springs 7114, 7154 exerts a collective tensile force $F_t$ on the magnetic dynamic mass 7104 (in a direction opposite the radial direction 7172). The collective tensile force $F_t$ urges the magnetic dynamic mass 7104 toward the equilibrium position.

Translation of the magnetic dynamic mass 7104 in the radial direction 7172 away from the equilibrium position increases the magnetic attraction between the static ring magnet 7170 and the dynamic ring magnet 7105 of the magnetic dynamic mass 7104 by decreasing a distance therebetween. The magnetic attraction between the static ring magnet 7170 and the dynamic ring magnet 7105 of the magnetic dynamic mass 7104 exerts a magnetic force $F_m$ on the magnetic dynamic mass 7104 that opposes the collective tensile force $F_t$.

No matter the radial displacement of the magnetic dynamic mass 7104 away from the equilibrium position, the collective tensile force $F_t$ always exceeds the magnetic force $F_m$. Referring to FIGS. 15B and 15C, the magnetic force $F_m$ opposes and thereby softens the collective tensile force $F_t$. When the collective tensile force $F_t$ and magnetic force $F_m$ are added together, the resulting net spring force $F_n$ urges the magnetic dynamic mass 7104 toward the equilibrium position.

Figure 16:
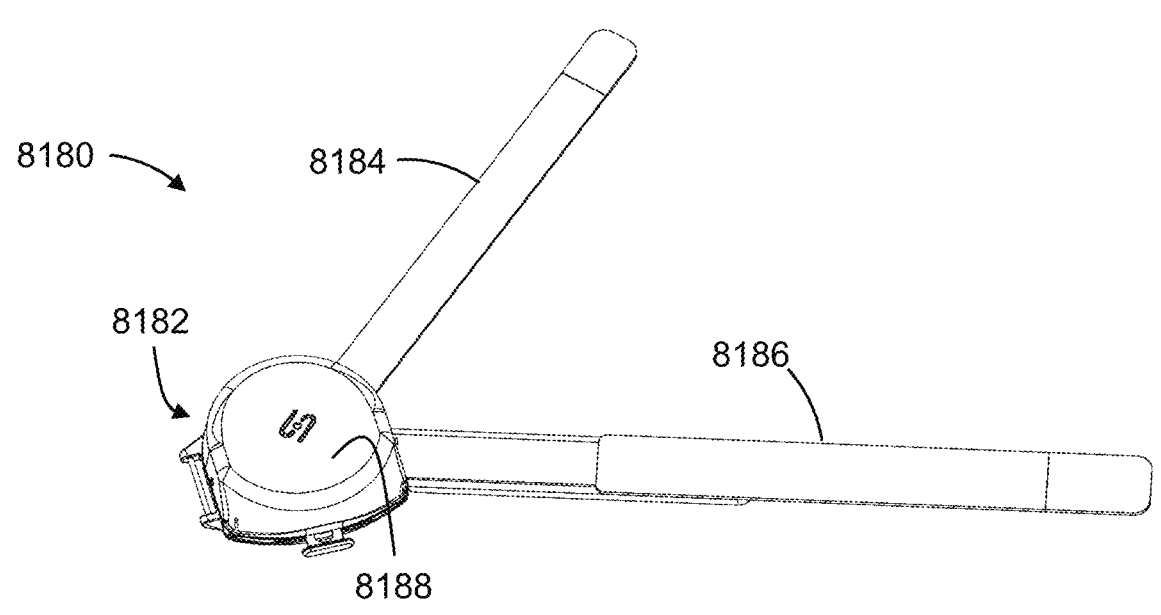
FIG. 16 is a top perspective view of an example tremor dampener which includes a vibration absorber according to aspects of the teaching disclosed herein.
Figure 17A:
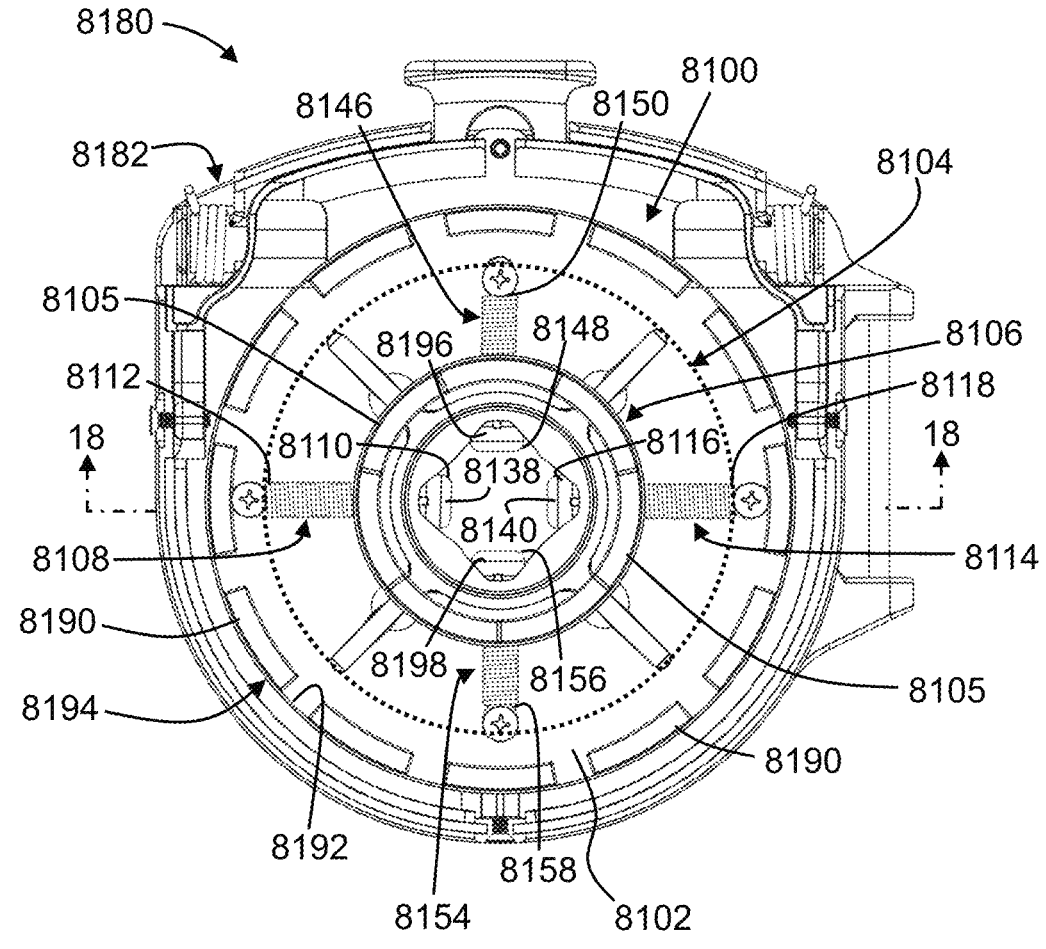
FIGS. 17A-17C are partial top views of the tremor dampener of FIG. 16, showing the magnetic dynamic mass of the vibration absorber in different positions.
Figure 17B:
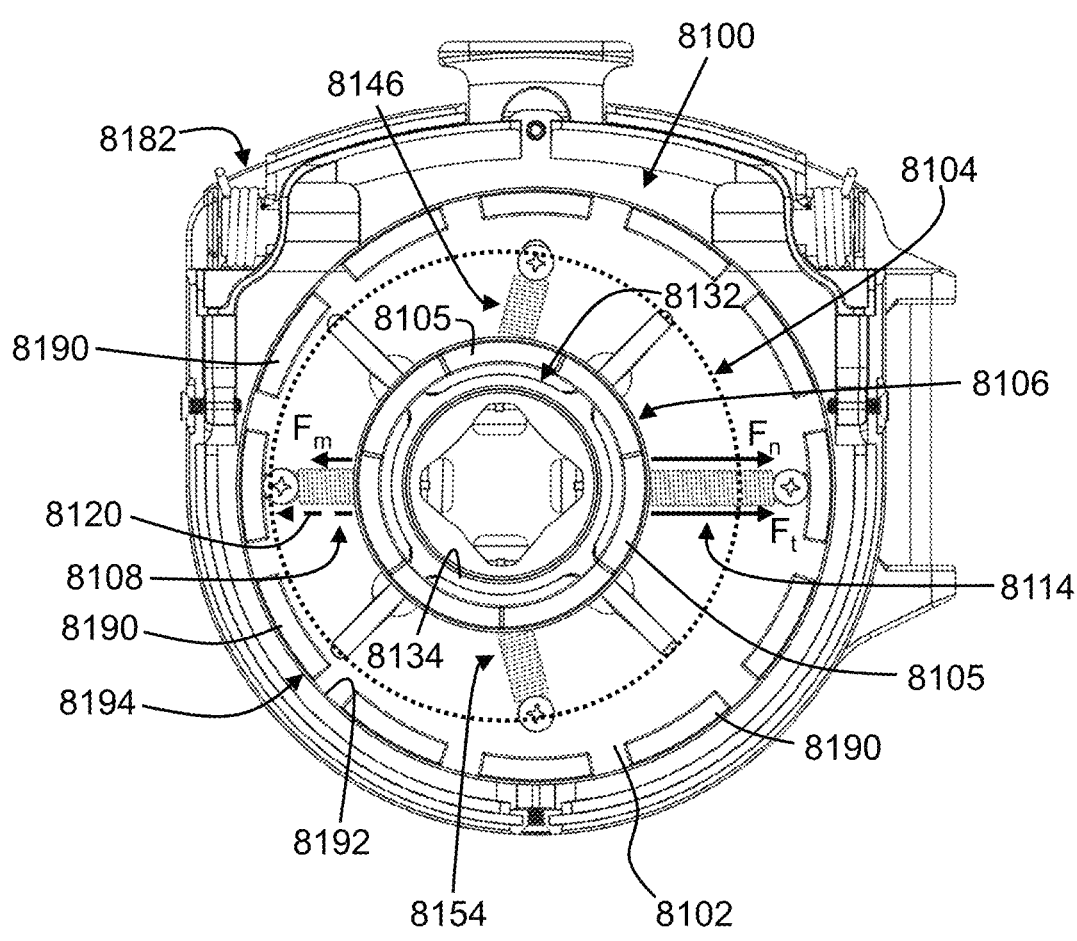
Figure 17C:
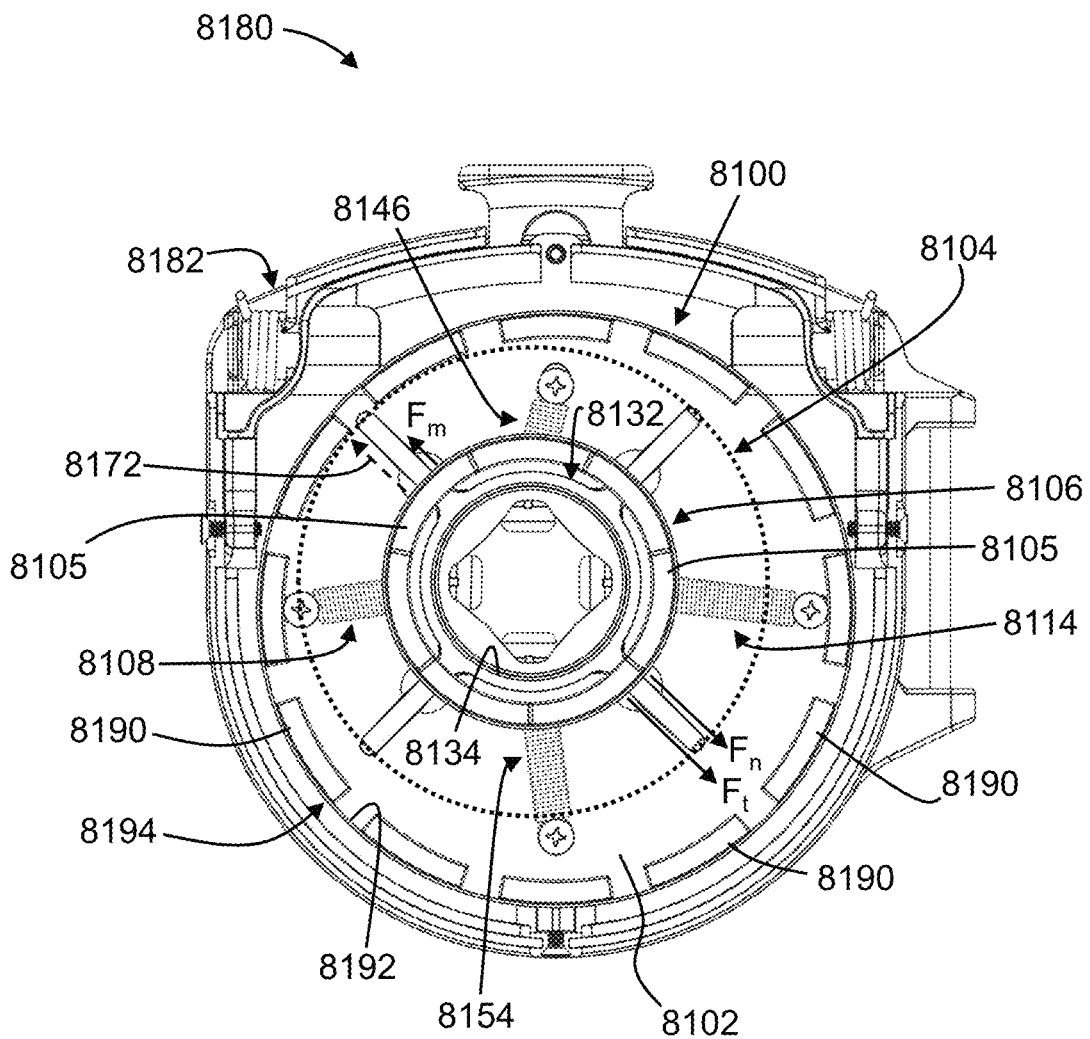
Figure 18:
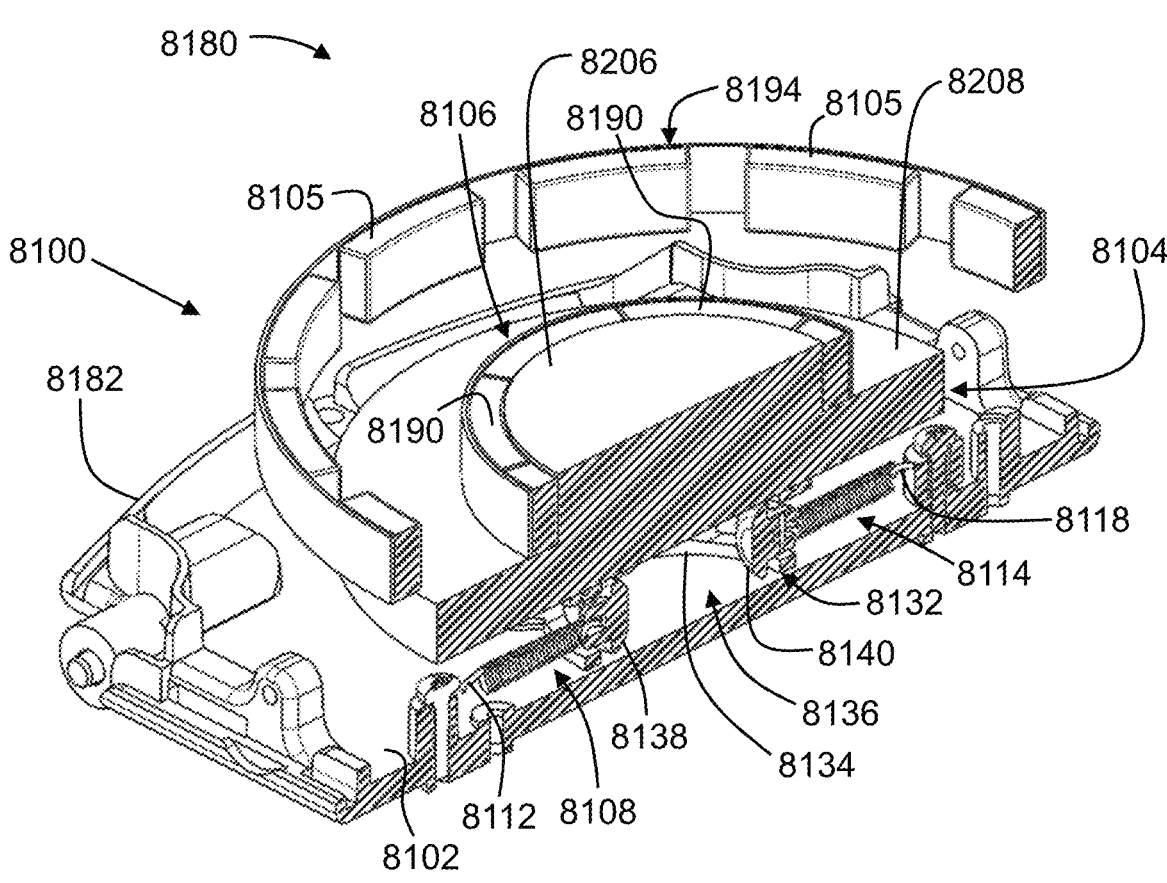
FIG. 18 is a partial cross-sectional view of the tremor dampener taken along line 18-18 of FIG. 17A.

Referring to FIGS. 16-18, a tremor dampener 8180 in accordance with aspects of the teaching disclosed herein includes a vibration absorber 8100. The vibration absorber 8100 has some similarity to the vibration absorber 7100 with like features identified by like reference characters, incremented by 1000. Referring to FIG. 17A-17C, the vibration absorber 8100 includes a base 8102, a magnetic dynamic mass 8104, and first, second, third and fourth extension springs 8108, 8114, 8146 and 8154. For clarity of illustration, the magnetic dynamic mass 8104 is shown partially in dash-dash broken lines in FIGS. 13A-13C.

Referring to FIG. 16, the tremor dampener 8180 includes a protective casing 8182 in which the vibration absorber 8100 is housed. The casing 8182 may help reduce the spread of magnetic fields emitted by the vibration absorber 8100 to the surrounding environment. This may reduce the risk that the tremor dampener 8180 may interfere with or damage electronic equipment (e.g. hard disk drives), cards with magnetic strips, pacemakers, and other articles/devices. In the illustrated example, the casing 8182 includes a removable lid 8188. The lid 8188 can be removed to facilitate maintenance and/or replacement of internal components. The lid 8188 is omitted in FIGS. 17A-17C for clarity of illustration. Referring to FIG. 18, the base 8102 is integral with the casing 8182 and forms a lower wall thereof. In other examples, the base 8102 is positioned on and optionally mounted to a lower wall of the casing 8182.

In the illustrated example, the tremor dampener 8180 further includes a pair of straps 8184, 8186 which extend outwardly from the casing 8182. The straps 8184, 8186 facilitate securing the tremor dampener 8180 to a body part (e.g., wrist, forearm, calf, ankle, etc.). In other examples, the tremor dampener does not have straps and is secured to a body part in different ways (e.g., the tremor dampener may be integrated into a glove).

Referring to FIG. 17A, the magnetic dynamic mass 8104 includes a plurality of dynamic magnets 8105 arranged circumferentially to form a magnetic ring portion 8106. In the illustrated example, the magnetic dynamic mass 8104 includes six dynamic magnets 8105; however, other examples may include more or less dynamic magnets.

The vibration absorber 8100 further includes a plurality of static magnets 8190 spaced circumferentially apart from one another. In the illustrated example, the vibration absorber 8100 includes twelve static magnets 8190; however, other examples may include more or less static magnets. Referring to FIG. 17A, the static magnets 8190 are affixed to the inside surface of a support ring 8192 and collectively form a magnetic static ring 8194. In some examples, the magnetic static ring 8194 is affixed to an underside surface of the lid 8188 (FIG. 16). In other examples, the magnetic static ring 8194 is affixed to another part of the casing 8182 or the base 8102.

The dynamic and static magnets 8105, 8190 are oriented in attraction (i.e., the magnetic fields produced attract each another). Opposite poles attract. In some examples, the north poles of the dynamic magnets 8105 face the south poles of the static magnets 8190. In other examples, the south poles of the dynamic magnets 8105 face the north poles of the static magnets 8190.

The first extension spring 8108 includes a first spring proximal end 8110 and a first spring distal end 8112. The second extension spring 8114 includes a second spring proximal end 8116 and a second spring distal end 8118. The third extension spring 8146 includes a third spring proximal end 8148 and a third spring distal end 8150. The fourth extension spring 8154 includes a fourth spring proximal end 8156 and a fourth spring distal end 8158.

In the example illustrated, each of the first, second, third and fourth spring distal ends 8112, 8118, 8150, 8158 are secured to the base 8102. In other examples, one or more of the first, second, third and fourth spring distal ends 8112, 8118, 8150, 8158 are secured to the casing 8182 or the magnetic static ring 8194.

FIGS. 17A-17C illustrate the magnetic dynamic mass 8104 in different positions. The magnetic dynamic mass 8104 is free to translate in any radial direction with respect to the base 8102 in response to a vibration. Referring to FIG. 17A, the magnetic dynamic mass 8104 is in an equilibrium position relative to the base 8102. The extension springs 8108, 8114, 8146, and 8154 are positioned to resist radial translation of the magnetic dynamic mass 8104 away from the equilibrium position.

Comparing FIG. 17B to FIG. 17A, the magnetic dynamic mass 8104 has translated in a first direction 8120 away from the equilibrium position. Translation of the magnetic dynamic mass 8104 in the first direction 8120 away from the equilibrium position is resisted by tension in the second extension spring 8114 and aided by magnetic attraction between the magnetic static ring 8194 and the magnetic dynamic mass 8104. The translation of the magnetic dynamic mass 8104 in the first direction 8120 away from the equilibrium position increases the length of the second extension spring 8114 and stores tension in the second extension spring 8114. The tension in the second extension spring 8114 resists the translation of the magnetic dynamic mass 8104 in the first direction 8120 and urges the magnetic dynamic mass 8104 toward the equilibrium position.

Referring to FIG. 17B, the tension in the second extension spring 8114 exerts a tensile force $F_t$ on the magnetic dynamic mass 8104 (in a direction opposite the first direction 8120). The tensile force $F_t$ urges the magnetic dynamic mass 8104 toward the equilibrium position.

Translation of the magnetic dynamic mass 8104 in the first direction 8120 away from the equilibrium position increases the magnetic attraction between the magnetic static ring 8194 and the magnetic ring portion 8106 of the magnetic dynamic mass 8104 by decreasing a distance therebetween. The magnetic attraction between the magnetic static ring 8194 and the magnetic ring portion 6106 of the magnetic dynamic mass 8104 exerts a magnetic force $F_m$ on the magnetic dynamic mass 6104 that softens the tensile force $F_t$.

Comparing FIG. 17C to FIG. 17A, the magnetic dynamic mass 8104 has translated in a radial direction 8172 away from the equilibrium position. Translation of the magnetic dynamic mass 8104 in the radial direction 8172 away from the equilibrium position is resisted by tension in the second and fourth extension springs 8114, 8154 and aided by magnetic attraction between the magnetic static ring 8194 and the magnetic dynamic mass 8104.

The translation of the magnetic dynamic mass 8104 in the radial direction 8172 away from the equilibrium position increases the length of each of the second and fourth extension springs 8114, 8154 and stores tension in the second and fourth extension springs 8114, 8154. The tension in each of the second and fourth extension springs 8114, 8154 resists the translation of the magnetic dynamic mass 8104 in the radial direction 8172 and urges the magnetic dynamic mass 8104 toward the equilibrium position.

Referring to FIG. 17C, the tension in each of the second and fourth extension springs 8114, 8154 exerts a collective tensile force $F_t$ on the magnetic dynamic mass 8104 (in a direction opposite the radial direction 8172). The collective tensile force $F_t$ urges the magnetic dynamic mass 8104 toward the equilibrium position.

Translation of the magnetic dynamic mass 8104 in the radial direction 8172 away from the equilibrium position increases the magnetic attraction between the magnetic static ring 8194 and the magnetic ring portion 8106 of the magnetic dynamic mass 8104 by decreasing a distance therebetween. The magnetic attraction between the magnetic static ring 8194 and the magnetic ring portion 8106 of the magnetic dynamic mass 8104 exerts a magnetic force $F_m$ on the magnetic dynamic mass 8104 that opposes the collective tensile force $F_t$.

No matter the displacement of the magnetic dynamic mass 8104 away from the equilibrium position, the tensile force $F_t$ always exceeds the magnetic force $F_m$. Referring to FIGS. 17B and 17C, the magnetic force $F_m$ opposes and thereby softens the tensile force $F_t$. When the tensile force $F_t$ and magnetic force $F_m$ are added together, the resulting net spring force $F_n$ urges the magnetic dynamic mass 8104 toward the equilibrium position.

Figure 19:
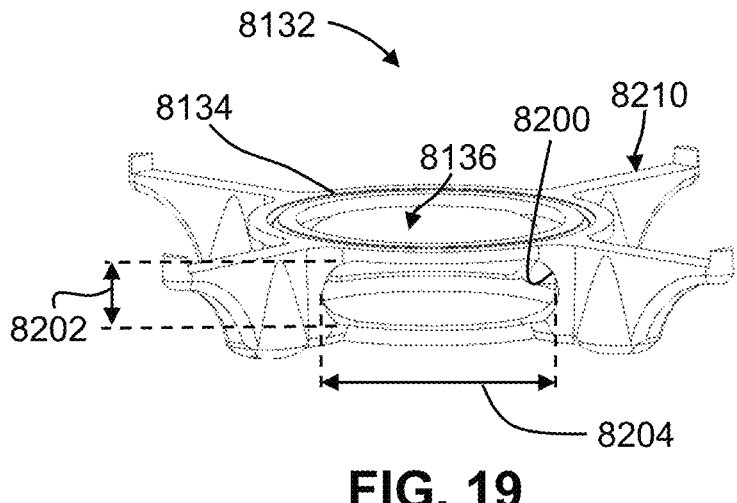
FIG. 19 is a perspective view of the spring mount used in the tremor dampener of FIG. 16.

With reference to FIGS. 17A, 18 and 19, the magnetic dynamic mass 8104 includes a spring mount 8132 to facilitate connection of the first, second, third and fourth spring proximal ends 8110, 8116, 8148 and 8156. Each of the first, second, third and fourth extension springs 8108, 8114, 8146 and 8154 are secured to the magnetic dynamic mass 8104 to act only in tension. In the example illustrated, the spring mount 8132 includes a cage 8134 for securing the first, second, third and fourth spring proximal ends 8110, 8116, 8148 and 8156 to the magnetic dynamic mass 8104 so that the first, second, third and fourth extension springs 8108, 8114, 8146 and 8154 only act in tension. Each of the first, second, third and fourth spring proximal ends 8110, 8116 has a respective head 8138, 8140, 8196 and 8198 that is trapped within the cage 8134. The cage 8134 has a plurality of slots 8200 in communication with an interior cage cavity 8136. The heads 8138, 8140, 8196, and 8198 are free to move within the interior cage cavity 8136 during translation of the dynamic mass 8104. However, the slots 8200 are sized to prevent egress of a respective one of the heads 8138, 8140, 8196, and 8198 from the interior cage cavity 8136, and thereby prevent disconnection of the respective spring proximal end 8110, 8116, 8148 and 8156 from the spring mount 8132.

Referring to FIG. 19, each slot 8200 has a slot height 8202 that is smaller than the diameter of the heads 8138, 8140, 8196, and 8198 of the springs. Each slot 8200 has a width 8204 sufficient to allow for some lateral translation of the spring proximal end 8110, 8116, 8148 and 8156 as the magnetic dynamic mass 8104 is radially translated (e.g., see FIG. 17C).

Referring to FIG. 18, in the example illustrated, the magnetic dynamic mass 8104 includes first and second mass portions 8206, 8208. Each of the first and second mass portions 8206, 8208 are circular in shape, with the first mass portion 8206 having a smaller diameter than the second mass portion 8208. In the illustrated example, the static magnetic ring 8106 surrounds the first mass portion 8206. In the example illustrated, the cage 8134 has multiple arms that collectively define a mass support platform 8210 (FIG. 19). In use, the second mass portion 8208 sits on the platform 8210.

Figure 20:
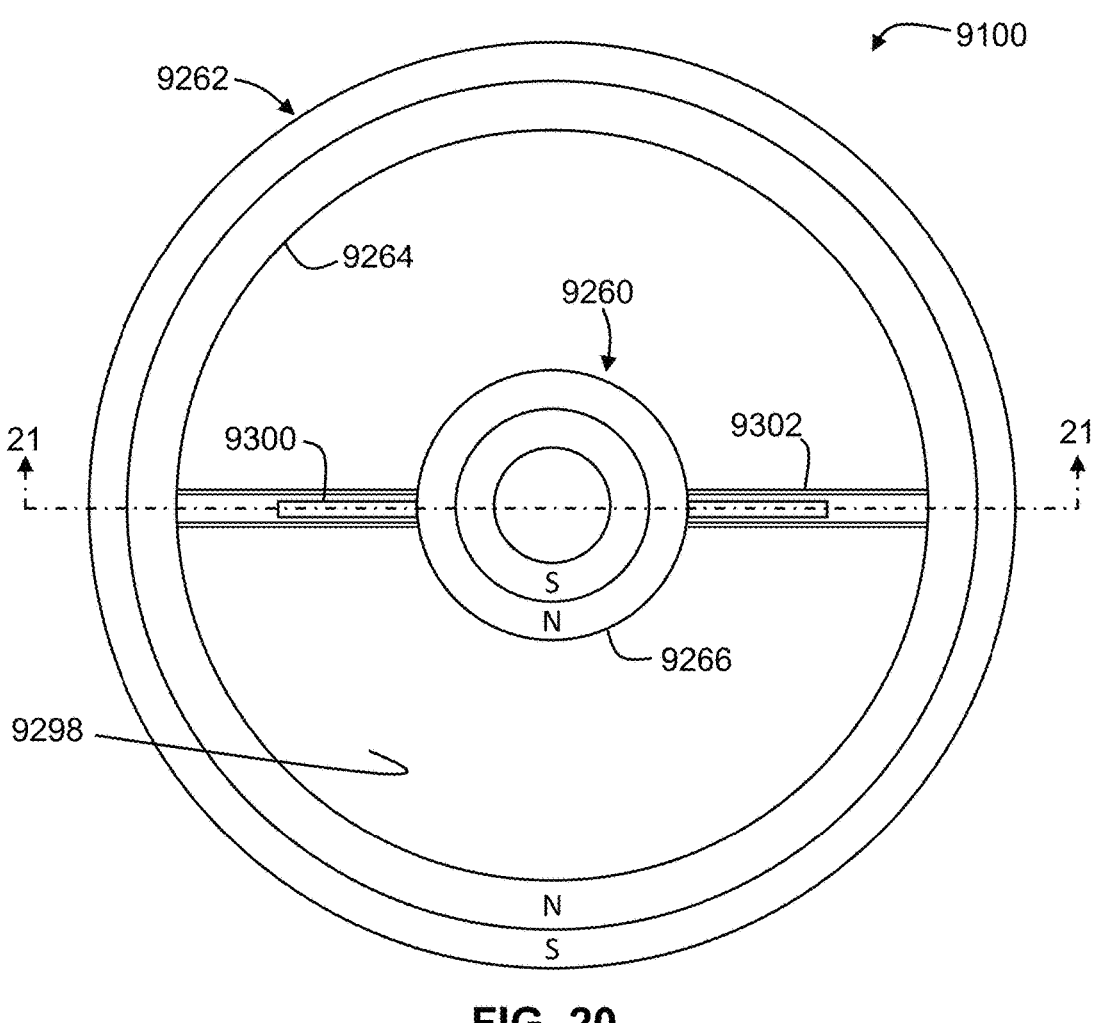
FIG. 20 is a bottom view of an example dynamically tuned vibration absorber according to aspects of the teaching disclosed herein.
Figure 21A:
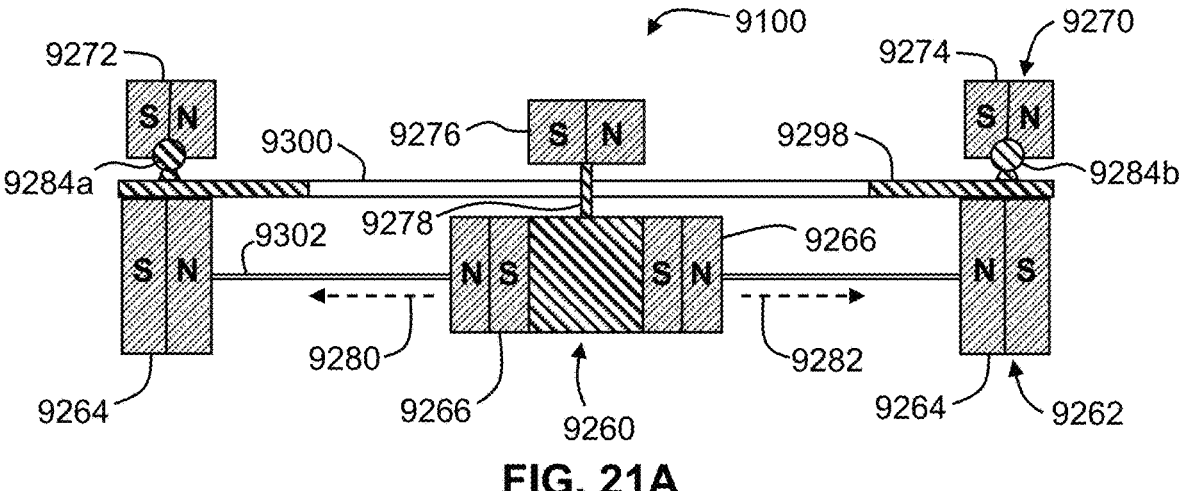
FIG. 21A is a cross-sectional view of the dynamically tuned vibration absorber taken along line 21-21 of FIG. 20.
Figures 21B, 21C, 21D:
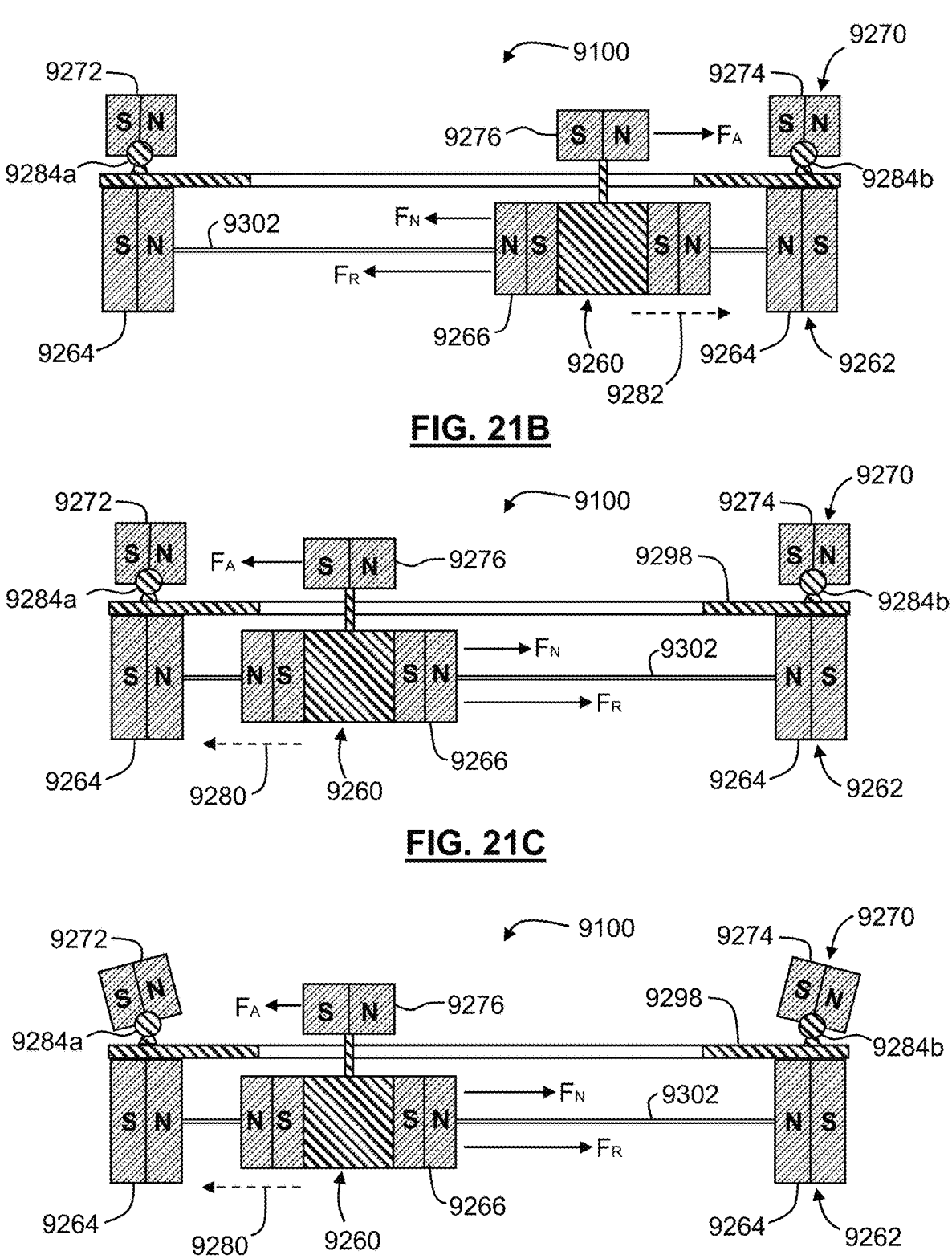
FIG. 21B is a cross-sectional view of the dynamically tuned vibration absorber of FIG. 20, showing the magnetic dynamic mass of the vibration absorber translated away from its equilibrium position.
FIGS. 21C and 21D are cross-sectional views of the dynamically tuned vibration absorber of FIG. 20, showing the magnetic dynamic mass of the vibration absorber translated away from the equilibrium position in the same direction but with the magnets of the dynamically variable magnetic system in different positions.

Reference is now made to FIGS. 20-21D, which illustrates an example dynamically tuned vibration absorber 9100 in accordance with aspects of the teaching disclosed herein. The vibration absorber 9100 includes a magnetic dynamic mass 9260 having an equilibrium position. The magnetic dynamic mass 9260 translates away from the equilibrium position in response to vibrations experienced by an object to which the vibration absorber 9100 is secured. As will described in more detail subsequently herein, the vibration absorber 9100 includes features that allow for dynamic tuning in response to changes in vibration frequency of the object to which the vibration absorber 9100 is secured.

The vibration absorber 9100 is securable to any object that experiences unwanted vibrations (e.g., limbs of those with Parkinson's disease, washing machines, robotic arms, etc.). The vibration absorber 9100 can be secured to the object in any manner that provides a rigid, non-slip, connection therebetween (e.g., with screws, clamps, adhesive, straps, or a combination thereof). In other examples, the vibration absorber 9100 is integrally formed with the object. In use, the magnetic dynamic mass 9620 translates in a direction opposite to that of the vibration. Resistance to this translation of the magnetic dynamic mass 9260 acts to absorb the vibration and thereby lessen its amplitude.

The term "magnetic", as used in connection with the magnetic dynamic mass 9260 means that this element includes at least one magnet (permanent or otherwise) and/or is made at least in part from a material that is attracted to magnetic fields (e.g., iron, nickel, cobalt, etc.). In some examples, the magnetic dynamic mass 9260 comprises a dense metal (e.g., having a density greater than 6 g/cm$^3$), such as a tungsten alloy (e.g., 80% or more tungsten, and the remainder is other metal(s) such as nickel, copper, or iron).

The vibration absorber 9100 includes a repulsive magnetic system 9262 having one or more repulsive magnetic elements positioned to resist translation of the magnetic dynamic mass 9260 away from the equilibrium position by magnetic repulsion. In the example illustrated, the one or more repulsive magnetic elements include an outer ring magnet 9264 and the magnetic dynamic mass 9260 includes an inner ring magnet 9266 positioned within and oriented in repulsion to the outer ring magnet 9264. The translation of the magnetic dynamic 9260 mass away from the equilibrium position is resisted by magnetic repulsion between the outer ring magnet 9264 of the repulsive magnetic system 9262 and the inner ring magnet 9266 of the magnetic dynamic mass 9260.

Each of the outer and inner ring magnets 9264 and 9266 is oriented to produce a magnetic field that repels the other. In the illustrated example, the north pole (N) of the outer ring magnet 9264 is oriented toward the north pole (N) of the inner ring magnet 9266. In an alternative example, the south pole of the outer ring magnet 9264 is oriented toward the south pole of the inner ring magnet 9266.

In the illustrated example, the inner ring magnet 9266 surrounds a central body 9268 of the magnetic dynamic mass 9260. In other examples, the magnetic dynamic mass 9260 does not have a central body. In the illustrated example, the outer ring magnet 9264 of the repulsive magnetic system 9262 may serve as a base for bearing against the surface of the object to which the vibration absorber 9100.

The vibration absorber 9100 also includes an attractive magnetic system 9270 having one or more attractive magnetic elements. In contrast to the one or more repulsive magnetic elements of the repulsive magnetic system 9262, the one or more attractive magnetic elements are positioned to aid the translation of the magnetic dynamic mass 9260 away from the equilibrium position by magnetic attraction.

In the example illustrated, the one or more attractive magnetic elements include first and second attractive magnetic elements 9272, 9274, and the magnetic dynamic mass 9260 includes a dynamic magnetic element 9276 positioned between the first and second attractive magnetic elements 9272, 9274. The dynamic magnetic element 9276 can be connected to the magnetic dynamic mass 2260 in any suitable manner (e.g., adhesive, one or more mechanical fasteners, etc.). In the illustrated example, the dynamic magnetic element 9276 is connected to the central body 9268 of the magnetic dynamic mass 2260 by a linking rod 9278. The rod 9278 separates the dynamic magnetic element 9276 from the inner ring magnet 9266 and can limit unwanted magnetic interactions therebetween.

The first attractive magnetic element 9272 is positioned away from the dynamic magnetic element 9276 in a first direction 9280 and the second attractive magnetic element 9274 is positioned away from the dynamic magnetic element 9276 in a second direction 9282 opposite the first direction 9280. Translation of the magnetic dynamic 9260 mass away from the equilibrium position in the first direction 9280 is aided by magnetic attraction between the first attractive magnetic element 9272 of the attractive magnetic system 9270 and the dynamic magnetic element 9276 of the magnetic dynamic mass 9260. Translation of the magnetic dynamic 9260 mass away from the equilibrium position in the second direction 9282 is aided by magnetic attraction between the second attractive magnetic element 9274 of the attractive magnetic system 9270 and the dynamic magnetic element 9276 of the magnetic dynamic mass 9260.

In the illustrated example, each of the first attractive magnetic element 9272, the second attractive magnetic element 9274 and the dynamic magnetic element 9276 is a magnet. Each of the first and second attractive magnets 9272, 9274 of the attractive magnetic system 9270 is oriented to produce a magnetic field that attracts the magnetic field produced by the dynamic magnet 9276 of the magnetic dynamic mass 9260. In the illustrated example, the north pole (N) of the first attractive magnet 9270 is oriented toward the south pole (S) of the dynamic magnet 9276 and the south pole (S) of the second attractive magnet 9274 is oriented toward the north pole (N) of the dynamic magnet 9276. In an alternative example, the south pole of the first attractive magnet 9272 is oriented toward the north pole of the dynamic magnet 9276 and the north pole of the second attractive magnet 9274 is oriented toward the south pole of the dynamic magnet 9276.

In other examples, each of the first and second attractive magnetic elements 9272, 9274 is a magnet and the dynamic magnetic element 9276 is not a magnet. In such an example, the dynamic magnetic element 9276 is formed at least in part from a material that is attracted to magnetic fields (e.g., iron, cobalt, nickel, etc.). Alternatively, the dynamic magnetic element 9276 is a magnet and the each of the first and second attractive magnetic elements 9272, 9274 are not magnets. In such an example, each of the first and second attractive magnetic elements 9272, 9274 is made at least in part from a material that is attracted to magnetic fields (e.g., iron, cobalt, nickel, etc.).

FIGS. 21A-21C illustrate the magnetic dynamic mass 9260 in different positions. Referring to FIG. 21A, the magnetic dynamic mass 9260 is in an equilibrium position. In the equilibrium position, the forces acting on the magnetic dynamic mass 9260 are balanced (i.e., no net force in any direction).

Comparing FIG. 21B to FIG. 21A, the magnetic dynamic mass 9260 has translated in the second direction 9282 away from the equilibrium position. Translation of the magnetic dynamic mass 9260 in the second direction 9282 away from the equilibrium position is i) resisted by magnetic repulsion between the outer ring magnet 9264 of the magnetic repulsive system 9262 and the inner ring magnet 9266 of the magnetic dynamic mass 9260 and ii) aided by magnetic attraction between the second attractive magnet 9274 of the attractive magnetic system 9270 and the dynamic magnet 9276 of the magnetic dynamic mass 9260.

Referring to FIG. 21B, the magnetic repulsion between the outer ring magnet 9264 and the inner ring magnet 9266 exerts a magnetic repulsive force $F_R$ on the magnetic dynamic mass 9260 in a direction opposite the second direction 9282. The magnetic repulsive force $F_R$ urges the magnetic dynamic mass 9260 toward the equilibrium position. The magnetic attraction between the second attractive magnet 9274 and the dynamic magnet 9276 exerts a magnetic attractive force $F_A$ on the magnetic dynamic mass 9260 in the second direction 9282. Accordingly, the magnetic attractive force $F_A$ urges the translation of the magnetic dynamic mass 9260 in the second direction 9282 away from the equilibrium position (i.e., opposes the magnetic repulsive force $F_R$).

Comparing FIG. 21C to FIG. 21A, the magnetic dynamic mass 9260 has translated in the first direction 9280 away from the equilibrium position. Translation of the magnetic dynamic mass 9260 in the first direction 9280 away from the equilibrium position is i) resisted by magnetic repulsion between the outer ring magnet 9264 of the magnetic repulsive system 9262 and the inner ring magnet 9266 of the magnetic dynamic mass 9260 and ii) aided by magnetic attraction between the first attractive magnet 9272 of the attractive magnetic system 9270 and the dynamic magnet 9276 of the magnetic dynamic mass 9260.

Referring to FIG. 21C, the magnetic repulsion between the outer ring magnet 9264 and the inner ring magnet 9266 exerts a magnetic repulsive force $F_R$ on the magnetic dynamic mass 9260 in a direction opposite the first direction 9280. The magnetic repulsive force $F_R$ urges the magnetic dynamic mass 9260 toward the equilibrium position. The magnetic attraction between the first attractive magnet 9272 and the dynamic magnet 9276 exerts a magnetic attractive force $F_A$ on the magnetic dynamic mass 9260 in the first direction 9280. Accordingly, the magnetic attractive force $F_A$ urges the translation of the magnetic dynamic mass 9260 in the first direction 9280 away from the equilibrium position (i.e., opposes the magnetic repulsive force $F_R$).

Translation of the magnetic dynamic mass 9260 away from the equilibrium position increases the magnetic repulsive force $F_R$ exerted on the magnetic dynamic mass 9260 by decreasing a distance between the outer ring magnet 9264 of the repulsive magnetic system 9262 and the inner ring magnet 9266 of the magnetic dynamic mass 9260. The magnetic repulsive force $F_R$ increases non-linearly (e.g., accelerating, exponential, etc.) as the distance between the outer ring magnet 9264 and the inner ring magnet 9266 decreases. In this way, the magnetic repulsive force $F_R$ exerted on the magnetic dynamic mass 9260 increases non-linearly with displacement of the magnetic dynamic mass 9260 away from the equilibrium position.

Translation of the magnetic dynamic mass 9260 away from the equilibrium position increases the magnetic attractive force $F_A$ exerted on the magnetic dynamic mass 9260. Translation of the magnetic dynamic mass 9260 in the first direction 9280 decreases a distance between the first attractive magnet 9272 of the attractive magnetic system 9270 and the dynamic magnet 9276 of the magnetic dynamic mass 9260. Similarly, translation of the magnetic dynamic mass 9260 in the second direction 9282 decreases a distance between the second attractive magnet 9274 of the attractive magnetic system 9270 and the dynamic magnet 9276 of the magnetic dynamic mass 9260. The magnetic attractive force $F_A$ increases non-linearly (e.g., accelerating exponentially, etc.) as the distance between the dynamic magnet 9274 and a corresponding one of the first and second attractive magnets 2272, 2274 decreases. In this way, the magnetic attractive force $F_A$ exerted on the magnetic dynamic mass 9260 increases non-linearly with displacement of the magnetic dynamic mass 9260 away from the equilibrium position.

Referring to FIGS. 21B and 21C, the magnetic attractive force $F_A$ opposes the magnetic repulsive force $F_R$. No matter the displacement of the magnetic dynamic mass 9260 away from the equilibrium position, the magnetic repulsive force $F_R$ always exceeds the magnetic attractive force $F_A$. Accordingly, when the magnetic repulsive force $F_R$ and magnetic attractive force $F_A$ are summed, a net repulsive force $F_N$ resists translation of the magnetic dynamic mass 9260 away from the equilibrium position (i.e., the net repulsive force $F_N$ urges the magnetic dynamic mass 9260 toward the equilibrium position).

Figure 22A:
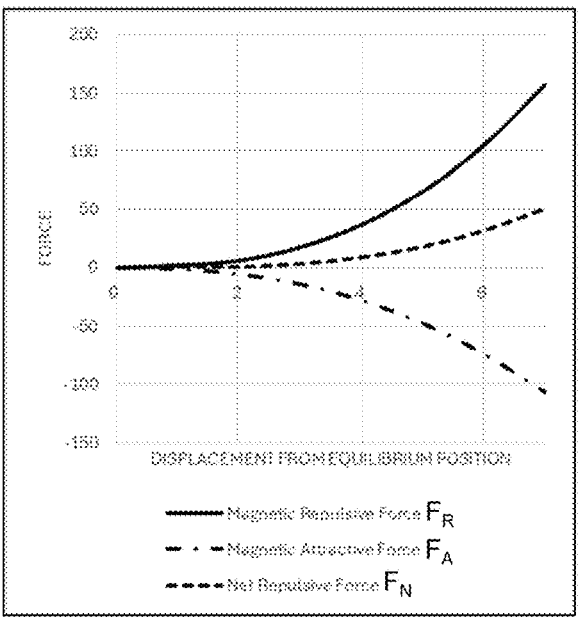
FIGS. 22A and 22B are graphical illustrations plotting the magnetic forces exerted on the magnetic dynamic mass of the vibration absorber of FIGS. 20-21D against displacement of the magnetic dynamic mass away from its equilibrium position.

The net repulsive force $F_N$ increases generally linearly with displacement of the magnetic dynamic mass 9260 from the equilibrium position. The graphical illustration of FIG. 22A plots magnetic force (y-axis) against displacement of the magnetic dynamic mass from the equilibrium position (x-axis) for the vibration absorber 9100. Combing the magnetic repulsive force $F_R$ curve and the magnetic attractive force $F_A$ curve produces a net repulsive force $F_N$ line that increases generally linearly with displacement from the equilibrium position.

Referring again to FIGS. 21A-21C, at least one of the repulsive and attractive magnetic systems 9262, 9270 is a dynamically variable magnetic system that allows for fine-tuned adjustments of overall system resistance. The dynamically variable magnetic system includes at least one field manipulation actuator 9284 coupled to the one or more magnetic elements of the dynamically variable magnetic system. When activated, the field manipulation actuator 9284 moves the one or more magnetic elements of the dynamically variable magnetic system to adjust the net magnetic repulsive force $F_N$ that resists translation of the magnetic dynamic mass 9260 away from the equilibrium position.

Figure 23:
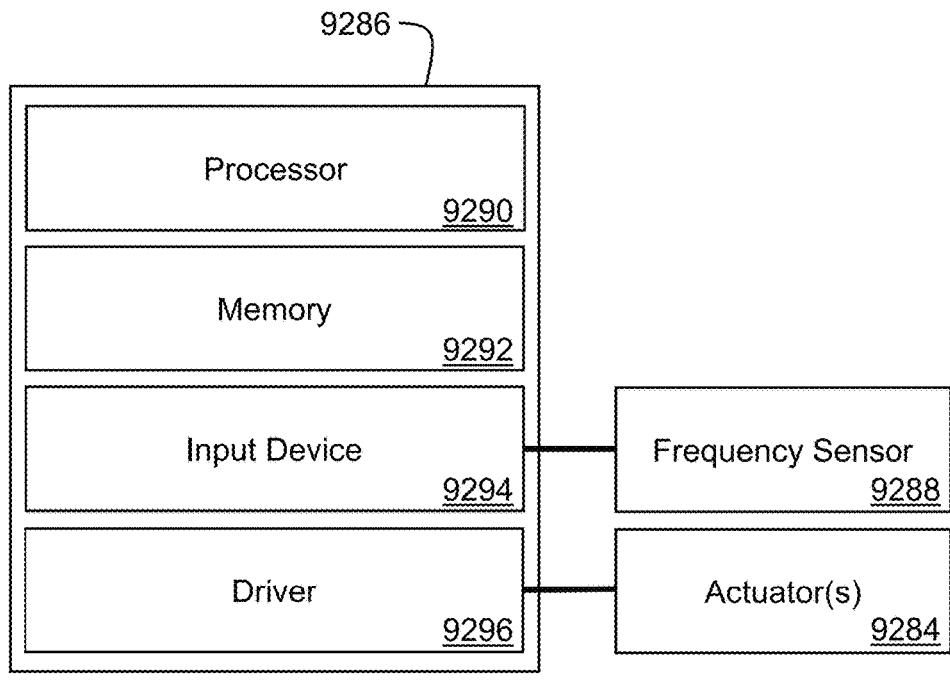
FIG. 23 is a schematic illustration of an electronic control device of the vibration absorber of FIGS. 20A-21D shown communicatively coupled to a frequency sensor and a field manipulation actuator.

The field manipulation actuator 9284 can any device suitable to move the one or more magnetic elements of the dynamically variable magnetic system relative to the magnetic dynamic mass 9260 when activated by an actuator driver 9296 (see FIG. 23). The actuator 9284 may include an electrically powered or electrically activated prime mover (i.e., source of motive power). For example, the actuator 9284 may include an electric motor (e.g., to drive a linear actuator, such as a leadscrew actuator), a solenoid (e.g., to provide linear motion directly, or a pump (e.g., to move fluid for activating a piston cylinder). Alternatively, or in addition, the actuator 9284 may be fluidly powered or fluidly activated. For example, the actuator 9284 may include a hydraulic or pneumatic device (e.g., a piston cylinder). Optionally, the actuator 9284 may include a mechanical transmission which may alter the directional characteristic of the prime mover (e.g., convert rotary to linear movement or vice versa), and/or provide mechanical advantage (e.g., multiply output force or torque). For example, the actuator 9284 may include one or more of gears, belts, screws, bar linkages, racks, or levers.

In the illustrated example, the attractive magnetic system 9270 is a dynamically variable magnetic system. In this example, the net repulsive force $F_N$ is adjusted by varying the attractive magnetic force $F_A$ exerted on the magnetic dynamic mass 9260. In other examples, the repulsive magnetic system 9262 is the dynamically variable magnetic system. In some examples, each of the repulsive and attractive magnetic systems 9262, 9270 is a dynamically variable magnetic system.

In the illustrated example, the field manipulation actuator 9284 includes a first rotary actuator 9284a coupled to the first attractive magnet 9272 of the attractive magnetic system 9270 and a second rotary actuator 9284b coupled to the second attractive magnet 9274 of the magnetic attractive system 9270. The first rotary actuator 9284a is operable to rotate the first attractive magnet 9282 relative to the magnetic dynamic mass 9260. Likewise, the second rotary actuator 9284b is operable to rotate the second attractive magnet 9274 relative to the magnetic dynamic mass 9260. Each rotary actuator 9284a, 9284b may include a servo motor to provide for precise control of angular position of the respective one of the first and second attractive magnets 9272, 9274.

Rotating the first and second attractive magnets 9272, 9274 relative to the magnetic dynamic mass 9260 changes an angle at which the magnetic field produced by each of the first and second attractive magnets 9272, 9274 is directed toward the dynamic magnet 9276 of the magnetic dynamic mass 9260. Comparing FIG. 21D to 21C, the first and second attractive magnets 9272, 9274 of the magnetic attractive system 9270 have been rotated counterclockwise and clockwise, respectively. This rotation angles the magnetic fields produced by the first and second attractive magnets 9272, 9274 away from the magnetic field produced by the dynamic magnet 9276 of the magnetic dynamic mass 9260 and causes a reduction in the attractive force $F_A$ exerted on the magnetic dynamic mass 9260 in FIG. 21D relative to FIG. 21C.

Figure 22B:
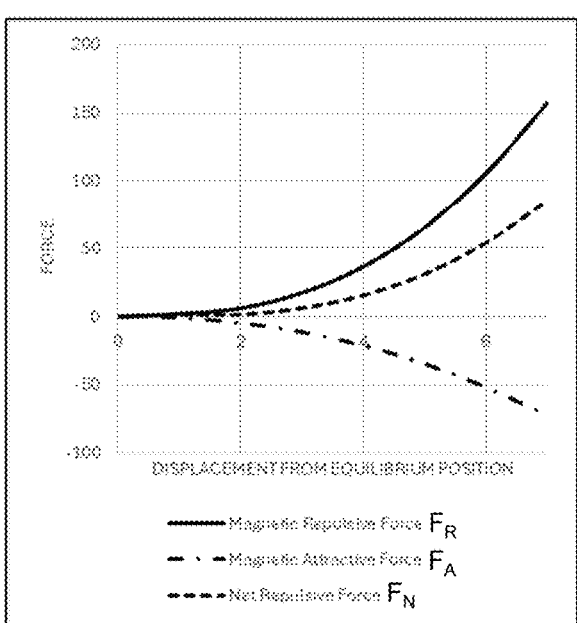

The graphical illustrations of FIGS. 22A and 22B illustrate the change in the attractive magnetic force $F_A$ caused by rotating the first and second attractive magnets 9272, 9274 from their position in FIG. 21C to their position in FIG. 21D. Comparing FIG. 22B to FIG. 22A, the slope of the net repulsive force line has increased. All else being equal, the further that the magnetic fields produced by first and second attractive magnets 9272, 9274 are angled away from the magnetic dynamic mass 9260, the greater the reduction in the attractive magnetic force $F_A$. Reducing the magnetic attractive force $F_A$ increases the net repulsive force $F_N$ exerted on the magnetic dynamic mass 9260 at a given displacement from the equilibrium position. Conversely, increasing the magnetic attractive force $F_A$ decreases the net repulsive force $F_N$ exerted on the magnetic dynamic mass 9260 at a given displacement from the equilibrium position.

In many cases, objects do not vibrate at one constant frequency. Objects may vibrate at different frequencies at different times. As an example, a washing machine may vibrate at 5 Hz during a wash cycle and then vibrate at 10 Hz during a rinse cycle. As another example, a loudspeaker may continuously vibrate at different frequencies over the course of a single song. The ability to vary the net repulsive force $F_N$ allows the vibration absorber 9100 to be "re-tuned" via the dynamically variable magnetic system in response to a change in the vibration frequency of the object to which the vibration absorber 9100 is secured. The performance degradation normally associated with frequency variations for tuned vibration absorbers is averted by the ability to dynamically tune the vibration absorber 9100 in response to these frequency variations.

Reference is made to FIG. 23, which shows a schematic illustration of an example electronic control device 9286 of the vibration absorber 9100. In some examples, the electronic control device 9286 may include a connection with a network, such as, a wired or wireless connection to the Internet or to a private network. In some examples, the network includes other types of computer or telecommunication networks.

The schematic of FIG. 23 illustrates the connection of the electronic control device 9286 to the field manipulation actuator(s) 9284 and a frequency sensor 9288. The frequency sensor 9288 is positioned to measure a vibration frequency of an object to which the vibration absorber 9100 is secured. The frequency sensor 9288 can be any device capable of measuring vibration frequency of an object to which it coupled. In some examples, the frequency sensor 9288 is an inertial measurement unit (IMU). In some examples, the frequency sensor 9288 is onboard the vibration absorber 9100. Alternatively, the frequency sensor 9288 is remote from the vibration absorber 9100 and affixed to the object in a location where vibration frequency is conveniently measured.

In the example illustrated, the electronic control device 9286 includes a processor 9290, a memory 9292, an input device 9294, and a driver 9296. Each of the memory 9292, the input device 9294, and the driver 9296 are communicatively coupled to the processor 9290, directly or indirectly. In some examples, the electronic control device 9286 includes multiple of any one or more of the processor 9290, the memory 9292, the input device 9294, and the driver 9296. In some examples, the electronic control device 9286 does not include one or more of the memory 9292, the input device 9294, and the driver 9296. For example, the electronic control device 9286 may not include the memory 9292, and/or may not include the input device 9294, and/or may not include the driver 9296.

In some examples, the electronic control device 9286 is a single, unitary device that houses all its subcomponents (the processor 9290, the memory 9292, etc.). In other examples, the electronic control device 9286 is composed of two or more discrete sub-devices that are communicatively coupled to each other, that collectively include all the subcomponents of the electronic control device 9286 (the processor 9290, the memory 9292, etc.), and that collectively provide the functionality described herein.

The memory 9292 can include random access memory (RAM), read only memory (ROM), or similar types of memory. Also, in some examples, the memory 9292 stores one or more applications for execution by the processor 9290. Applications correspond with software modules including computer executable instructions to perform processing for the functions and methods described below. In some examples, some or all the memory 9292 may be integrated with the processor 9290. For example, the processor 9290 may be a microcontroller (e.g. Microchip™ AVR, Microchip™ PIC, or ARM™ microcontroller) with onboard volatile and/or non-volatile memory.

The input device 9294 can include any device for entering information into the electronic control device 9286. The input device 9294 may include a keyboard, keypad, button, switch, cursor-control device, touchscreen, camera, or microphone. In at least one example, the input device 9294 includes one or more of ports and wireless radios (e.g., Bluetooth®, or 802.11x) for making wired and/or wireless connections to external devices, such as, the frequency sensor 9288.

Activation of the actuator(s) 9284 may be controlled by the driver 9296. The driver 9296 may activate the actuator(s) 9284 (e.g., power the actuator(s) 9284 to execute a movement) in response to signals from the processor 9290. The driver 9296 and the field manipulation actuator(s) 9284 may be physically connected (e.g., by hardwiring) so that the driver 9296 may power corresponding actuators 9284 accordingly. In an alternative example, a driver 9296 may be provided for each actuator 9284 (e.g., one driver for the first rotary actuator 9284a and one drive controller for the second rotary actuator 9284b). In another alternative example, a driver 9296 may control several actuators 9284 (e.g. one driver to synchronize several actuators 9284).

FIG. 23 illustrates one example hardware schematic of an electronic control device 9286. In alternative examples, the electronic control device 9286 contains fewer, additional or different components. In addition, although aspects of an implementation of electronic control device 9286 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

Generally, the processor 9290 can execute computer readable instructions (also referred to as applications or programs). The computer readable instructions can be stored in the memory 9292 or can be received from remote storage accessible through a network, for example. When executed, the computer readable instructions can configure processor the 9290 (or multiple processors 9290, collectively) to perform the acts described herein with reference to the vibration absorber 9100, for example.

The computer-readable instructions, when executed, configure the processor 9290 to:

a) receive, from the frequency sensor 9288, a vibration frequency signal associated with the object, and b) transmit, to each field manipulation actuator 9284, one or more commands to control movement of the one or more magnetic elements of the dynamically variable magnetic system based on the vibration frequency signal measured by the frequency sensor 9288.

The actuator(s) 9284 are responsive to signals received from the processor 9290. In some examples, the processor 9290 assesses the vibration frequency signal against the current position of the one or more magnetic elements of the dynamically variable magnetic system in real time (e.g., at least once every second, such as 1-1,000,000 times per second) and controls movement of each field manipulator 9284 accordingly. In the example illustrated in FIGS. 21A-21D, the one or more commands are transmitted to the first and second rotary actuators 9284a, 9284b to control movement of the respective one of the first and second attractive magnets 9272, 9274 of the attractive magnetic system 9270.

In some examples, the memory 9292 stores a plurality of predetermined resistance protocols, and in response to receiving the vibration frequency signal, the processor 9290 is configured to select one of the plurality of resistance protocols that is associated with the received vibration frequency signal. For example, the memory 9292 may store 1000 predetermined resistance protocol for 1000 unique vibration frequencies (e.g., 0.1 Hz, 0.2 Hz, 0.3 Hz . . . 100.0 Hz etc.). To select one of the plurality of resistance protocols, the processor 9290 may be configured to match the vibration frequency associated with the received vibration frequency signal to one of the plurality of resistance protocols that is associated with that vibration frequency. For example, if the processor 9230 determines that the received vibration signal is associated with a vibration frequency of 5.5 Hz, the processor 9290 selects one of the plurality of resistance protocols stored on the memory 9292 that is associated with a vibration frequency of 5.5 Hz.

Each resistance protocol may be associated with one or more sets of commands. One or more commands associated with a selected resistance protocol may be transmitted to field manipulation actuator(s) 9284 and instruct the field manipulation actuator(s) 9284 to automate the selected resistance protocol. In some examples, the commands direct the actuator(s) 9284 to move to the one or more magnetic elements of the dynamically variable magnet system to a specific position to achieve a desired net repulsive force. A command may be specific to one resistance protocol, common to a subset of resistance protocols, or common to all resistance protocols.

Referring to FIGS. 20 and 21A, the vibration absorber 9100 includes optional magnetic shielding 9298 positioned to limit unwanted magnetic interaction between various magnetic elements of the vibration absorber. The magnetic shielding 9298 may be made from any suitable material with high magnetic permeability to redirect or absorb magnetic field lines, preventing them from penetrating a specific area (e.g., steel, MuMetal®, etc.). In the illustrated example, the magnetic shielding 9298 has an elongate slot 9300 formed therein to allow for movement of the linking rod 9278 as the magnetic dynamic mass 9260 translates. In some examples, the vibration absorber 9100 does not include magnetic shielding.

In the illustrated example, a portion of the magnetic shielding 9298 is positioned between the outer ring magnet 9264 of the magnetic repulsive system 9262 and each of the first and second attractive magnets 2972, 2974 of the magnetic attractive system 9270. In the illustrated example, another portion of the magnetic shielding 9298 is positioned between the inner ring magnet 9266 and the dynamic magnet 276 of the magnetic dynamic mass 9260. The magnetic shielding 9298 may be provided as a single continuous sheet of material, e.g., as illustrated. Alternatively, the magnetic shielding 9298 is be provided as one or more discrete pieces that are positioned where magnetic shielding is desired. In use, the magnetic shielding 9298 may limit unwanted magnetic interaction:

i) between the outer ring magnet 9264 of the repulsive magnetic system 9262 and the dynamic magnetic 9276 of the magnetic dynamic mass 9260, and ii) between the inner ring magnet 9266 of the magnetic dynamic mass 9260 and each of the first and second attractive magnets 9272, 9274 of the attractive magnetic system 9270.

Referring again to FIGS. 21A-21D, the magnetic dynamic mass 9260 is coupled to and translatable along an optional linear track 9302 that guides the translation of the magnetic dynamic mass 9260 away from the equilibrium position. In the example illustrated, the linear track 9302 is secured at opposite ends to the outer ring magnet 9264; however, other arrangements are possible. The linear track 9302 restricts the translation of the magnetic dynamic mass 9260 to first and second directions 9280 and the second direction 9282. The linear track 9302 may provide for one or more advantages. For example, the linear track 9302 may reduce frictional forces opposing the translation of the magnetic dynamic mass 9260 compared to examples in which the magnetic mass 9260 slides on base surface and/or the magnetic shielding 9298. Alternatively, or in addition, the linear track 9302 ensures that the dynamic magnet 9276 of the magnetic dynamic mass 9260 remains aligned with the first and second attractive magnets 9272 and 9274 as the magnetic dynamic mass 9260 translates away from the equilibrium position.

In some examples, the vibration absorber 9100 does not include a linear track for the magnetic dynamic mass 9260 and is not restricted to translate only in the first and second directions 9280, 9282. In these examples, the magnetic dynamic mass 9260 may bear against and slide on a surface of the magnetic shielding 9298 or another suitable base surface, preferably with a low coefficient of friction (e.g., below 0.2, more preferably below 0.10).

Referring to FIGS. 24A-24D, another example of a dynamically tuned vibration absorber 10100 according to aspects of the present teaching has some similarity to the vibration absorber 9100 with like features identified by like reference characters, incremented by 1000. The vibration absorber 10100 includes a magnetic dynamic mass 10260, a repulsive magnetic system 10262, an attractive magnetic system 10270, and magnetic shielding 10298. The repulsive magnetic system is a dynamically variable magnetic system, unlike the vibration absorber 9100 for which the attractive magnetic system is the dynamically variable system.

The repulsive magnetic system 10262 includes first and second repulsive magnets 10304, 10306, and the magnetic dynamic mass 10260 includes a dynamic magnet 10308 positioned between the first and second repulsive magnets 10304, 10306. The first repulsive magnet 10304 is positioned away from the dynamic magnet 10208 in a first direction 10280 and the second repulsive magnet 10306 is positioned away from the dynamic magnet 10308 in a second direction 10282 opposite the first direction 10280. Each of the first and second repulsive magnets 10304, 10306 of the repulsive magnetic system 10262 is oriented to produce a magnetic field that repels the magnetic field produced by the dynamic magnet 10308 of the magnetic dynamic mass 10260.

The attractive magnetic system 10270 includes an outer ring magnet 10310 and the magnetic dynamic mass 10260 includes an inner ring magnet 10312 positioned within and oriented in attraction to the outer ring magnet 10310.

Figure 24A:
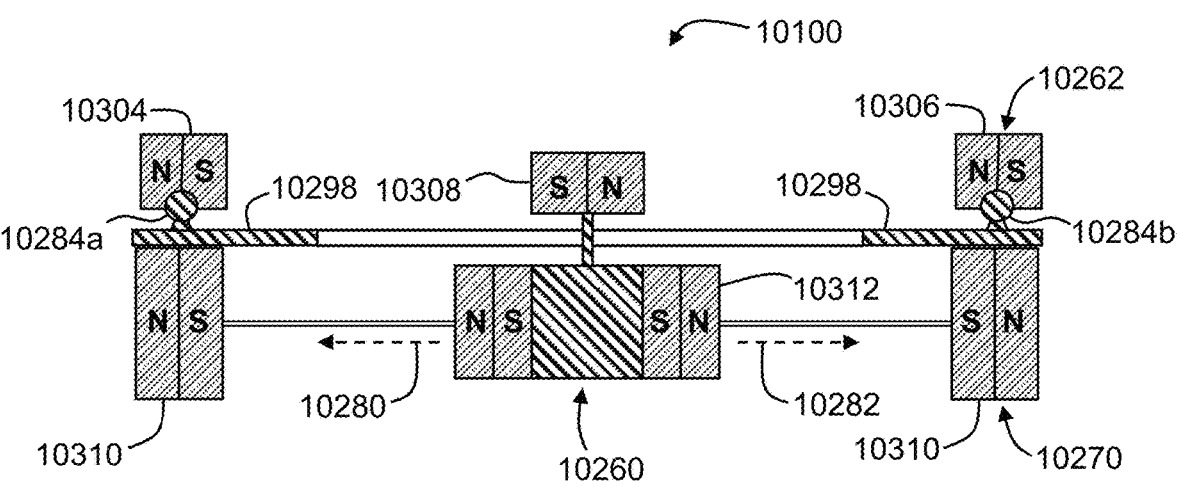
FIG. 24A is a cross-sectional view of another example dynamically tuned vibration absorber according to aspects of the teaching disclosed herein.
Figure 24B:
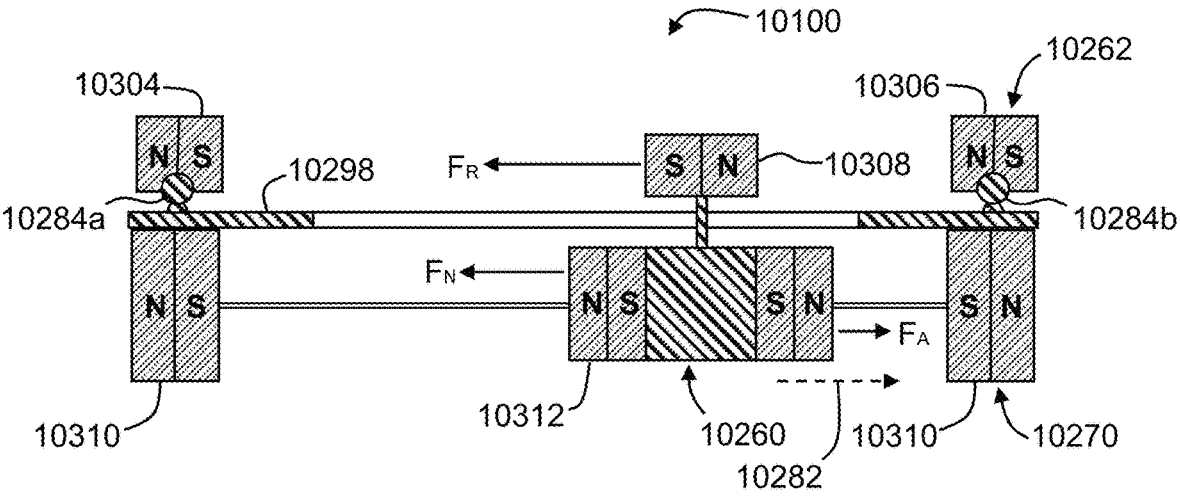
FIG. 24B is a cross-sectional view of the dynamically tuned vibration absorber of FIG. 24A, showing the magnetic dynamic mass of the vibration absorber translated away from its equilibrium position.
Figure 24C:
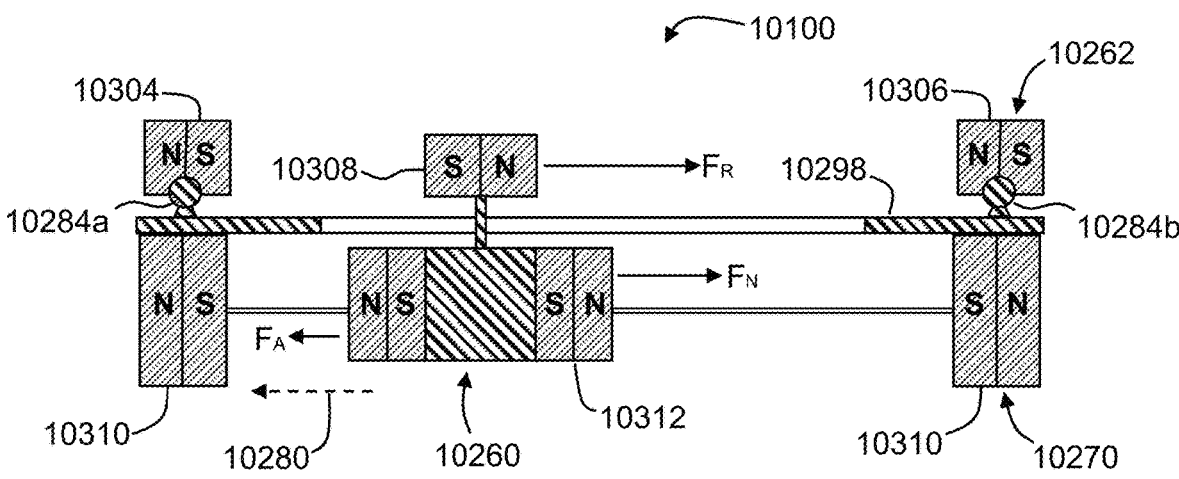
FIGS. 24C and 24D are cross-sectional views of the dynamically tuned vibration absorber of FIG. 24A, showing the magnetic dynamic mass of the vibration absorber translated away from the equilibrium position in the same direction but with the magnets of the dynamically variable magnetic system in different positions.
Figure 24D:
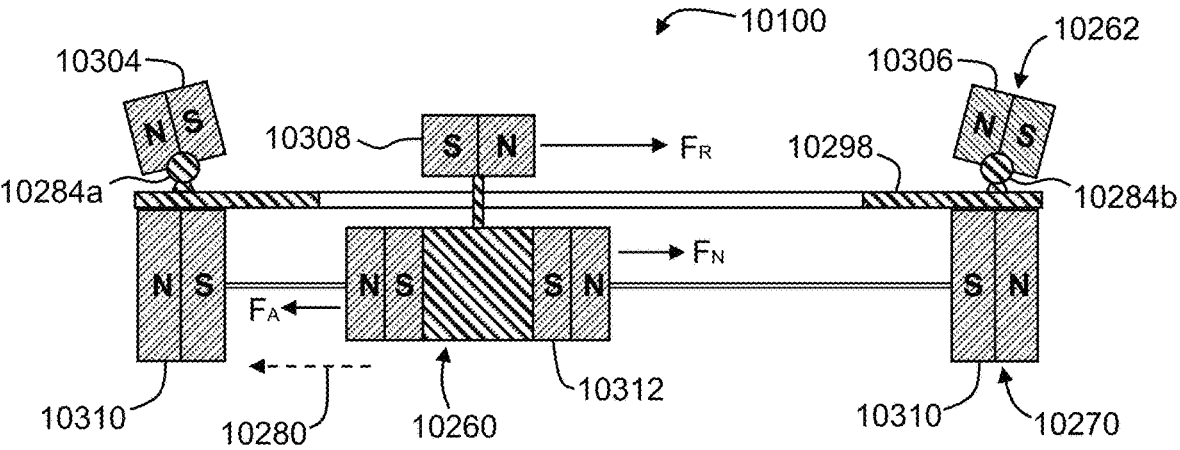

FIGS. 24A-24C illustrate the magnetic dynamic mass 10260 in different positions. Referring to FIG. 24A, the magnetic dynamic mass 10260 is in an equilibrium position. Comparing FIG. 24B to FIG. 24A, the magnetic dynamic mass 10260 has translated in the second direction 10282 away from the equilibrium position. Translation of the magnetic dynamic mass 10260 in the second direction 10282 away from the equilibrium position is i) resisted by magnetic repulsion between the second repulsive magnet 10306 of the magnetic repulsive system 10262 and the dynamic magnet 10308 of the magnetic dynamic mass 10260 and ii) aided by magnetic attraction between the outer ring magnet 10310 of the attractive magnetic system 10270 and the inner ring magnet 10312 of the magnetic dynamic mass 10260.

Referring to FIG. 24B, the magnetic repulsion between the second repulsive magnet 10306 and the dynamic magnet 10308 exerts a magnetic repulsive force $F_R$ on the magnetic dynamic mass 10260 in a direction opposite the second direction 10282. The magnetic repulsive force $F_R$ urges the magnetic dynamic mass 10260 toward the equilibrium position. The magnetic attraction between the outer ring magnet 10310 and the inner ring magnet 10312 exerts a magnetic attractive force $F_A$ on the magnetic dynamic mass 10260 in the second direction 10282. Accordingly, the magnetic attractive force $F_A$ urges the translation of the magnetic dynamic mass 10260 in the second direction 10282 away from the equilibrium position (i.e., opposes the magnetic repulsive force $F_R$).

Comparing FIG. 24C to FIG. 24A, the magnetic dynamic mass 9260 has translated in the first direction 10280 away from the equilibrium position. Translation of the magnetic dynamic mass 10260 in the first direction 10280 away from the equilibrium position is i) resisted by magnetic repulsion between the first repulsive magnet 10304 of the magnetic repulsive system 10262 and the dynamic magnet 10308 of the magnetic dynamic mass 10260 and ii) aided by magnetic attraction between the outer ring magnet 10310 of the attractive magnetic system 10270 and the inner ring magnet 10312 of the magnetic dynamic mass 10260.

Referring to FIG. 24C, the magnetic repulsion between the first repulsive magnet 10304 and the dynamic magnet 10308 exerts a magnetic repulsive force $F_R$ on the magnetic dynamic mass 10260 in a direction opposite the first direction 10280. The magnetic repulsive force $F_R$ urges the magnetic dynamic mass 10260 toward the equilibrium position. The magnetic attraction between the outer ring magnet 10310 and the inner ring magnet 10312 exerts a magnetic attractive force $F_A$ on the magnetic dynamic mass 10260 in the first direction 10280. Accordingly, the magnetic attractive force $F_A$ urges the translation of the magnetic dynamic mass 10260 in the second first 10280 away from the equilibrium position (i.e., opposes the magnetic repulsive force $F_R$).

Referring to FIGS. 24B and 24C, the magnetic attractive force $F_A$ opposes the magnetic repulsive force $F_R$. No matter the displacement of the magnetic dynamic mass 10260 away from the equilibrium position, the magnetic repulsive force $F_R$ always exceeds the magnetic attractive force $F_A$. Accordingly, when the magnetic repulsive force $F_R$ and magnetic attractive force $F_A$ are summed, a net repulsive force $F_N$ resists translation of the magnetic dynamic mass 10260 away from the equilibrium position (i.e., the net repulsive force $F_N$ urges the magnetic dynamic mass 10260 toward the equilibrium position). In the illustrated example, the magnetic repulsive force $F_R$ is adjustable via the dynamical variable magnetic system so that the net repulsive force $F_N$ increases generally linearly with displacement of the magnetic dynamic mass 10260 from the equilibrium position.

In the illustrated example, the repulsive magnetic system 10262 is a dynamically variable magnetic system and includes a field manipulation actuator 10284. In this example, the net repulsive force $F_N$ is adjusted by varying the repulsive magnetic force $F_R$ exerted on the magnetic dynamic mass 10260.

In the illustrated example, the field manipulation actuator 10284 includes a first rotary actuator 10284a coupled to the first repulsive magnet 10304 of the repulsive magnetic system 10262 and a second rotary actuator 10284b coupled to the second repulsive magnet 10306 of the magnetic repulsive system 10262. The first rotary actuator 10284a is operable to rotate the first repulsive magnet 10304 relative to the magnetic dynamic mass 10260. Likewise, the second rotary actuator 10284b is operable to rotate the second repulsive magnet 10284 relative to the magnetic dynamic mass 10260.

Rotating the first and second repulsive magnets 10304, 10306 relative to the magnetic dynamic mass 10260 changes an angle at which the magnetic field produced by each of the first and second repulsive magnets 10304, 10304 is directed toward the dynamic magnet 10308 of the magnetic dynamic mass 10260. Comparing FIG. 24D to 24C, the first and second repulsive magnets 10304, 10304 of the magnetic repulsive system 10262 have been rotated counterclockwise and clockwise, respectively. This rotation angles the magnetic fields produced by the first and second repulsive magnets 10304, 10304 away from the magnetic field produced by the dynamic mass 10308 of the magnetic dynamic mass 10260 and causes a reduction in the attractive force $F_R$ exerted on the magnetic dynamic mass 10260 in FIG. 24D relative to FIG. 24C.

Reducing the magnetic attractive force $F_R$ decreases the net repulsive force $F_N$ exerted on the magnetic dynamic mass 10260. Conversely, increasing magnetic repulsive force $F_R$ increases the net repulsive force $F_N$ exerted on the magnetic dynamic mass 10260. The ability to vary the net repulsive force $F_N$ via the dynamically variable magnetic system allows the vibration absorber 10100 to be "re-tuned" in response to a change in the vibration frequency of the object to which the vibration absorber 10100 is secured.

Referring to FIGS. 25A-25D, another example of a dynamically tuned vibration absorber 11100 according to aspects of the present teaching has some similarity to the vibration absorber 9100 with like features identified by like reference characters, incremented by 2000. The vibration absorber 11100 includes a magnetic dynamic mass 11260, a repulsive magnetic system 11262, an attractive magnetic system 11270, and magnetic shielding 11298.

The repulsive magnetic system 11262 includes first and second repulsive magnets 11304, 11306, and the magnetic dynamic mass 11260 includes a dynamic magnet 11308 positioned between the first and second repulsive magnetic elements 11304, 11306. The first repulsive magnet 11304 is positioned away from the dynamic magnet 11208 in a first direction 11280 and the second repulsive magnet 11306 is positioned away from the dynamic magnet 11308 in a second direction 11282 opposite the first direction 11280. Each of the first and second repulsive magnets 11304, 11306 of the repulsive magnetic system 11262 is oriented to produce a magnetic field that repels the magnetic field produced by the dynamic magnet 11308 of the magnetic dynamic mass 11260.

The attractive magnetic system 11270 includes first and second attractive magnets 11272, 11274, and the magnetic dynamic mass 11260 includes a dynamic magnetic element 11276 positioned between the first and second attractive magnets 11272, 11274. The dynamic magnetic element 11276 is formed at least in part from a material that is attracted to magnetic fields produced by the first and second attractive magnets 11272, 11274 (e.g., iron, cobalt, nickel, etc.). In other examples, the dynamic magnetic element 11276 is a magnet oriented in attraction to each of the first and second attractive magnets 11272, 11274.

In the illustrated example, the dynamic magnetic element 11276 is connected to the dynamic magnet 11308 by a linking rod 11278 that passes through an elongate slot in the magnetic shielding 11298. In this example, an underside surface of the dynamic magnetic element 11276 bears against an upper surface of the magnetic shielding 11298 and is translatable thereon.

Figure 25A:
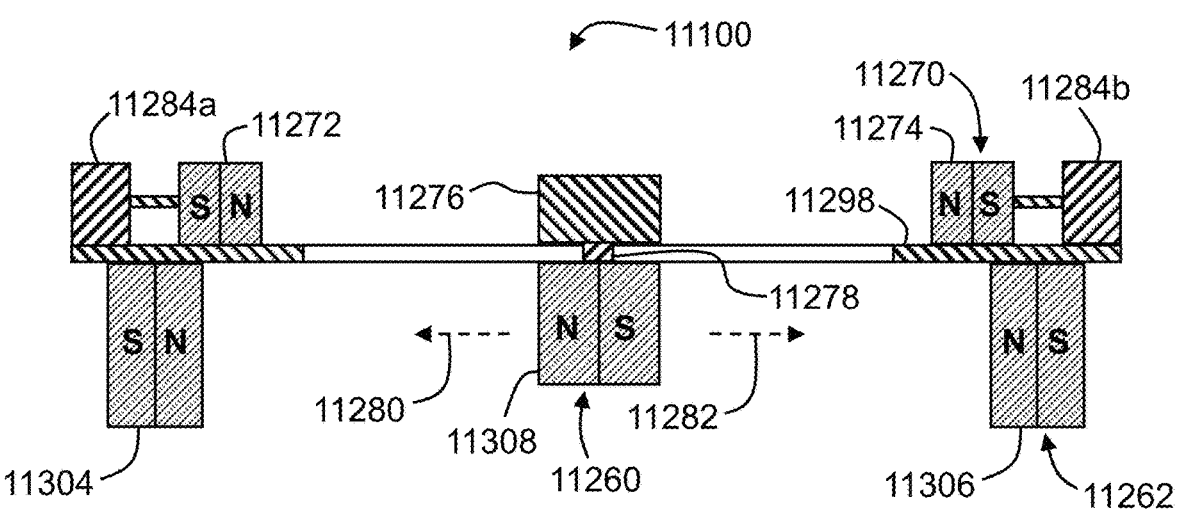
FIG. 25A is a cross-sectional view of another example dynamically tuned vibration absorber according to aspects of the teaching disclosed herein.
Figure 25B:
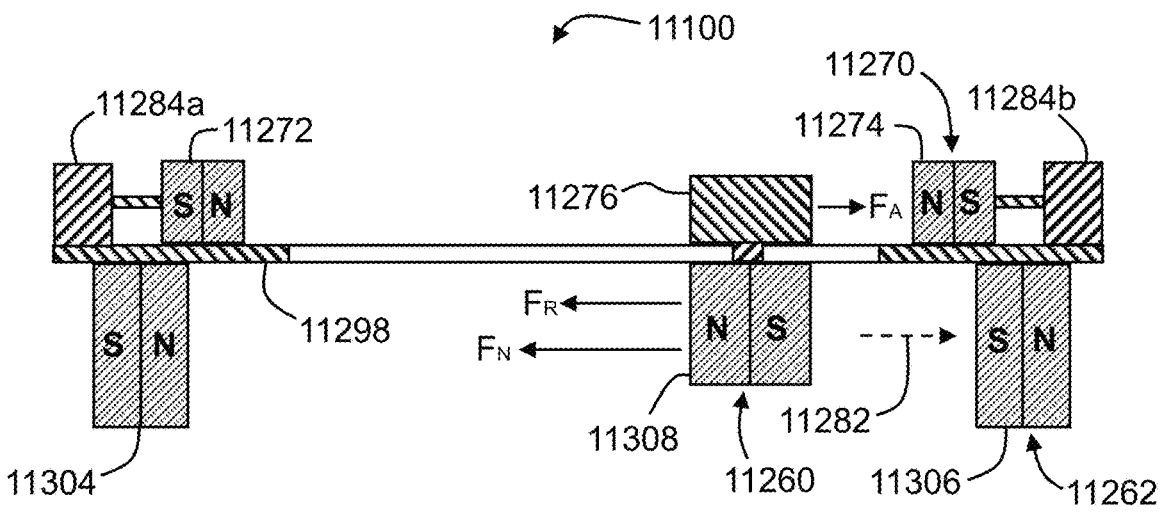
FIG. 25B is a cross-sectional view of the dynamically tuned vibration absorber of FIG. 25A, showing the magnetic dynamic mass of the vibration absorber translated away from its equilibrium position.
Figure 25C:
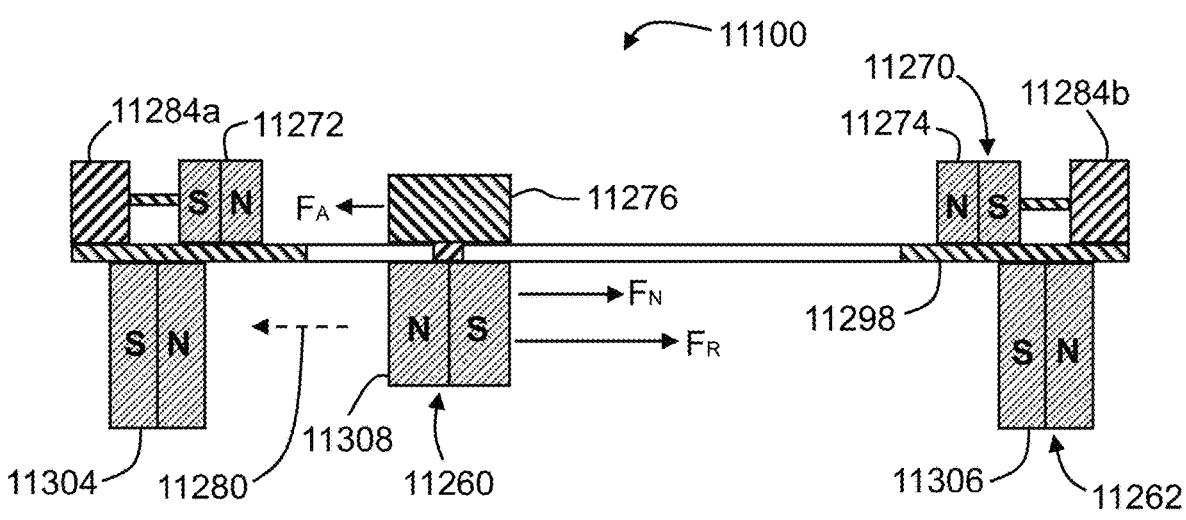
FIGS. 25C and 25D are cross-sectional views of the dynamically tuned vibration absorber of FIG. 25A, showing the magnetic dynamic mass of the vibration absorber translated away from the equilibrium position in the same direction but with the magnets of the dynamically variable magnetic system in different positions.

FIGS. 25A-25C illustrate the magnetic dynamic mass 11260 in different positions. Referring to FIG. 25A, the magnetic dynamic mass 11260 is in an equilibrium position. Comparing FIG. 25B to FIG. 25A, the magnetic dynamic mass 11260 has translated in the second direction 11282 away from the equilibrium position. Translation of the magnetic dynamic mass 11260 in the second direction 11282 away from the equilibrium position is i) resisted by magnetic repulsion between the second repulsive magnet 11306 of the magnetic repulsive system 11262 and the dynamic magnet 11308 of the magnetic dynamic mass 11260 and ii) aided by magnetic attraction between the second attractive magnet 11274 of the attractive magnetic system 11270 and the dynamic magnetic element 11276 of the magnetic dynamic mass 11260.

Referring to FIG. 25B, the magnetic repulsion between the second repulsive magnet 11306 and the dynamic magnet 11308 exerts a magnetic repulsive force $F_R$ on the magnetic dynamic mass 11260 in a direction opposite the second direction 11282. The magnetic repulsive force $F_R$ urges the magnetic dynamic mass 11260 toward the equilibrium position. The magnetic attraction between the second attractive magnet 11274 and the dynamic magnetic element 11276 exerts a magnetic attractive force $F_A$ on the magnetic dynamic mass 11260 in the second direction 11282. Accordingly, the magnetic attractive force $F_A$ urges the translation of the magnetic dynamic mass 11260 in the second direction 11282 away from the equilibrium position (i.e., opposes the magnetic repulsive force $F_R$).

Comparing FIG. 25C to FIG. 25A, the magnetic dynamic mass 11260 has translated in the first direction 11280 away from the equilibrium position. Translation of the magnetic dynamic mass 11260 in the first direction 11280 away from the equilibrium position is i) resisted by magnetic repulsion between the first repulsive magnet 11304 of the magnetic repulsive system 11262 and the dynamic magnetic 11308 of the magnetic dynamic mass 11260 and ii) aided by magnetic attraction between the first attractive magnet 11272 of the attractive magnetic system 11270 and the dynamic magnetic element 11276 of the magnetic dynamic mass 11260.

Referring to FIG. 25C, the magnetic repulsion between the first repulsive magnet 11304 and the dynamic magnetic 11308 exerts a magnetic repulsive force $F_R$ on the magnetic dynamic mass 11260 in a direction opposite the first direction 11280. The magnetic repulsive force $F_R$ urges the magnetic dynamic mass 11260 toward the equilibrium position. The magnetic attraction between the first attractive magnet 11272 and the dynamic magnetic element 11276 exerts a magnetic attractive force $F_A$ on the magnetic dynamic mass 11260 in the first direction 11280. Accordingly, the magnetic attractive force $F_A$ urges the translation of the magnetic dynamic mass 11260 in the first direction 11280 away from the equilibrium position (i.e., opposes the magnetic repulsive force $F_R$).

Referring to FIGS. 25B and 25C, the magnetic attractive force $F_A$ opposes the magnetic repulsive force $F_R$. No matter the displacement of the magnetic dynamic mass 11260 away from the equilibrium position, the magnetic repulsive force $F_R$ always exceeds the magnetic attractive force $F_A$. Accordingly, when the magnetic repulsive force $F_R$ and magnetic attractive force $F_A$ are summed, a net repulsive force $F_N$ resists translation of the magnetic dynamic mass 11260 away from the equilibrium position (i.e., the net repulsive force $F_N$ urges the magnetic dynamic mass 11260 toward the equilibrium position). In the illustrated example, the magnetic attractive force $F_A$ is adjustable via the dynamical variable magnetic system so that the net repulsive force $F_N$ increases generally linearly with displacement of the magnetic dynamic mass 11260 from the equilibrium position.

In the illustrated example, the attractive magnetic system 11270 is a dynamically variable magnetic system and includes a field manipulation actuator 11284. In this example, the net repulsive force $F_N$ is adjusted by varying the attractive magnetic force $F_A$ exerted on the magnetic dynamic mass 11260.

In the illustrated example, the field manipulation actuator 11284 includes a first linear actuator 11284a coupled to the first attractive magnet 11272 of the attractive magnetic system 11270 and a second linear actuator 11284b coupled to the second attractive magnet 11274 of the magnetic attractive system 11270. The first linear actuator 11284a is operable to translate the first attractive magnet 11272 toward and away from the magnetic dynamic mass 11260. Likewise, the second linear actuator 11284b is operable to translate the second attractive magnet 11274 toward and away from the magnetic dynamic mass 11260.

Translating the first and second attractive magnets 11272, 11274 toward the magnetic dynamic mass 10260 brings the magnetic fields produced by each of these magnets closer to the dynamic magnetic element 12276 of the magnetic dynamic mass 11260 when the magnetic dynamic mass 11260 is in the equilibrium position. Translating the first and second attractive magnets 11272, 11274 away from the magnetic dynamic mass 11260 moves the magnetic fields produced by each of these magnets farther from the dynamic magnetic element 11276 of the magnetic dynamic mass 11260 when the magnetic dynamic mass 11260 is in the equilibrium position.

Figure 25D:
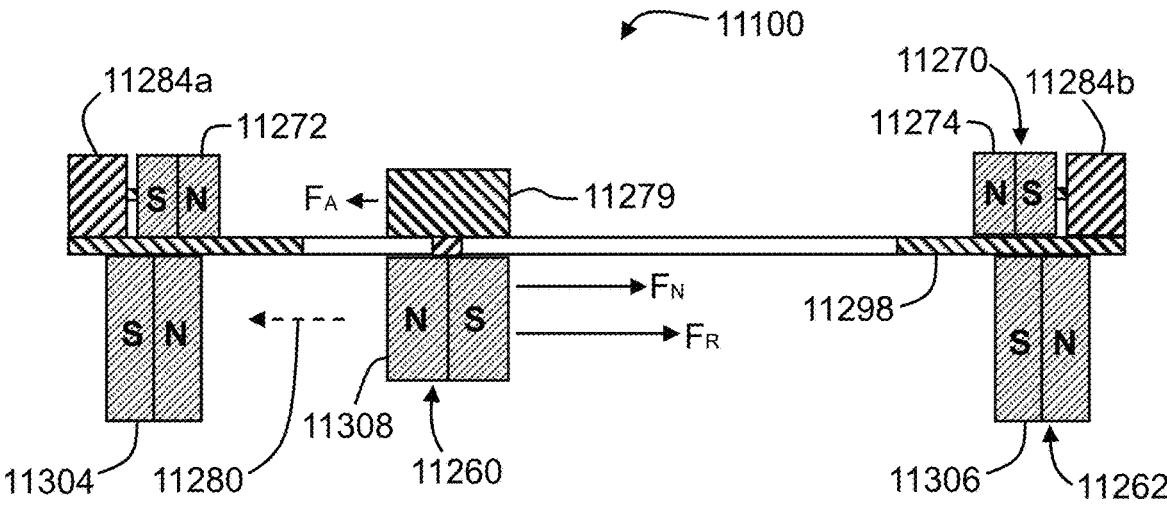

Comparing FIG. 25D to 25C, each of the first and second linear actuators 11284a and 11284b has moved from an extended position to a retracted position. This movement moves the magnetic fields produced by each of the first and second attractive magnets 11272, 11274 farther from the dynamic magnetic element 11276 of the magnetic dynamic mass 11260 when the magnetic dynamic mass 11260 is in the equilibrium position and causes a reduction in the attractive force $F_A$ exerted on the magnetic dynamic mass 11260 in FIG. 25D relative to FIG. 25C.

Reducing the magnetic attractive force $F_A$ increases the net repulsive force $F_N$ exerted on the magnetic dynamic mass 11260. Conversely, increasing magnetic repulsive force $F_A$ decreases the net repulsive force $F_N$ exerted on the magnetic dynamic mass 11260. The ability to vary the net repulsive force $F_N$ via the dynamically variable magnetic system allows the vibration absorber 11100 to be "re-tuned" in response to a change in the vibration frequency of the object to which the vibration absorber 11100 is secured.

Referring to FIGS. 26A-26D, another example of a dynamically tuned vibration absorber 12100 according to aspects of the present teaching has some similarity to the vibration absorber 9100 with like features identified by like reference characters, incremented by 3000. The vibration absorber 12100 includes a magnetic dynamic mass 12260, a repulsive magnetic system 12262, an attractive magnetic system 11270 and magnetic shielding 12298. In the illustrated example, the vibration absorber 12100 further includes a supplemental repulsive magnetic system 12314. In alternative examples, vibration absorber 12100 does not include a supplemental repulsive magnetic system.

The magnetic dynamic mass 12260 includes a first dynamic magnet 12308a and a second dynamic magnet 12308b. In the illustrated example, the first and second dynamic magnets 12308a, 12308b are affixed to opposite sides of a central body 12268 of the magnetic dynamic mass 12260.

The repulsive magnetic system 12262 includes a first repulsive magnet 12304 positioned away from the first dynamic magnet 12308a in a first direction 12280 and a second repulsive magnet 12306 positioned away from the second dynamic magnet 12308b in a second direction 12282 opposite the first direction 12280. Each of the first and second repulsive magnets 12304, 12306 of the repulsive magnetic system 12262 is oriented to produce a magnetic field that repels the magnetic field produced by a respective one of the dynamic magnets 12308a, 12308b of the magnetic dynamic mass 11260.

The attractive magnetic system 12270 includes first and second attractive magnets 12272, 12274, and the magnetic dynamic mass 12260 includes a dynamic magnet 12276 positioned between the first and second attractive magnets 12272, 12274. Each of the first and second attractive magnets 12272, 12274 of the attractive magnetic system 12270 is oriented to produce a magnetic field that attracts the magnetic field produced by the dynamic magnet 12276 of the magnetic dynamic mass 12260. In the illustrated example, the dynamic magnet 12276 is connected to the central body 12268 of the magnetic dynamic mass 12260 by a first linking rod 12278 that passes through an elongate slot in the magnetic shielding 12298.

The supplemental repulsive magnetic system 12314 includes first and second repulsive magnets 12316, 12318, and the magnetic dynamic mass 12260 includes a dynamic magnet 12320 positioned between the first and second repulsive magnets 12316, 12318. Each of the first and second repulsive magnets 12316, 12318 of the supplemental repulsive magnetic system 12314 is oriented to produce a magnetic field that repels the magnetic field produced by the dynamic magnet 12320 of the magnetic dynamic mass 12260. In the illustrated example, the dynamic magnet 12320 is connected to the central body 12268 of the magnetic dynamic mass 12260 by a second linking rod 12322 that passes through an elongate slot in the magnetic shielding 12298.

In the illustrated example, the magnetic dynamic mass 12260 is coupled to and translatable along a linear track 12302 that guides the translation of the magnetic dynamic mass 12260 away from the equilibrium position. In the example illustrated, the linear track 12302 extends between a first end secured to the first repulsive magnets 12304 and a second end secured to the second repulsive magnet 12306. The linear track 12302 restricts the translation of the magnetic dynamic mass 12260 to first and second directions 12280 and the second direction 12282 which may limit instances of magnet misalignment during use.

Figure 26A:
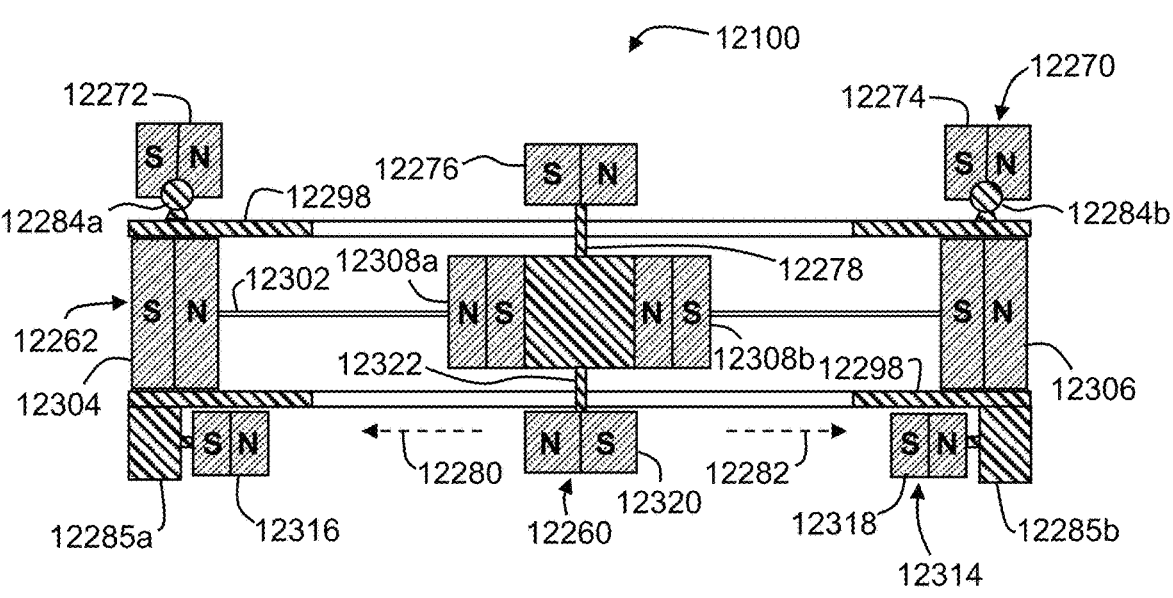
FIG. 26A is a cross-sectional view of another example dynamically tuned vibration absorber according to aspects of the teaching disclosed herein.
Figure 26B:
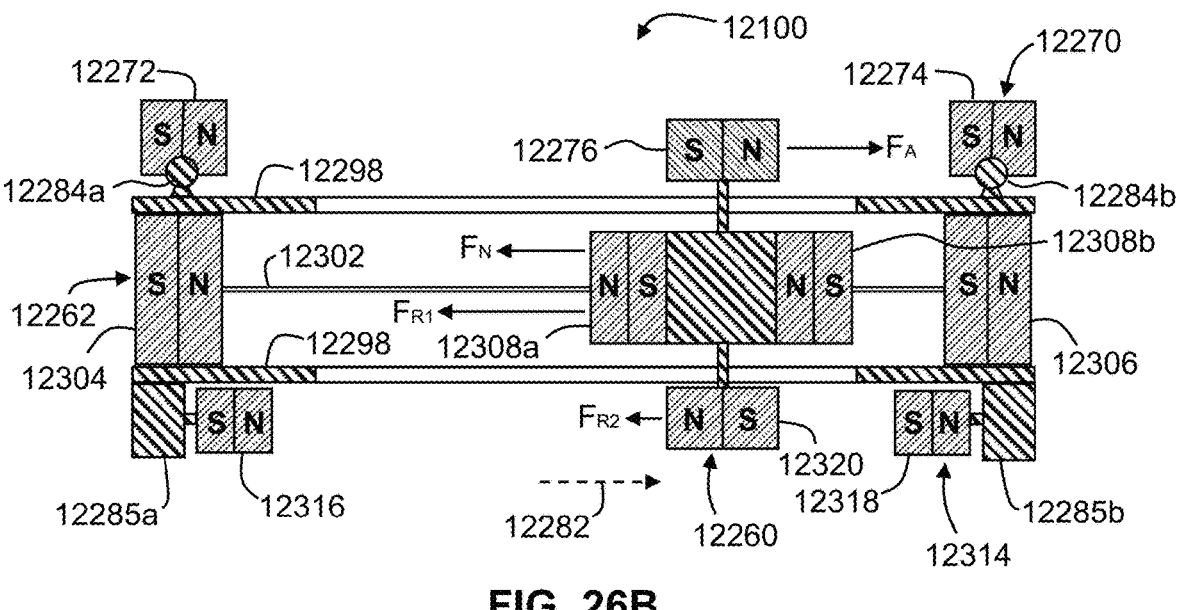
FIG. 26B is a cross-sectional view of the dynamically tuned vibration absorber of FIG. 26A, showing the magnetic dynamic mass of the vibration absorber translated away from its equilibrium position.
Figure 26C:
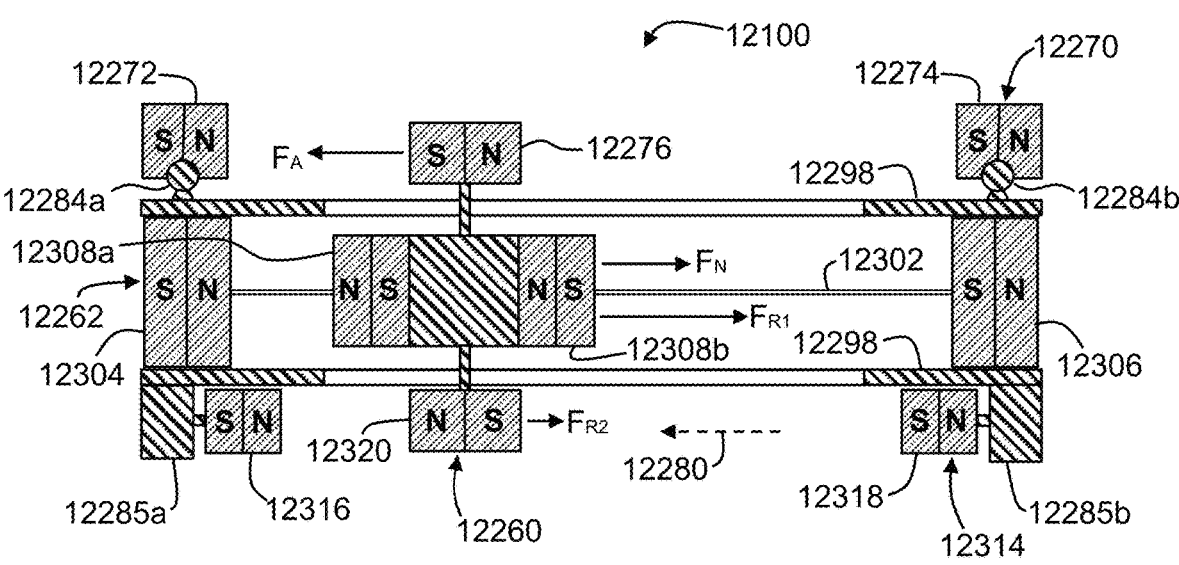
FIGS. 26C and 26D are cross-sectional views of the dynamically tuned vibration absorber of FIG. 26A, showing the magnetic dynamic mass of the vibration absorber translated away from the equilibrium position in the same direction but with the magnets of first and second dynamically variable magnetic systems in different positions.

FIGS. 26A-26C illustrate the magnetic dynamic mass 12260 in different positions. Referring to FIG. 26A, the magnetic dynamic mass 12260 is in an equilibrium position. Comparing FIG. 26B to FIG. 26A, the magnetic dynamic mass 12260 has translated in the second direction 12282 away from the equilibrium position. Translation of the magnetic dynamic mass 12260 in the second direction 12282 away from the equilibrium position is i) resisted by magnetic repulsion between the second repulsive magnet 12306 of the magnetic repulsive system 12262 and the second dynamic magnet 12308b of the magnetic dynamic mass 12260, ii) aided by magnetic attraction between the second attractive magnet 12274 of the attractive magnetic system 12270 and the dynamic magnet 12276 of the magnetic dynamic mass 12260, and iii) resisted by magnetic repulsion between the second repulsive magnet 12318 of the supplemental magnetic repulsive system 12314 and the dynamic magnet 12320 of the magnetic dynamic mass 12260.

Referring to FIG. 26B, the magnetic repulsion between the second repulsive magnet 12306 and the second dynamic magnet 12308b exerts a magnetic repulsive force $F_{R1}$ on the magnetic dynamic mass 11260 in a direction opposite the second direction 12282. The magnetic repulsive force $F_{R1}$ urges the magnetic dynamic mass 12260 toward the equilibrium position. The magnetic attraction between the second attractive magnet 12274 and the dynamic magnet 12276 exerts a magnetic attractive force $F_A$ on the magnetic dynamic mass 12260 in the second direction 12282. Accordingly, the magnetic attractive force $F_A$ urges the translation of the magnetic dynamic mass 12260 in the second direction 12282 away from the equilibrium position (i.e., opposes the magnetic repulsive force $F_{R1}$).

The magnetic repulsion between the second repulsive magnet 12318 and the dynamic magnet 12320 exerts a magnetic repulsive force $F_{R2}$ on the magnetic dynamic mass 12260 in a direction opposite the second direction 12282. The magnetic repulsive force $F_{R2}$ urges the magnetic dynamic mass 12260 toward the equilibrium position (i.e., opposes the magnetic attractive force $F_A$).

Comparing FIG. 26C to FIG. 26A, the magnetic dynamic mass 12260 has translated in the first direction 12280 away from the equilibrium position. Translation of the magnetic dynamic mass 12260 in the first direction 12282 away from the equilibrium position is i) resisted by magnetic repulsion between the first repulsive magnet 12304 of the magnetic repulsive system 12262 and the first dynamic magnet 12308a of the magnetic dynamic mass 12260, ii) aided by magnetic attraction between the first attractive magnet 12272 of the attractive magnetic system 12270 and the dynamic magnet 12276 of the magnetic dynamic mass 12260, and iii) resisted by magnetic repulsion between the first repulsive magnet 12316 of the supplemental magnetic repulsive system 12314 and the dynamic magnet 12320 of the magnetic dynamic mass 12260.

Referring to FIG. 26C, the magnetic repulsion between the first repulsive magnet 12304 and the first dynamic magnet 12308a exerts a magnetic repulsive force $F_{R1}$ on the magnetic dynamic mass 11260 in a direction opposite the first direction 12280. The magnetic repulsive force $F_{R1}$ urges the magnetic dynamic mass 12260 toward the equilibrium position. The magnetic attraction between the first attractive magnet 12272 and the dynamic magnet 12276 exerts a magnetic attractive force $F_A$ on the magnetic dynamic mass 12260 in the first direction 12280. Accordingly, the magnetic attractive force $F_A$ urges the translation of the magnetic dynamic mass 12260 in the first direction 12280 away from the equilibrium position (i.e., opposes the magnetic repulsive force $F_{R1}$).

The magnetic repulsion between the first repulsive magnet 12316 and the dynamic magnet 12320 exerts a magnetic repulsive force $F_{R2}$ on the magnetic dynamic mass 12260 in a direction opposite the first direction 12280. The magnetic repulsive force $F_{R2}$ urges the magnetic dynamic mass 12260 toward the equilibrium position (i.e., opposes the magnetic attractive force $F_A$).

Referring to FIGS. 26B and 26C, the magnetic attractive force $F_A$ opposes the magnetic repulsive forces $F_{R1}$ and $F_{R2}$. No matter the displacement of the magnetic dynamic mass 12260 away from the equilibrium position, the sum of the magnetic repulsive forces $F_{R1}$ and $F_{R2}$ always exceeds the magnetic attractive force $F_A$. Accordingly, when the magnetic repulsive forces $F_{R1}$ and $F_{R2}$ and magnetic attractive force $F_A$ are summed, a net repulsive force $F_N$ resists translation of the magnetic dynamic mass 12260 away from the equilibrium position (i.e., the net repulsive force $F_N$ urges the magnetic dynamic mass 12260 toward the equilibrium position).

Figure 27A:
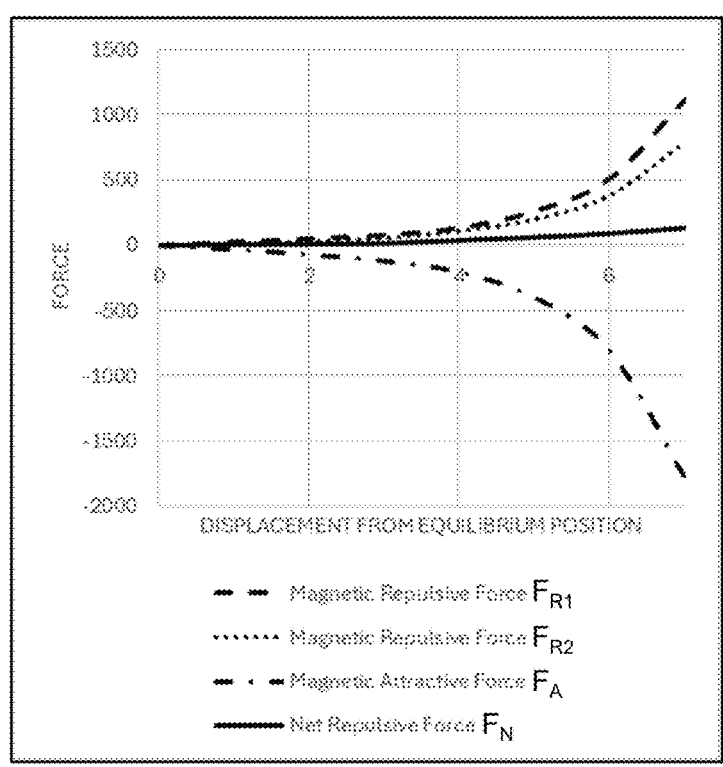
FIGS. 27A and 27B are graphical illustrations plotting the magnetic forces exerted on the magnetic dynamic mass of the vibration absorber of FIGS. 25A-25D against displacement of the magnetic dynamic mass away from its equilibrium position.

In the illustrated example, both the magnetic attractive force $F_A$ and the magnetic repulsive force $F_{R2}$ are adjustable via respective dynamical variable magnetic systems so that the net repulsive force $F_N$ increases generally linearly with displacement of the magnetic dynamic mass 12260 from the equilibrium position. The graphical illustration of FIG. 27A plots magnetic force (y-axis) against displacement of the magnetic dynamic mass from the equilibrium position (x-axis) for the vibration absorber 12100. Combining the magnetic repulsive force $F_{R1}$ curve, the magnetic repulsive force $F_{R2}$ curve and the magnetic attractive force $F_A$ curve produces a net repulsive force $F_N$ line that increases generally linearly with displacement from the equilibrium position.

Referring again to FIGS. 26A-26D, each of the attractive magnetic system 12270 and the supplemental repulsive magnetic system 12314 is a dynamically variable magnetic system that includes a respective pair of field manipulation actuators 12284, 12285. Compared to vibration absorbers with only one dynamically variable magnetic system, those with two dynamically variable magnetic system may allow for more precise tuning. Having multiple variable magnetic systems may also allow the relationship between net repulsive force (resistance) and displacement of the dynamic magnetic mass 12260 from the equilibrium position to have greater linearity compared to vibration absorbers with only one dynamically variable magnetic system.

The attractive magnetic system 12270 includes a first rotary actuator 12284a coupled to the first attractive magnet 12272 and a second rotary actuator 12284b coupled to the second attractive magnet 12274. The first rotary actuator 12284a is operable to rotate the first attractive magnet 12282 relative to the magnetic dynamic mass 12260. Likewise, the second rotary actuator 12284b is operable to rotate the second attractive magnet 12274 relative to the magnetic dynamic mass 12260.

Rotating the first and second attractive magnets 12272, 12274 relative to the magnetic dynamic mass 12260 changes an angle at which the magnetic field produced by each of the first and second attractive magnets 12272, 12274 is directed toward the dynamic magnet 12276 of the magnetic dynamic mass 12260. Comparing FIG. 26D to 26C, the first and second attractive magnets 12272, 12274 of the magnetic attractive system 12270 have been rotated counterclockwise and clockwise, respectively. This rotation angles the magnetic fields produced by the first and second attractive magnets 12272, 12274 away from the magnetic field produced by the dynamic magnet 12276 of the magnetic dynamic mass 12260 and causes a reduction in the attractive force $F_A$ exerted on the magnetic dynamic mass 12260 in FIG. 26D relative to FIG. 26C.

The supplemental repulsive magnetic system 12314 includes a first linear actuator 12285a coupled to the first repulsive magnet 12316 and a second linear actuator 12285b coupled to the second repulsive magnet 12318. The first linear actuator 12285a is operable to translate the first repulsive magnet 12316 toward and away from the magnetic dynamic mass 12260. Likewise, the second linear actuator 12285b is operable to translate the second repulsive magnet 12318 toward and away from the magnetic dynamic mass 12260.

Translating the first and second repulsive magnets 12316, 12318 of the supplemental repulsive magnetic system 12314 toward the magnetic dynamic mass 12260 brings the magnetic fields produced by each of these magnets closer to the dynamic magnet 12320 of the magnetic dynamic mass 12260 when the magnetic dynamic mass 12260 is in the equilibrium position. Translating the first and second repulsive magnets 12316, 12318 away from the magnetic dynamic mass 12260 moves the magnetic fields produced by each of these magnets farther from the dynamic magnet 12320 of the magnetic dynamic mass 12260 when the magnetic dynamic mass 12260 is in the equilibrium position.

Figure 26D:
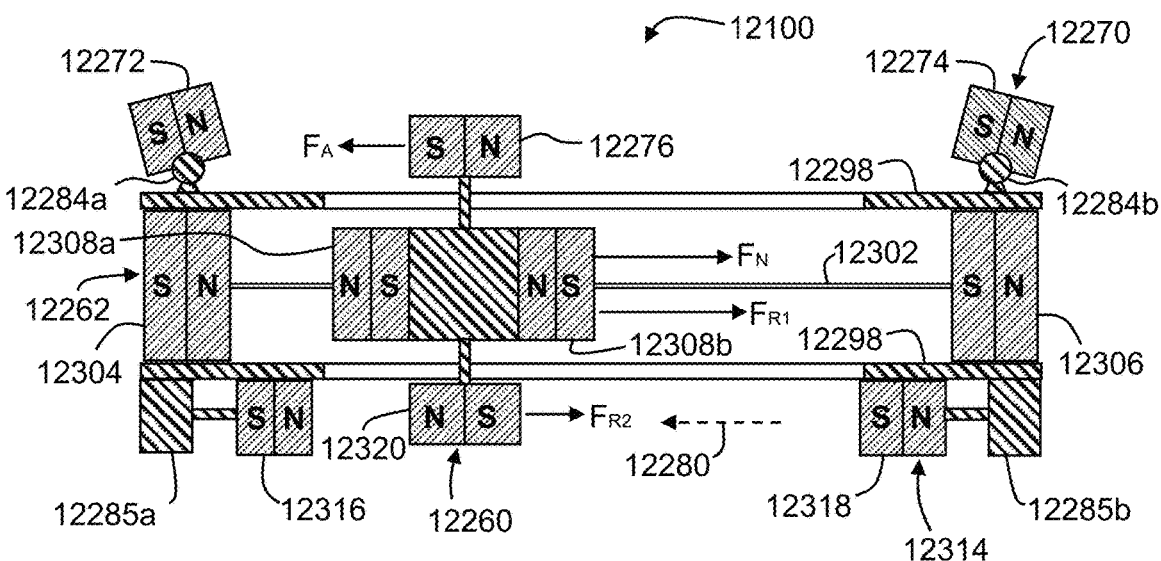

Comparing FIG. 26D to 26C, each of the first and second linear actuators 12285a and 12285b has moved from a retracted position to an extended position. This movement brings the magnetic fields produced by each of the first and second repulsive magnets 12316, 12318 of the supplemental repulsive magnetic system 12314 closer to the dynamic magnet 12320 of the magnetic dynamic mass 12260 when the magnetic dynamic mass 12260 is in the equilibrium position and causes an increase in the repulsive force $F_{R2}$ exerted on the magnetic dynamic mass 12260 in FIG. 28D relative to FIG. 26C.

Figure 27B:
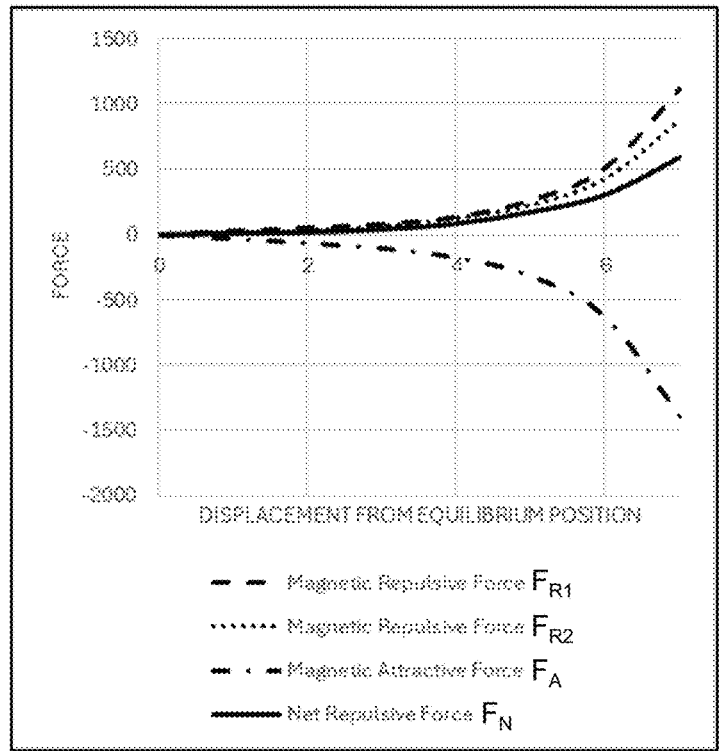

The graphical illustrations of FIGS. 27A and 27B illustrate the decrease in the attractive magnetic force caused by rotating the first and second attractive magnets 12272, 12274 from their position in FIG. 26C to their position in FIG. 26D. The graphical illustrations of FIGS. 27A and 27B also illustrate the increase in the second magnetic force caused by moving the first and second repulsive magnets 12316, 12318 from their position in FIG. 26C to their position in FIG. 26D.

Comparing FIG. 27B to FIG. 27A, the slope of the net repulsive force line has increased. Reducing the magnetic attractive force $F_A$ and increasing the magnetic repulsive force $F_{R2}$ has increased the net repulsive force $F_N$ exerted on the magnetic dynamic mass 12260 at a given displacement from the equilibrium position. Conversely, increasing the magnetic attractive force $F_A$ and/or decreasing the magnetic repulsive force $F_{R2}$ would have decreased the net repulsive force $F_N$ exerted on the magnetic dynamic mass 12260 at a given displacement from the equilibrium position.

The ability to vary the net repulsive force $F_N$ allows the vibration absorber 12100 to be "re-tuned" via the first and second dynamically variable magnetic systems in response to a change in the vibration frequency of the object to which the vibration absorber 12100 is secured.

Figure 28A:
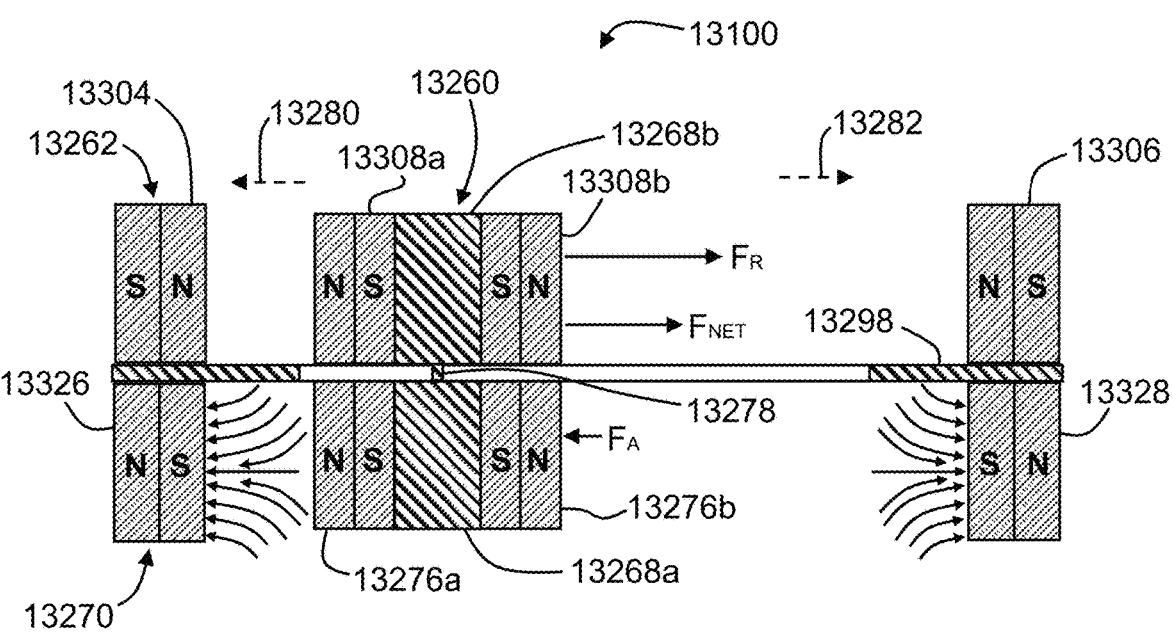
FIGS. 28A and 28B are cross-sectional views of another example dynamically tuned vibration absorber according to aspects of the teaching disclosed herein, showing the magnetic dynamic mass of the vibration absorber in different positions.
Figure 28B:
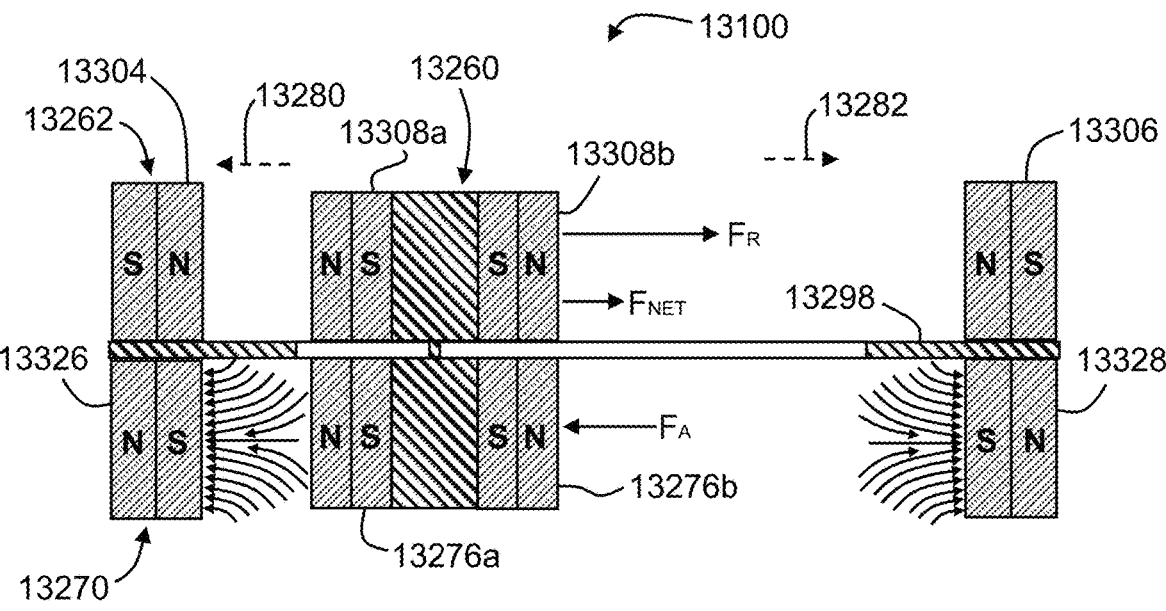

Referring to FIGS. 28A-28B, another example of a vibration absorber 13100 according to aspects of the present teaching has some similarity to the vibration absorber 9100 with like features identified by like reference characters, incremented by 4000. The vibration absorber 13100 includes a magnetic dynamic mass 13260, a repulsive magnetic system 13262, an attractive magnetic system 13270 and magnetic shielding 13298.

In the illustrated example, the attractive magnetic system 13270 is a dynamically variable system that include first and second electromagnets 13326, 13328. As explained in more detail below, the net repulsive force $F_N$ exerted on the magnetic dynamic mass 13260 is adjustable based on an electrical current supplied to the first and second electromagnets 13326, 13328 of the attractive magnetic system 13270. In alternative example, the repulsive magnetic system 13262 is the dynamically variable system and includes one or more electromagnets.

The magnetic dynamic mass 13260 includes a first dynamic magnet 13276a and a second dynamic magnet 13276b. In the illustrated example, the first and second dynamic magnets 13276a, 13276b are affixed to opposite sides of a lower central body portion 13268a of the magnetic dynamic mass 13260. The first electromagnet magnet 13326 is positioned away from the first dynamic magnet 13276a in a first direction 13280 and the second electromagnet 13328 is positioned away from the second dynamic magnet 13276b in a second direction 13282 opposite the first direction 13280. In some examples, the first and second dynamic magnets 13276a, 13276b may also be electromagnets.

The magnetic dynamic mass 13260 further includes a first dynamic magnet 13308a and a second dynamic magnet 13308b. In the illustrated example, the first and second dynamic magnets 13308a, 13308b are affixed to opposite sides of an upper central body portion 13268b of the magnetic dynamic mass 13260. In the illustrated example, the upper central body portion 13268b is connected to the lower central body portion 13268a by a linking rod 13278 that passes through an elongate slot in the magnetic shielding 13298.

The repulsive magnetic system 13262 includes a first repulsive magnet 13304 positioned away from the first dynamic magnet 13308a in the first direction 13280 and a second repulsive magnet 13306 positioned away from the second dynamic magnet 13308b in the second direction 13282. Each of the first and second repulsive magnets 13304, 13306 of the repulsive magnetic system 13262 is oriented to produce a magnetic field that repels the magnetic field produced by a respective one of the dynamic magnets 13308a, 13308b of the magnetic dynamic mass 13260.

FIGS. 28A and 28B both illustrate the magnetic dynamic mass 13260 translated away from the equilibrium position in the first direction 13280. The displacement of the magnetic dynamic mass 13260 from the equilibrium position is the same in both figures. The translation of the magnetic dynamic mass 13260 in the first direction 13280 away from the equilibrium position is i) resisted by magnetic repulsion between the first repulsive magnet 13304 of the magnetic repulsive system 13262 and the first dynamic magnet 13308a of the magnetic dynamic mass 13260 and ii) aided by magnetic attraction between the first electromagnet 13328 of the attractive magnetic system 13270 and the first dynamic magnet 13276a of the magnetic dynamic mass 13260.

The magnetic repulsion between the first repulsive magnet 13304 and the dynamic magnetic 11308a exerts a magnetic repulsive force $F_R$ on the magnetic dynamic mass 13260 in a direction opposite the first direction 13280. The magnetic repulsive force $F_R$ urges the magnetic dynamic mass 13260 toward the equilibrium position. The magnetic attraction between the first electromagnet 13328 and the dynamic magnetic element 13276a exerts a magnetic attractive force $F_A$ on the magnetic dynamic mass 13260 in the first direction 13280. Accordingly, the magnetic attractive force $F_A$ urges the translation of the magnetic dynamic mass 13260 in the first direction 13280 away from the equilibrium position.

The magnetic attractive force $F_A$ opposes the magnetic repulsive force $F_R$. No matter the displacement of the magnetic dynamic mass 13260 away from the equilibrium position, the magnetic repulsive force $F_R$ always exceeds the magnetic attractive force $F_A$. Accordingly, when the magnetic repulsive force $F_R$ and magnetic attractive force $F_A$ are summed, a net repulsive force $F_N$ resists translation of the magnetic dynamic mass 13260 away from the equilibrium position (i.e., the net repulsive force $F_N$ urges the magnetic dynamic mass 13260 toward the equilibrium position). In the illustrated example, the magnetic attractive force $F_A$ is adjustable via the dynamical variable magnetic system so that the net repulsive force $F_N$ increases generally linearly with displacement of the magnetic dynamic mass 13260 from the equilibrium position.

Comparing FIG. 28B to FIG. 28A, the magnetic field produced by each of the first and second electromagnets 13326, 13328 has strengthened (e.g., more current is supplied to each of the electromagnets). The strengthened magnetic field increases the magnetic attraction between the first electromagnet 13326 and the first dynamic magnet 13276a of the magnetic dynamic mass 13260 when the magnetic dynamic mass 13260 translates away from the equilibrium position in the first direction 13280. This increases the attractive force $F_A$ exerted on the magnetic dynamic mass 13260 in FIG. 28B relative to FIG. 28A. A similar increase in magnetic attraction between the second electromagnet 13328 and the first dynamic magnet 13276a of the magnetic dynamic mass 13260 would be experienced when the magnetic dynamic mass 13260 translates away from the equilibrium position in the second direction 13282. Conversely, weakening the magnetic fields produced by the electromagnets 13326, 13328 would decrease the magnetic attraction.

Figure 29:
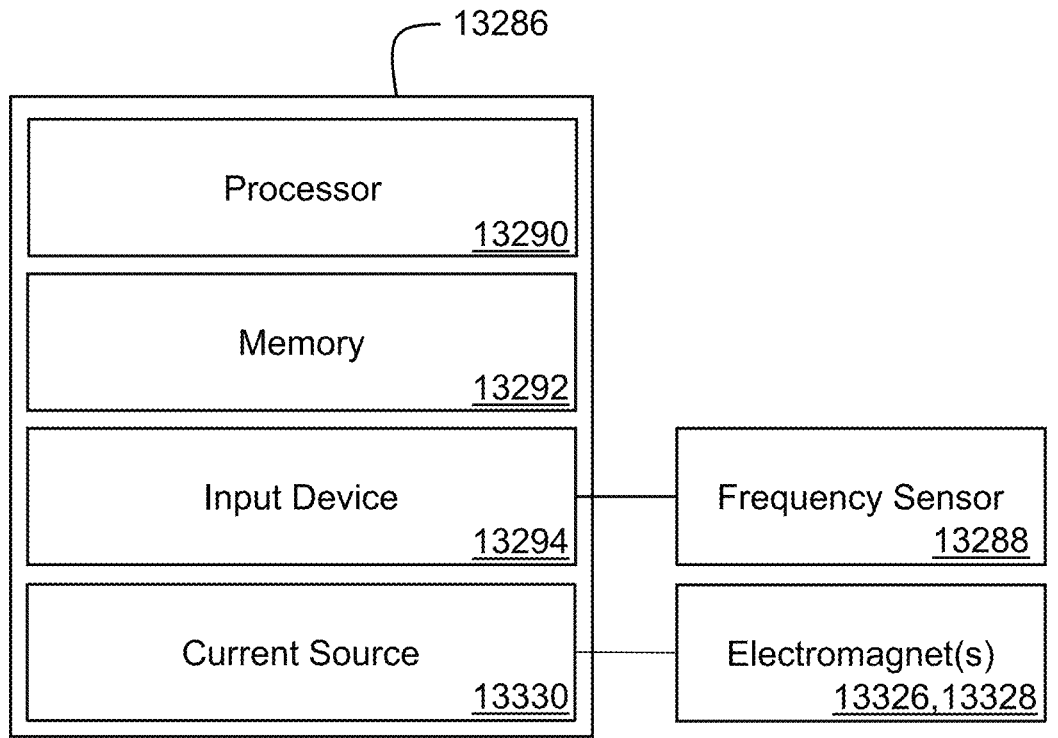
FIG. 29 is a schematic illustration of an electronic control device of the vibration absorber of FIGS. 28A-28B shown communicatively coupled to a frequency sensor and an electromagnet.

Reference is made to FIG. 29, which shows a schematic illustration of an example electronic control device 13286 of the vibration absorber 13100. The electronic control device 13286 has some similarity to the electronic control device 9286 with like features identified by like reference characters, incremented by 3000.

The schematic of FIG. 29 illustrates the connection of the electronic control device 13286 to the electromagnets 13326, 13328 and a frequency sensor 13288. The frequency sensor 13288 is positioned to measure a vibration frequency of an object to which the vibration absorber 13100 is secured.

In the example illustrated, the electronic control device 13286 includes a processor 13290, a memory 13292, an input device 13294, and a current source 13330. Each of the memory 13292, the input device 13294, and the current source 13330 are communicatively coupled to the processor 13290, directly or indirectly.

The current source 13330 supplies electrical current to the electromagnets 13326, 13328. The current source 13330 can be any element capable of supplying an electrical current to an electromagnet (e.g., battery, transistor, etc.). The current source 13330 may supply current to the electromagnets 13326, 13328 in response to signals from the processor 13290. The current source 13330 and the electromagnets 13326, 13328 may be physically connected (e.g., by hardwiring) so that the current source 13330 may power the electromagnets 13326, 13328. In an alternative example, a current source 13330 may be provided for each electromagnet (e.g., one current source for the first electromagnet 13326 and one current source for the second electromagnet 13328). In another alternative example, a current source 13330 may power several electromagnets.

Generally, the processor 13290 can execute computer readable instructions (also referred to as applications or programs). The computer readable instructions can be stored in the memory 13292 or can be received from remote storage accessible through a network, for example. When executed, the computer readable instructions can configure processor the 13290 (or multiple processors 13290, collectively) to perform the acts described herein with reference to the vibration absorber 13100, for example.

The computer-readable instructions, when executed, configure the processor 13290 to:

a) receive, from the frequency sensor 13288, a vibration frequency signal associated with the object; and b) transmit, to the current source 13330, one or more electrical signals to adjust the net magnetic repulsive force exerted on the magnetic dynamic mass 13260 based on the vibration frequency signal.

The ability to adjust the net repulsive force $F_N$ via the dynamically variable magnetic system allows the vibration absorber 13100 to be "re-tuned" in response to a change in the vibration frequency of the object to which the vibration absorber 13100 is secured. In some examples, the processor 13290 assesses the vibration frequency signal against the current being supplied to the electromagnets 13326, 13328 of the dynamically variable magnetic system in real time (e.g., at least once every second, such as 1-1,000,000 times per second) and adjusts the current supplied to each electromagnet 13326, 13328 accordingly.

Figure 30A:
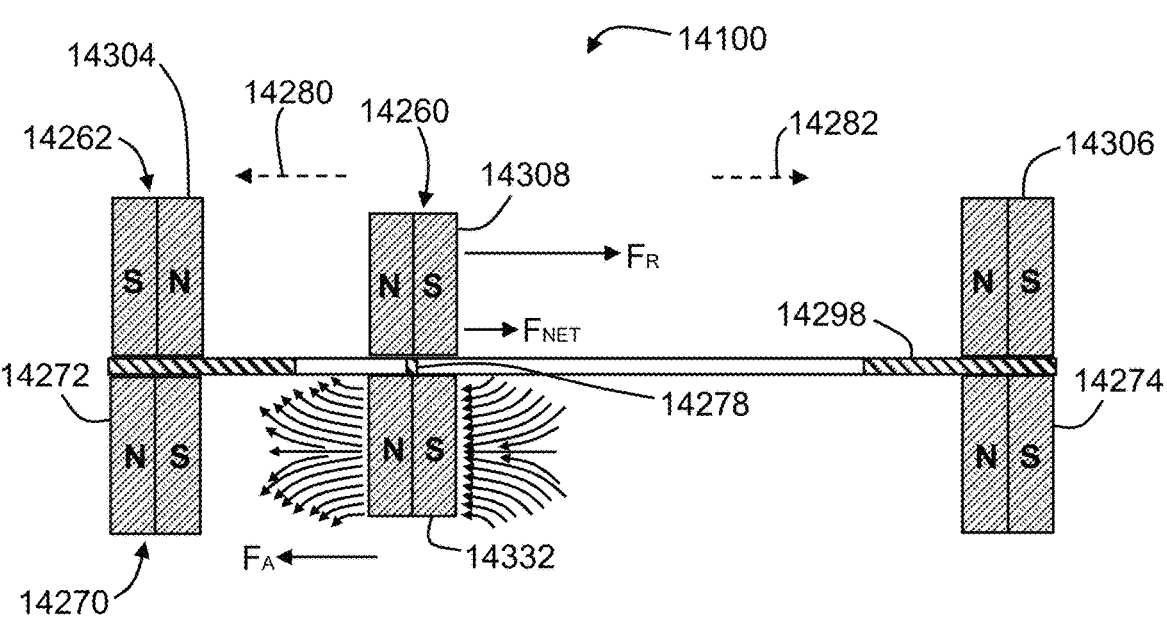
FIGS. 30A and 30B are cross-sectional views of another example dynamically tuned vibration absorber according to aspects of the teaching disclosed herein, showing the magnetic dynamic mass of the vibration absorber in different positions.
Figure 30B:
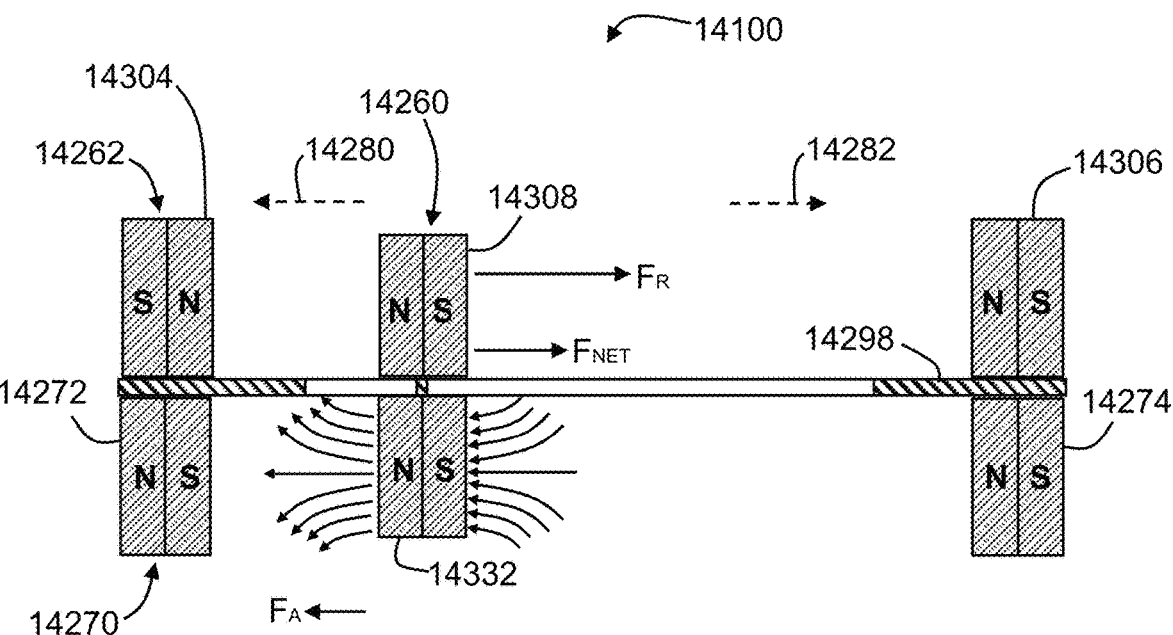

Referring to FIGS. 30A-30B, another example of a vibration absorber 14100 according to aspects of the present teaching has some similarity to the vibration absorber 13100 with like features identified by like reference characters, incremented by 1000. The vibration absorber 14100 includes a magnetic dynamic mass 14260, a repulsive magnetic system 14262, an attractive magnetic system 14270 and magnetic shielding 14298.

The magnetic dynamic mass 14260 includes an electromagnet 14332. The attractive magnetic system 14272 includes a first attractive magnet 14272 positioned away from the electromagnet 14332 in a first direction 14280 and the second attractive magnet 14274 positioned away from the second dynamic magnet 13276b in the second direction 14282. As explained in more detail below, the net repulsive force $F_N$ exerted on the magnetic dynamic mass 14260 is adjustable based on an electrical current supplied to the electromagnet 14332 of the magnetic dynamic mass 14260. In some examples, the first and second attractive magnets 14272, 14274 may also be electromagnets.

The magnetic dynamic mass 14260 further includes a dynamic magnet 14308. In the illustrated example, the dynamic magnet 14308 is connected to electromagnet 14332 by a linking rod 14278 that passes through an elongate slot in the magnetic shielding 14298.

The repulsive magnetic system 14262 includes a first repulsive magnet 14304 positioned away from the dynamic magnet 14308 in the first direction 14280 and a second repulsive magnet 14306 positioned away from the dynamic magnet 14308 in the second direction 14282. Each of the first and second repulsive magnets 14304, 14306 of the repulsive magnetic system 13262 is oriented to produce a magnetic field that repels the magnetic field produced by the dynamic magnet 14308 of the magnetic dynamic mass 14260. In some examples, the dynamic magnet 14308 is an electromagnet.

FIGS. 30A and 30B both illustrate the magnetic dynamic mass 14260 translated away from the equilibrium position in the first direction 14280. The displacement of the magnetic dynamic mass 14260 from the equilibrium position is the same in both figures. The translation of the magnetic dynamic mass 14260 in the first direction 14280 away from the equilibrium position is i) resisted by magnetic repulsion between the first repulsive magnet 14304 of the magnetic repulsive system 14262 and the dynamic magnet 14308 of the magnetic dynamic mass 14260 and ii) aided by magnetic attraction between the first attractive magnet 14272 of the attractive magnetic system 14270 and the electromagnet 14332 of the magnetic dynamic mass 13260.

The magnetic repulsion between the first repulsive magnet 14304 and the dynamic magnetic 14308 exerts a magnetic repulsive force $F_R$ on the magnetic dynamic mass 14260 in a direction opposite the first direction 14280. The magnetic attraction between the first attractive magnet 14272 and the electromagnet 14332 exerts a magnetic attractive force $F_A$ on the magnetic dynamic mass 14260 in the first direction 14280.

The magnetic attractive force $F_A$ opposes the magnetic repulsive force $F_R$. No matter the displacement of the magnetic dynamic mass 43260 away from the equilibrium position, the magnetic repulsive force $F_R$ always exceeds the magnetic attractive force $F_A$. Accordingly, when the magnetic repulsive force $F_R$ and magnetic attractive force $F_A$ are summed, a net repulsive force $F_N$ resists translation of the magnetic dynamic mass 14260 away from the equilibrium position (i.e., the net repulsive force $F_N$ urges the magnetic dynamic mass 14260 toward the equilibrium position). In the illustrated example, the magnetic attractive force $F_A$ is adjustable via the current supplied to the electromagnet 14332 so that the net repulsive force $F_N$ increases generally linearly with displacement of the magnetic dynamic mass 14260 from the equilibrium position.

Comparing FIG. 30B to FIG. 30A, the magnetic field produced by the electromagnet 14332 has weakened (e.g., less current is supplied to the electromagnet). The weakened magnetic field decreases the magnetic attraction between the electromagnet 14332 and the first attractive magnet 14272 of the attractive magnetic system 14270 when the magnetic dynamic mass 14260 translates away from the equilibrium position in the first direction 14280. This decreases the attractive force $F_A$ exerted on the magnetic dynamic mass 14260 in FIG. 30B relative to FIG. 30A. A similar decrease in magnetic attraction between the electromagnet 14332 and the second attractive magnet 14274 of the attractive magnetic system 14270 would be experienced when the magnetic dynamic mass 14260 translates away from the equilibrium position in the second direction 14282. Conversely, strengthening the magnetic fields produced by the electromagnet 14332 would increase the magnetic attraction. The ability to adjust the net repulsive force $F_N$ via the electromagnet 14332 allows the vibration absorber 14100 to be "re-tuned" in response to a change in the vibration frequency of the object to which the vibration absorber 14100 is secured.

The vibration absorbers disclosed herein can be used in a wide variety of fields for a wide variety of applications. In general, the vibration absorbers can be secured to any object for which vibration reduction is desirable. Table 1 below provides a non-exhaustive list of example applications for the vibration absorbers disclosed herein across multiple fields of technology.

TABLE 1

| Example Applications of the Vibration Absorbers disclosed herein | | |
| --- | --- | --- |
| Field | Example Application | Function of the Vibration Absorber |
| Automotive Industry | Engine mounts | Reduce engine vibrations at specific frequencies |
| | Drivetrain components | Control of torsional vibrations in shafts, transmission systems, and crankshafts |
| | Vehicle suspension systems | Absorbing specific resonance frequencies to improve ride comfort |
| | Exhaust systems | Address resonance noise in exhaust pipes |
| | Motors of Electric Vehicles | Mitigate resonance vibrations in motor housings and mounts |
| Aerospace Industry | Aircraft fuselage and wings | Reduce structural vibrations caused by aerodynamic forces |
| | Helicopter rotor systems | Control blade vibrations and reduce fatigue in rotor hubs |
| | Jet engines | Address turbine blade and casing resonances to avoid failure |
| | Satellite components | Stabilize satellite booms and appendages against launch-induced vibrations |
| Civil & Structural Engineering | Skyscrapers and buildings | Absorb wind- and earthquake-induced vibrations |
| | Bridges | Counteract pedestrian- or vehicle-induced vibrations |
| | Tall towers | Reduce swaying and oscillations (e.g., in communication and observation towers) |
| Rail & Transportation | Railway tracks and viaducts | Control track resonance from moving trains |
| | Train suspension systems | Reduce bogie and wheel-set vibrations to enhance stability and comfort |
| | Railcars | Absorb structural resonance frequencies in train carriages to reduce noise |
| Industrial Machinery | Rotating machinery | Control vibrations in pumps, turbines, fans, and compressors |
| | Machine tools | Prevent chatter and resonance frequencies in cutting tools and CNC machines |
| | Conveyor belts and rollers | Address resonance issues that cause mechanical fatigue and noise |
| Wind Energy | Wind turbine blades | Reduce wind-induced oscillations and resonance |
| | Wind turbine towers | Stabilize vibrations caused by wind loads and structural resonance |
| Marine and Offshore | Ship propeller shafts | Control torsional vibrations in marine propulsion systems |
| | Offshore oil rigs | Counteract wave- and wind-induced resonance in offshore platforms |
| | Submarine components | Address structural vibrations for stealth and operational safety |
| Robotics & Automation | Industrial robots | Reduce high-frequency vibrations during fast motion |
| | Robotic arms | Reduce oscillations during assembly and manufacturing operations |
| Power Generation | Gas and steam turbines | Control specific vibration modes to prevent fatigue and failure |
| | Generators and alternators | Address structural vibrations at operating frequencies |
| | Hydroelectric turbines | Reduce resonance in turbine blades |
| Sports & Recreation | Tennis rackets and golf clubs | Reduce specific impact frequencies, improving comfort and performance |
| | Bicycle frames | Mitigate road-induced vibrations in high-performance bicycles |
| | Skis and snowboards | Address oscillations at specific frequencies for stability |
| Electronics & Precision | Optical equipment | Stabilize vibrations in sensitive devices like telescopes and laser systems |

TABLE 1-continued

| | | |
|---|---|---|
| Example Applications of the Vibration Absorbers disclosed herein | | |
| Field | Example Application | Function of the Vibration Absorber |
| Devices | Hard drives and servers | Reduce resonance in spinning disks and structural components |
| | Medical imaging equipment | Absorb mechanical vibrations in MRI, CT, and ultrasound devices |
| Defense & Military | Weapons systems | Reduce vibrations in artillery launchers, improving accuracy |
| | Tanks and armored vehicles | Control vibration frequencies for crew safety and comfort |
| Research & Testing Facilities | Wind tunnels | Stabilize components subjected to aerodynamic resonance |
| | Vibration isolation platforms | Reduce test equipment resonance for precision measurements |
| Oil and Gas Industry | Pipelines | Address flow-induced vibrations, particularly in long-distance pipelines |
| | Drilling systems | Mitigate torsional and axial vibrations during deep drilling operations |
| Renewable Energy | Solar panel arrays | Dampen wind-induced oscillations in large installations |
| Large Appliances & HVAC Systems | Air conditioning compressors | Reduce mechanical resonance |
| | Washing machines and dryers | Control specific drum vibrations during operations (e.g., spin cycles) |

Reference is now made to FIGS. 31-36, which illustrate a vibration absorber 15100 secured to a variety of different objects that experience unwanted vibrations. The vibration absorber 15100 may be any one of the vibration absorbers 100, 1100, 2100, 3100, 4100, 5100, 6100, 7100, 8100, 9100, 10100, 11100, 12100, 13100 and 14100 described above. The vibration absorber 15100 may be permanently secured to the object and/or integrally formed with the object. In other examples, the vibration absorber 15100 is removably securable to the object.

Figure 31:
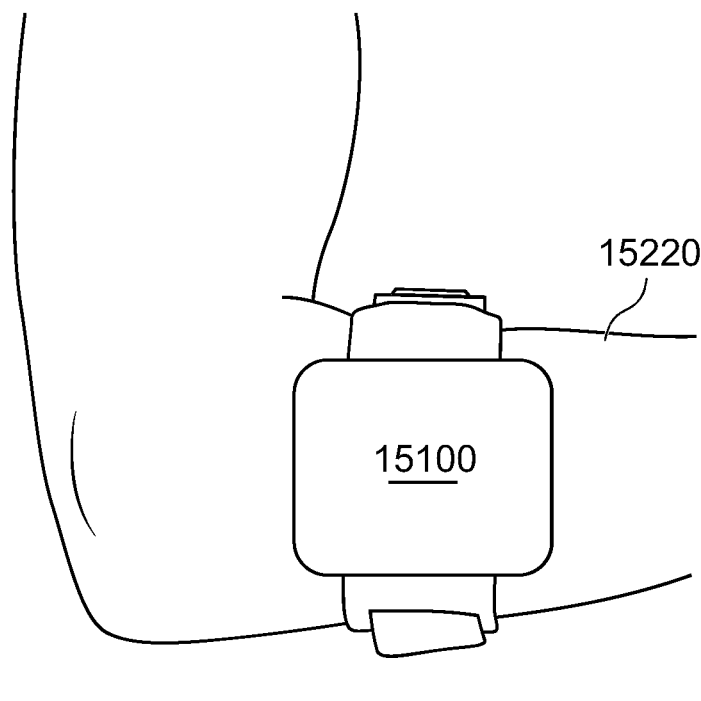
FIG. 31 shows a vibration absorber according to aspects of the teaching disclosed herein secured to a human arm.

Referring to FIG. 31, the vibration absorber 15100 is strapped to human arm 15220. In this example, the vibration absorber 15100 may help to reduce the vibration amplitude of involuntary arm tremors caused by Parkinson's disease or Essential Tremor.

Figure 32:
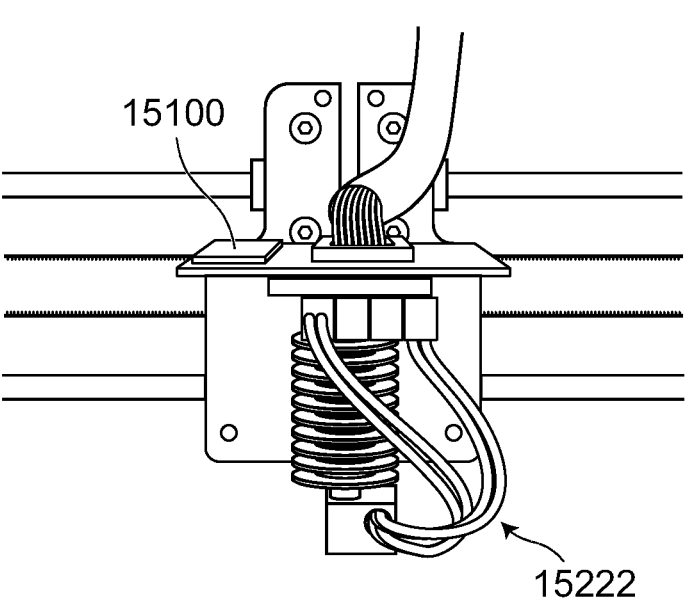
FIG. 32 shows a vibration absorber according to aspects of the teaching disclosed herein mounted to a 3D printer print head.

Referring to FIG. 32, the vibration absorber 15100 is rigidly mounted to 3D printer print head 15222. In this example, the vibration absorber 15100 may help reduce or eliminate any vibrations encountered by the print head 15222 during printing operations. This may improve the quality of the printed article.

Figure 33:
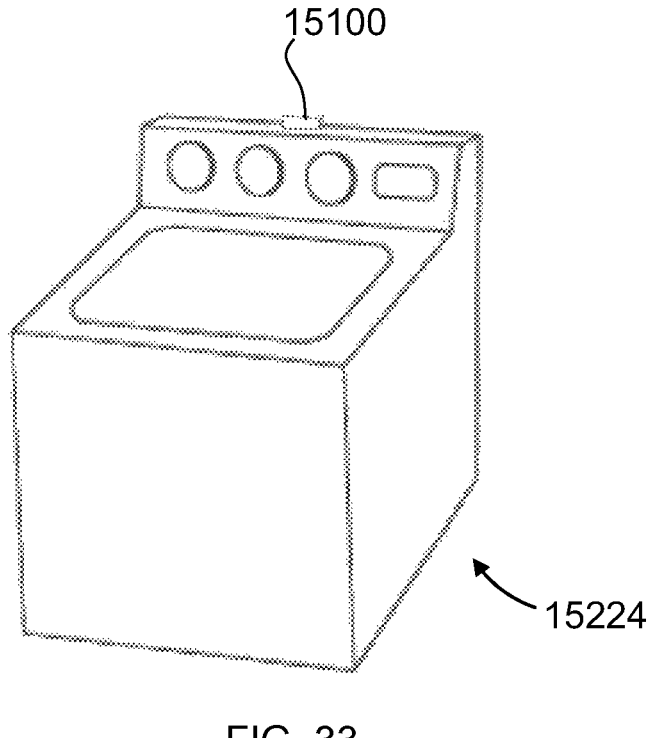
FIG. 33 shows a vibration absorber according to aspects of the teaching disclosed herein mounted to a washing machine.

Referring to FIG. 33, the vibration absorber 15100 is rigidly mounted to a washing machine 15224. Rotating drums within washing machines produce oscillations, which can generate noise and, in some cases, damage the appliance. The vibration absorber 15100 may dampen these unwanted oscillations. In other examples, the vibration absorber 15100 may be secured to other home appliances that may be negatively affected by vibrations (e.g., a record player, a DVD player, clothes dryer, etc.)

Figure 34:
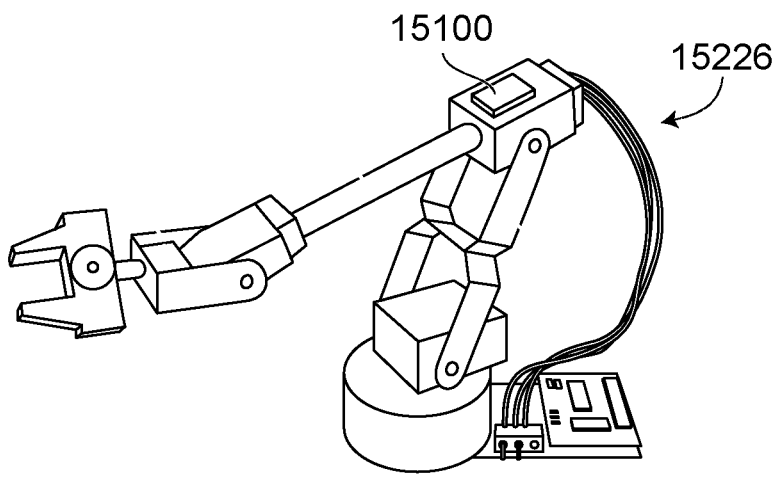
FIG. 34 shows a vibration absorber according to aspects of the teaching disclosed herein mounted to a robotic arm.

Referring to FIG. 34, the vibration absorber 15100 is secured to a robotic arm 9226. Vibrations during programmed movements of the robotic arm 15226 may reduce movement and positional accuracies. The vibration absorber 15100 may dampen or eliminate these unwanted vibrations and thereby enhance accuracy of the robotic arm 15226.

Figures 35, 36:
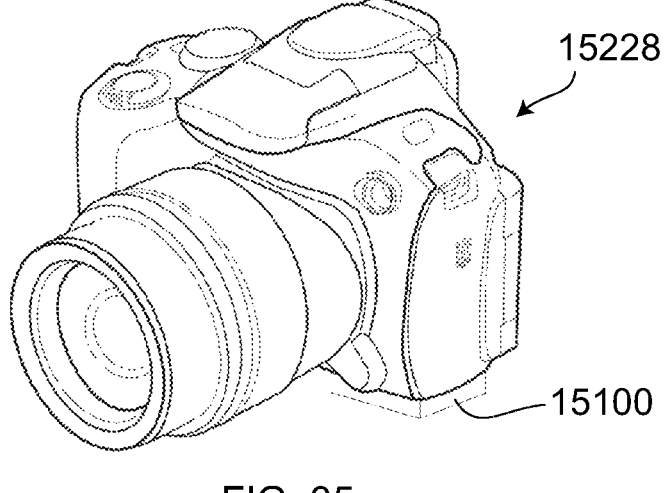
FIG. 35 shows a vibration absorber according to aspects of the teaching disclosed herein mounted to a camera.
FIG. 36 shows a vibration absorber according to aspects of the teaching disclosed herein mounted to a firearm.

Referring to FIG. 35, the vibration absorber 15100 is secured to a camera 15228. A user may impart vibrations to the camera 15228 when holding the camera 15228 (e.g., unsteady hands). Vibrating the camera 15228 when taking a photograph can lead to a blurry image. In this example, the vibration absorber 15100 may dampen or eliminate the unwanted vibrations transferred to the camera 15228 from the user. This may result in higher quality photographs. In other examples, the vibration absorber 15100 may be secured to other handheld objects.

Referring to FIG. 36, the vibration absorber 15100 is secured to a firearm 15230. Like the camera 15228, a user may impart vibrations to the firearm 15230 when holding the firearm 15230. Vibrations to the firearm 15230 when firing can cause an inaccurate shot. In this example, the vibration absorber 15100 may dampen or eliminate the unwanted vibrations transferred to the firearm 15230 from the user. This may result in more accurate shots.

What has been described above is intended to be illustrative of examples of the teaching disclosed herein, without limiting the scope of patent claims granted herefrom. The scope of such claims should be given the broadest interpretation consistent with the description as a whole.

ITEMS

Item 1: A vibration absorber comprising:
a base;
a magnetic dynamic mass translatable relative to the base, the magnetic dynamic mass having an equilibrium position relative to the base;
a first elastic element positioned to resist translation of the magnetic dynamic mass away from the equilibrium position in a first direction, the first elastic element having a first elastic element proximal end secured to the magnetic dynamic mass, and a second elastic element distal end opposite the first elastic element proximal end; and
a first static magnetic portion oriented in attraction to the magnetic dynamic mass, wherein the translation of the magnetic dynamic mass away from the equilibrium position in the first direction is aided by magnetic attraction between the first static magnetic portion and the magnetic dynamic mass.

Item 2: The vibration absorber of any other item, further comprising:
a second elastic element positioned to resist translation of the magnetic dynamic mass away from the equilibrium position in a second direction, the second elastic element having a second elastic element proximal end secured to the magnetic dynamic mass, and a second elastic element distal end opposite the second elastic element proximal end; and
a second static magnetic portion oriented in attraction to the magnetic dynamic mass, wherein the translation of the magnetic dynamic mass away from the equilibrium position in the second direction is aided by magnetic attraction between the second static magnetic portion and the magnetic dynamic mass.

Item 3: A vibration absorber comprising:
a base;
a magnetic dynamic mass translatable relative to the base, the magnetic dynamic mass having an equilibrium position relative to the base;
a first elastic element having a first elastic element proximal end secured to the magnetic dynamic mass, and a first elastic element distal end opposite the first elastic element proximal end; and a second elastic element having a second elastic element proximal end secured to the magnetic dynamic mass, and a second elastic element distal end opposite the second elastic element proximal end; and a first static magnetic portion positioned away from the first elastic element proximal end; and a second static magnetic portion positioned away from the second elastic element proximal end;

wherein translation of the magnetic dynamic mass in a first direction away from the equilibrium position is resisted by one of the first and second elastic elements and aided by magnetic attraction between the first static magnetic portion and the magnetic dynamic mass, and wherein translation of the magnetic dynamic mass in a second direction, opposite the first direction, away from the equilibrium position is resisted by the other of the first and second elastic elements and aided by magnetic attraction between the second static magnetic portion and the magnetic dynamic mass.

Item 4: The vibration absorber of any other item, wherein the first elastic element is configured to exert only one of tensile force or compressive force on the magnetic dynamic mass.

Item 5: The vibration absorber of any other item, wherein the second elastic element is configured to exert only one of tensile force or compressive force on the magnetic dynamic mass.

Item 6: The vibration absorber of any other item, wherein the first elastic element comprises a first extension spring having a first spring proximal end secured to the magnetic dynamic mass to act only in tension, and a first spring distal end opposite the first spring proximal end.

Item 7: The vibration absorber of any other item, wherein the second elastic element comprises a second extension spring having a second spring proximal end secured to the magnetic dynamic mass to act only in tension, and a second spring distal end opposite the second spring proximal end.

Item 8: The vibration absorber of any other item, wherein:

the translation of the magnetic dynamic mass in the first direction away from the equilibrium position is resisted by tension in the second extension spring and aided by the magnetic attraction between the first static magnetic portion and the magnetic dynamic mass.

Item 9: The vibration absorber of any other item, wherein:

the translation of the magnetic dynamic mass in the second direction away from the equilibrium position is resisted by tension in the first extension spring and aided by the magnetic attraction between the second static magnetic portion and the magnetic dynamic mass.

Item 10: The vibration absorber of any other item, wherein:

the tension in the first extension spring exerts a first tensile force on the magnetic dynamic mass, the tension in the second extension spring exerts a second tensile force on the magnetic dynamic mass, the magnetic attraction between the first static magnetic portion and the magnetic dynamic mass exerts a first magnetic force on the magnetic dynamic mass, the magnetic attraction between the second static magnetic portion and the magnetic dynamic mass exerts a second magnetic force on the magnetic dynamic mass, the first tensile force exceeds the second magnetic force, and the second tensile force exceeds the first magnetic force.

Item 11: The vibration absorber of any other item, wherein the first spring distal end is secured to at least one of the base or the first static magnetic portion.

Item 12: The vibration absorber of any other item, wherein the second spring distal end is secured to at least one of the base or the second static magnetic portion.

Item 13: The vibration absorber of any other item, further comprising at least one static magnet having the first and second static magnetic portion, wherein the at least one static magnet is oriented to produce a magnetic field that attracts the magnetic dynamic mass.

Item 14: The vibration absorber of any other item, further comprising a first static magnet having the first static magnetic portion, and a second static magnet having the second static magnetic portion, wherein each of the first and second static magnets is oriented to produce a magnetic field that attracts the magnetic dynamic mass.

Item 15: The vibration absorber of any other item, wherein the magnetic dynamic mass comprises a first dynamic magnetic portion directed toward the first static magnetic portion and a second dynamic magnetic portion directed toward the second static magnetic portion.

Item 16: The vibration absorber of any other item, further comprising a first dynamic magnet having the first dynamic magnetic portion, and a second dynamic magnet having the second dynamic magnetic portion, wherein the first dynamic magnet is oriented to produce a magnetic field that attracts the first static magnetic portion, and the second dynamic magnet is oriented to produce a magnetic field that attracts the second static magnetic portion.

Item 17: The vibration absorber of any other item, wherein the magnetic dynamic mass comprises at least one dynamic magnet, wherein the at least one dynamic magnet is oriented to produce a magnetic field that attracts the first and second static magnetic portions.

Item 18: The vibration absorber of any other item, wherein the at least one dynamic magnet comprises a ring magnet that surrounds at least a portion of the magnetic dynamic mass.

Item 19: The vibration absorber of any other item, wherein the magnetic dynamic mass is made at least in part from a magnetic material.

Item 20: The vibration absorber of any other item, wherein the magnetic dynamic mass comprises a spring mount secured to each of the first and second spring proximal ends.

Item 21: The vibration absorber of any other item, wherein the spring mount bears against and is translatable upon the base.

Item 22: The vibration absorber of any other item, wherein the spring mount includes a cage, and each of the first and second spring proximal ends has a head that is trapped within the cage.

Item 23: The vibration absorber of any other item, wherein the cage has a plurality of slots in communication with an interior cage cavity, each of the slots receiving a respective one of the first and second spring proximal ends and sized to prevent egress of the heads of the first and second spring proximal ends from the interior cage cavity.

Item 24: The vibration absorber of any other item, wherein the base comprises a mass support surface directed toward the magnetic dynamic mass, the magnetic dynamic mass bearing against and translatable upon the mass support surface.

Item 25: The vibration absorber of any other item, wherein the mass support surface of the base comprises polytetrafluoroethylene.

Item 26: The vibration absorber of any other item, further comprising:

a third extension spring having a third spring proximal end secured to the magnetic dynamic mass to act only in tension, and a third spring distal end opposite the third spring proximal end; and a fourth extension spring having a fourth spring proximal end secured to the magnetic dynamic mass to act only in tension, and a fourth spring distal end opposite the fourth spring proximal end.

Item 27: The vibration absorber of any other item, wherein the third spring distal end is secured to the base or the third static magnetic portion, and the fourth spring distal end is secured to the base or the fourth static magnetic portion.

Item 28: The vibration absorber of any other item, further comprising:

a third static magnetic portion positioned away from the third spring proximal end; and a fourth static magnetic portion positioned away from the fourth spring proximal end, wherein translation of the magnetic dynamic mass in a third direction away from the equilibrium position is resisted by tension in the fourth extension spring and aided by magnetic attraction with the third static magnetic portion, and wherein translation of the magnetic dynamic mass in a fourth direction, opposite the third direction, away from the equilibrium position is resisted by tension in the third extension spring and aided by magnetic attraction with the fourth static magnetic portion.

Item 29: The vibration absorber of any other item, wherein the third and fourth directions are transverse to the first and second directions.

Item 30: The vibration absorber of any other item, wherein the third and fourth directions are perpendicular to the first and second directions.

Item 31: The vibration absorber of any other item, wherein:

the tension in the third extension spring exerts a third tensile force on the magnetic dynamic mass, the tension in the fourth extension spring exerts a fourth tensile force on the magnetic dynamic mass, the magnetic attraction between the third static magnetic portion and the magnetic dynamic mass exerts a third magnetic force on the magnetic dynamic mass, the magnetic attraction between the fourth static magnetic portion and the magnetic dynamic mass exerts a fourth magnetic force on the magnetic dynamic mass, the third tensile force exceeds the fourth magnetic force, and the fourth tensile force exceeds the third magnetic force.

Item 32: The vibration absorber of any other item, wherein the first, second, third and fourth static magnetic portions are circumferentially spaced apart.

Item 33: The vibration absorber of any other item, further comprising a third static magnet having the third static magnetic portion, and a fourth static magnet having the fourth static magnetic portion, wherein each of the third and fourth static magnets is oriented to produce a magnetic field that attracts the magnetic dynamic mass.

Item 34: A vibration absorber comprising:

a magnetic static ring;

a magnetic dynamic mass positioned within the magnetic ring and translatable radially away from an equilibrium position relative to the magnetic static ring;

a plurality of elastic elements positioned to resist radial translation of the magnetic dynamic mass away from the equilibrium position;

wherein the radial translation of the magnetic dynamic mass away from the equilibrium position is aided by magnetic attraction between the magnetic static ring and the magnetic dynamic mass.

Item 35: The vibration absorber of any other item, wherein each of the elastic elements is configured to exert only one of tensile force or compressive force on the magnetic dynamic mass.

Item 36: The vibration absorber of any other item, further comprising a base upon which the magnetic dynamic mass is translatable relative to the magnetic static ring.

Item 37: The vibration absorber of any other item, wherein the base comprises a mass support surface directed toward the magnetic dynamic mass, the magnetic dynamic mass bearing against and translatable upon the mass support surface.

Item 38: The vibration absorber of any other item, wherein each of the elastic elements has a proximal end secured to the magnetic dynamic mass, a distal end opposite the proximal end, and a length between the proximal and distal ends.

Item 39: The vibration absorber of any other item, wherein the distal end of each of the elastic elements is secured to at least one of the base or the magnetic static ring.

Item 40: The vibration absorber of any other item, wherein the distal ends of the elastic elements are circumferentially spaced apart.

Item 41: The vibration absorber of any other item, wherein each of the elastic elements comprises an extension spring having a proximal end secured to the magnetic dynamic mass to act only in tension, and a distal end opposite the spring proximal end.

Item 42: The vibration absorber of any other item, wherein the distal ends of the extension springs are circumferentially spaced apart.

Item 43: The vibration absorber of any other item, wherein the distal end of each of the extension springs is secured to at least one of the base or the magnetic static ring.

Item 44: The vibration absorber of any other item, wherein the magnetic dynamic mass comprises at least one dynamic magnet, the at least one dynamic magnet being oriented to produce a magnetic field that attracts the magnetic static ring.

Item 45: The vibration absorber of any other item, wherein the at least one dynamic magnet comprises a ring magnet.

Item 46: The vibration absorber of any other item, wherein the magnetic dynamic mass is made at least in part from a magnetic material.

Item 47: The vibration absorber of any other item, wherein the magnetic dynamic mass comprises a spring mount secured to each of the spring proximal ends.

Item 48: The vibration absorber of any other item, wherein the spring mount includes a cage, and the spring proximal end of each of the extension springs has a head that is trapped within the cage.

Item 49: The vibration absorber of any other item, wherein the magnetic static ring comprises a plurality of static magnets, each of the static magnets being oriented to produce a magnetic field that attracts the magnetic dynamic mass.

Item 50: The vibration absorber of any other item, wherein the magnetic static ring comprises a ring magnet oriented to produce a magnetic field that attracts the magnetic dynamic mass.

Item 51: The vibration absorber of any other item, wherein:

the extension springs exert a collective tensile force on the magnetic dynamic mass to resist the radial translation of the magnetic dynamic mass away from the equilibrium position, the magnetic attraction between the magnetic static ring and the magnetic dynamic mass exerts a magnetic force on the magnetic dynamic mass to aid the radial translation of the magnetic dynamic mass away from the equilibrium position, and the collective tensile force exceeds the magnetic force.

Item 52: A dynamically tuned vibration absorber comprising:

a magnetic dynamic mass having an equilibrium position, wherein the magnetic dynamic mass is translatable away from the equilibrium position;

a repulsive magnetic system comprising one or more repulsive magnetic elements positioned to resist translation of the magnetic dynamic mass away from the equilibrium position by magnetic repulsion between the one or more repulsive magnetic elements and the magnetic dynamic mass; and an attractive magnetic system comprising one or more attractive magnetic elements positioned to aid the translation of the magnetic dynamic mass away from the equilibrium position by magnetic attraction between the one or more attractive magnetic elements and the magnetic dynamic mass;

wherein the magnetic repulsion and the magnetic attraction collectively exert a net magnetic repulsive force on the magnetic dynamic mass that resists the translation of the magnetic dynamic mass away from the equilibrium position;

wherein one of the repulsive magnetic system and the attractive magnetic system is a first dynamically variable magnetic system comprising:

at least one field manipulation actuator coupled to the one or more magnetic elements of the first dynamically variable magnetic system and configured to move the one or more magnetic elements of the first dynamically variable magnetic system to adjust the net magnetic repulsive force exerted on the magnetic dynamic mass.

Item 53: The vibration absorber of any other item, wherein the net magnetic repulsive force increases generally linearly with displacement of the magnetic dynamic mass from the equilibrium position.

Item 54: The vibration absorber of any other item, wherein:

the magnetic repulsion between the one or more repulsive magnetic elements and the magnetic dynamic mass exerts a magnetic repulsive force on the magnetic dynamic mass;

the magnetic attraction between the one or more attractive magnetic elements and the magnetic dynamic mass exerts a magnetic attractive force on the magnetic dynamic mass; and the magnetic repulsive force is stronger than the magnetic attractive force.

Item 55: The vibration absorber of any other item, further comprising:

a frequency sensor positioned to measure a vibration frequency of an object to which the vibration absorber is secured;

one or more processors communicatively coupled to each of the at least one field manipulation actuator and the frequency sensor;

a memory communicatively coupled to at least one of the processors, the memory storing computer-readable instructions executable by the one or more processors, wherein the computer-readable instructions when executed configure the one or more processors to collectively:

receive, from the frequency sensor, a vibration frequency signal associated with the object; and transmit, to each of the at least one field manipulation actuator, one or more commands to control movement of the one or more magnetic elements of the first dynamically variable magnetic system based on the vibration frequency signal.

Item 56: The vibration absorber of any other item, wherein the memory stores a plurality of predetermined resistance protocols and, in response to receiving the vibration frequency signal, the one or more processors are configured to:

select one of the plurality of resistance protocols that is associated with the received vibration frequency signal.

Item 57: The vibration absorber of any other item, wherein the one or more commands instruct each of the at least one field manipulation actuator to automate the selected resistance protocol.

Item 58: The vibration absorber of any other item, wherein:

the magnetic dynamic mass comprises a dynamic magnet;

the one or more repulsive magnetic elements comprise a first repulsive magnet positioned away from the dynamic magnet in a first direction and a second repulsive magnet positioned away from the dynamic magnet in a second direction opposite the first direction; and each of the first and second repulsive magnets are oriented in repulsion to the dynamic magnet.

Item 59: The vibration absorber of any other item, wherein:

the magnetic repulsion occurs between the first repulsive magnet and the dynamic magnet as the magnetic dynamic mass translates away from the equilibrium position in the first direction; and the magnetic repulsion occurs between the system repulsive magnet and the dynamic magnet as the magnetic dynamic mass translates away from the equilibrium position in the second direction.

Item 60: The vibration absorber of any other item, wherein:

the magnetic dynamic mass comprises a first dynamic magnet and a second dynamic magnet;

the one or more repulsive magnetic elements comprise a first repulsive magnet positioned away from the first dynamic magnet in a first direction and a second repulsive magnet positioned away from the second dynamic magnet in a second direction opposite the first direction;

the first repulsive magnet is oriented in repulsion to the first dynamic magnet; and the second repulsive magnet is oriented in repulsion to the second dynamic magnet.

Item 61: The vibration absorber of any other item, wherein:

the magnetic repulsion occurs between the first repulsive magnet and the first dynamic magnet as the magnetic dynamic mass translates away from the equilibrium position in the first direction; and the magnetic repulsion occurs between the second repulsive magnet and the second dynamic magnet as the magnetic dynamic mass translates away from the equilibrium position in the second direction.

Item 62: The vibration absorber of any other item, wherein:

the repulsive magnetic system is the first dynamically variable magnetic system; and the at least one field manipulation actuator is coupled to the first and second repulsive magnets and configured to move the first and second repulsive magnets to adjust the net magnetic repulsive force exerted on the magnetic dynamic mass.

Item 63: The vibration absorber of any other item, wherein:

the at least one field manipulation actuator comprises a first linear actuator coupled to the first repulsive magnet and a second linear actuator coupled to the second repulsive magnet;

the first linear actuator is operable to translate the first repulsive magnet toward and away from the magnetic dynamic mass; and the second linear actuator is operable to translate the second repulsive magnet toward and away from the magnetic dynamic mass.

Item 64: The vibration absorber of any other item, wherein:

translation of the first and second repulsive magnets toward the magnetic dynamic mass brings the magnetic fields produced by each of the first and second repulsive magnets closer to the magnetic dynamic mass when the magnetic dynamic mass is in equilibrium position; and translation of the first and second repulsive magnets away from the magnetic dynamic mass moves the magnetic fields produced by each of the first and second repulsive magnets farther from the magnetic dynamic mass when the magnetic dynamic mass is in equilibrium position.

Item 65: The vibration absorber of any other item, wherein:

the at least one field manipulation actuator comprises a first rotary actuator coupled to the first repulsive magnet and a second rotary actuator coupled to the second repulsive magnet;

the first rotary actuator is operable to rotate the first repulsive magnet relative to the magnetic dynamic mass; and the second rotary actuator is operable to rotate the second repulsive magnet relative to the magnetic dynamic mass.

Item 66: The vibration absorber of any other item, wherein rotation of the first and second repulsive magnets relative to the magnetic dynamic mass changes an angle at which the magnetic field produced by each of the first and second repulsive magnets is directed toward the magnetic dynamic mass.

Item 67: The vibration absorber of any other item, wherein:

the attractive magnetic system is the first dynamically variable magnetic system; the one or more repulsive magnetic elements comprise an outer ring magnet; and the magnetic dynamic mass comprises a dynamic inner ring magnet positioned within and oriented in repulsion to the outer ring magnet.

Item 68: The vibration absorber of any other item, wherein:

the magnetic dynamic mass comprises a dynamic magnetic element;

the one or more attractive magnetic elements comprise a first attractive magnet positioned away from the dynamic magnetic element in a first direction and an a second attractive magnet positioned away from the dynamic magnetic element in a second direction opposite the first direction; and each of the first and second attractive magnets are oriented in attraction to the dynamic magnetic element.

Item 69: The vibration absorber of any other item, wherein:

the magnetic attraction occurs between the first attractive magnet and the dynamic magnetic element as the magnetic dynamic mass translates away from the equilibrium position in the first direction; and the magnetic attraction occurs between the second attractive magnet and the dynamic magnetic element as the magnetic dynamic mass translates away from the equilibrium position in the second direction.

Item 70: The vibration absorber of any other item, wherein the dynamic magnetic element is a dynamic magnet.

Item 71: The vibration absorber of any other item, wherein:

the magnetic dynamic mass comprises a first dynamic magnetic element and a second dynamic magnetic element;

the one or more attractive magnetic elements comprise a first attractive magnet positioned away from the first dynamic magnetic element in a first direction and a second attractive magnet positioned away from the second dynamic magnetic element in a second direction opposite the first direction;

the first attractive magnet is oriented in attraction to the first dynamic magnetic element; and the second attractive magnet is oriented in attraction to the second dynamic magnetic element.

Item 72: The vibration absorber of any other item, wherein:

the magnetic attraction occurs between the first attractive magnet and the first dynamic magnetic element as the magnetic dynamic mass translates away from the equilibrium position in the first direction; and the magnetic attraction occurs between the second attractive magnet and the second dynamic magnetic element as the magnetic dynamic mass translates away from the equilibrium position in the second direction.

Item 73: The vibration absorber of any other item, wherein each of the first and second dynamic magnetic elements is a dynamic magnet.

Item 74: The vibration absorber of any other item, wherein:

the attractive magnetic system is the first dynamically variable magnetic system; and the at least one field manipulation actuator is coupled to the first and second attractive magnets and configured to move the first and second attractive magnets to adjust the net magnetic repulsive force exerted on the magnetic dynamic mass.

Item 75: The vibration absorber of any other item, wherein:

the at least one field manipulation actuator comprises a first linear actuator coupled to the first attractive magnet and a second linear actuator coupled to the second attractive magnet;

the first linear actuator is operable to translate the first attractive magnet toward and away from the magnetic dynamic mass; and the second linear actuator is operable to translate the second attractive magnet toward and away from the magnetic dynamic mass.

Item 76: The vibration absorber of any other item, wherein:

translation of the first and second attractive magnets toward the magnetic dynamic mass brings the magnetic fields produced by each of the first and second attractive magnets closer to the magnetic dynamic mass when the magnetic dynamic mass is in equilibrium position; and translation of the first and second attractive magnets away from the magnetic dynamic mass moves the magnetic fields produced by each of the first and second attractive magnets farther from the magnetic dynamic mass when the magnetic dynamic mass is in equilibrium position.

Item 77: The vibration absorber of any other item, wherein:

the at least one field manipulation actuator comprises a first rotary actuator coupled to the first attractive magnet and a second rotary actuator coupled to the second attractive magnet;

the first rotary actuator is operable to rotate the first attractive magnet relative to the magnetic dynamic mass; and the second rotary actuator is operable to rotate the second attractive magnet relative to the magnetic dynamic mass.

Item 78: The vibration absorber of any other item, wherein rotation of the first and second attractive magnets relative to the magnetic dynamic mass changes an angle at which the magnetic field produced by each of the first and second attractive magnets is directed toward the magnetic dynamic mass.

Item 79: The vibration absorber of any other item, wherein:

the magnetic dynamic mass comprises a dynamic magnet;

the one or more attractive magnetic elements comprise a first attractive magnetic element positioned away from the dynamic magnet in a first direction and a second attractive magnetic element positioned away from the dynamic magnet in a second direction opposite first direction; and the dynamic magnet is oriented in attraction to each of first and second attractive magnetic elements.

Item 80: The vibration absorber of any other item, wherein:

the magnetic attraction occurs between the first attractive magnetic element and the dynamic magnet as the magnetic dynamic mass translates away from the equilibrium position in the first direction; and the magnetic attraction occurs between the second attractive magnetic element and the dynamic magnet as the magnetic dynamic mass translates away from the equilibrium position in the second direction.

Item 81: The vibration absorber of any other item, wherein:

the magnetic dynamic mass comprises a first dynamic magnet and a second dynamic magnet;

the one or more attractive magnetic elements comprise a first attractive magnetic element positioned away from the first dynamic magnet in a first direction and a second attractive magnetic element positioned away from the second dynamic magnet in a second direction opposite the first direction;

the first dynamic magnet is oriented in attraction to the first attractive magnetic element; and the second dynamic element is oriented in attraction to the second attractive magnetic element.

Item 82: The vibration absorber of any other item, wherein:

the magnetic attraction occurs between the first attractive magnetic element and the first dynamic magnet as the magnetic dynamic mass translates away from the equilibrium position in the first direction; and the magnetic attraction occurs between the second attractive magnetic element and the second dynamic magnet as the magnetic dynamic mass translates away from the equilibrium position in the second direction.

Item 83: The vibration absorber of any other item, wherein:

the repulsive magnetic system is the first dynamically variable magnetic system;

the one or more attractive magnetic elements comprise an attractive outer magnetic ring; and the magnetic dynamic mass comprises a dynamic inner magnetic ring positioned within the attractive outer magnetic ring.

Item 84: The vibration absorber of any other item, wherein at least one of the inner and outer magnetic rings is a ring magnet.

Item 85: The vibration absorber of any other item, further comprising magnetic shielding positioned to limit unwanted magnetic interactions between the repulsive and attractive magnetic systems.

Item 86: The vibration absorber of any other item, wherein the magnetic dynamic mass is coupled to and translatable along a linear track that guides the translation of the magnetic mass away from the equilibrium position.

Item 87: The vibration absorber of any other item, further comprising:

a second dynamically variable magnetic system comprising one or more repulsive magnets positioned to resist translation of the magnetic dynamic mass away from the equilibrium position by magnetic repulsion between the one or more repulsive magnets and the magnetic dynamic mass, wherein the net magnetic repulsive force exerted on the magnetic dynamic mass includes the magnetic repulsion between the one or more repulsive magnets and the magnetic dynamic mass; and at least one further field manipulation actuator coupled to the one or more dynamic magnets and configured to move the one or more repulsive magnets to adjust the net magnetic repulsive force exerted on the magnetic dynamic mass.

Item 88: The vibration absorber of any other item, wherein:

the magnetic dynamic mass comprises a dynamic magnet;

the one or more repulsive magnets comprise a first repulsive magnet positioned away from the dynamic magnet in a first direction and a second repulsive magnet positioned away from the dynamic magnet in a second direction opposite first direction; and each of the first and second repulsive magnets are oriented in repulsion to the dynamic magnet.

Item 89: The vibration absorber of any other item, wherein the at least one further field manipulation actuator is coupled to the first and second repulsive magnets and configured to move the first and second repulsive magnets to adjust the net magnetic repulsive force exerted on the magnetic dynamic mass.

Item 90: A dynamically tuned vibration absorber comprising:

a magnetic dynamic mass having an equilibrium position, wherein the magnetic dynamic mass is translatable away from the equilibrium position;

a repulsive magnetic system comprising one or more repulsive magnetic elements positioned to resist translation of the magnetic dynamic mass away from the equilibrium position by magnetic repulsion between the one or more repulsive magnetic elements and the magnetic dynamic mass; and an attractive magnetic system comprising one or more attractive magnetic elements positioned to aid the translation of the magnetic dynamic mass away from the equilibrium position by magnetic attraction between the one or more attractive magnetic elements and the magnetic dynamic mass;

wherein the magnetic repulsion and the magnetic attraction collectively exert a net magnetic repulsive force on the magnetic dynamic mass that resists the translation of the magnetic dynamic mass away from the equilibrium position;

wherein one of the repulsive magnetic system and the attractive magnetic system is a dynamically variable magnetic system; and each of the one or more magnetic elements of the dynamically variable magnetic system is an electromagnet, and the net magnetic repulsive force exerted on the magnetic dynamic mass is adjustable based on an electrical current supplied to the one or more electromagnets of the dynamically variable magnetic system Item 90: The vibration absorber of any other item, wherein the net magnetic repulsive force increases generally linearly with displacement of the magnetic dynamic mass from the equilibrium position.

Item 91: The vibration absorber of any other item, further comprising a current source electrically coupled to the one or more electromagnets of the dynamically variable magnetic system, wherein the current source is configured to supply the one or more electromagnets of the dynamically variable magnetic system with the electrical current.

Item 93: The vibration absorber of any other item, further comprising:

a frequency sensor positioned to measure a vibration frequency of an object to which the vibration absorber is secured;

one or more processors communicatively coupled to the current source and the frequency sensor;

a memory communicatively coupled to at least one of the processors, the memory storing computer-readable instructions executable by the one or more processors, wherein the computer-readable instructions when executed configure the one or more processors to collectively:

receive, from the frequency sensor, a vibration frequency signal associated with the object; and transmit, to the current source, one or more electrical signals to adjust the net magnetic repulsive force exerted on the magnetic dynamic mass based on the vibration frequency signal.

Item 94: The vibration absorber of any other item, wherein:

the repulsive magnetic system is the dynamically variable magnetic system and comprises the one or more electromagnets;

the one or more electrical signals transmitted to the current source instruct the current source to increase the electrical current supplied to the one or more electromagnets of the dynamically variable magnetic system to increase the net magnetic repulsive force exerted on the magnetic dynamic mass; and the one or more electrical signals transmitted to the current source instruct the current source to decrease the electrical current supplied to the one or more electromagnets of the dynamically variable magnetic system to decrease the net magnetic repulsive force exerted on the magnetic dynamic mass.

Item 95: The vibration absorber of any other item, wherein:

the attractive magnetic system is the dynamically variable magnetic system and comprises the one or more electromagnets;

the one or more electrical signals transmitted to the current source instruct the current source to increase the electrical current supplied to the one or more electromagnets of the dynamically variable magnetic system to decrease the net magnetic repulsive force exerted on the magnetic dynamic mass; and the one or more electrical signals transmitted to the current source instruct the current source to decrease the electrical current supplied to the one or more electromagnets of the dynamically variable magnetic system to increase the net magnetic repulsive force exerted on the magnetic dynamic mass.

Item 96: A dynamically tuned vibration absorber comprising:

a magnetic dynamic mass having an equilibrium position, wherein the magnetic dynamic mass is translatable away from the equilibrium position and comprises one or more electromagnets;

a repulsive magnetic system comprising one or more repulsive magnets positioned to resist translation of the magnetic dynamic mass away from the equilibrium position by magnetic repulsion between the one or more repulsive magnets and the one or more electromagnets of the magnetic dynamic mass; and an attractive magnetic system comprising one or more attractive magnetic elements positioned to aid the translation of the magnetic dynamic mass away from the equilibrium position by magnetic attraction between the one or more attractive magnetic elements and the magnetic dynamic mass;

wherein the magnetic repulsion and the magnetic attraction collectively exert a net magnetic repulsive force on the magnetic dynamic mass that resists the translation of the magnetic dynamic mass away from the equilibrium position; and wherein the net magnetic repulsive force exerted on the magnetic dynamic mass is adjustable based on an electrical current supplied to the one or more electromagnets of the magnetic dynamic mass.

Item 97: The vibration absorber of any other item, wherein the magnetic dynamic mass comprises one or more dynamic magnetic elements, and the magnetic attraction occurs between the one or more attractive magnetic elements and the one or more dynamic magnetic elements of the magnetic dynamic mass.

Item 98: The vibration absorber of any other item, wherein each of the one or more repulsive magnets is an electromagnet.

Item 99: A dynamically tuned vibration absorber comprising:

a magnetic dynamic mass having an equilibrium position, wherein the magnetic dynamic mass is translatable away from the equilibrium position and comprises one or more electromagnets;

a repulsive magnetic system comprising one or more repulsive magnets positioned to resist translation of the magnetic dynamic mass away from the equilibrium position by magnetic repulsion between the one or more repulsive magnets and the magnetic dynamic mass; and an attractive magnetic system comprising one or more attractive magnetic elements positioned to aid the translation of the magnetic dynamic mass away from the equilibrium position by magnetic attraction between the one or more attractive magnetic elements and the one or more electromagnets of the magnetic dynamic mass;

wherein the magnetic repulsion and the magnetic attraction collectively exert a net magnetic repulsive force on the magnetic dynamic mass that resists the translation of the magnetic dynamic mass away from the equilibrium position; and wherein the net magnetic repulsive force exerted on the magnetic dynamic mass is adjustable based on an electrical current supplied to the one or more electromagnets of the magnetic dynamic mass.

Item 100: The vibration absorber of any other item, wherein the magnetic dynamic mass comprises one or more dynamic magnets, and the magnetic repulsion occurs between the one or more repulsive magnets and the one or more dynamic magnets of the magnetic dynamic mass.

Item 101: The vibration absorber of any other item, wherein each of the one or more attractive magnetic elements is an electromagnet.

Item 102: A tremor dampener securable to a human limb, wherein the tremor dampener comprises the vibration absorber of any other item.

Item 103: A household appliance comprising the vibration absorber of any other item.

Item 104: A firearm comprising the vibration absorber of any other item.

Item 105: A robotic arm comprising the vibration absorber of any other item.

Item 106: A vehicle comprising the vibration absorber of any other item.

Item 107: A printer comprising the vibration absorber of any other item.

Item 108: Use of the vibration absorber of any other item to dampen tremors of individuals with Parkinson's disease or Essential Tremor.

The invention claimed is:

1. A dynamically tuned vibration absorber comprising:

a magnetic dynamic mass having an equilibrium position, wherein the magnetic dynamic mass is translatable away from the equilibrium position;

a repulsive magnetic system comprising one or more repulsive magnetic elements positioned to resist translation of the magnetic dynamic mass away from the equilibrium position by magnetic repulsion between the one or more repulsive magnetic elements and the magnetic dynamic mass; and an attractive magnetic system comprising one or more attractive magnetic elements positioned to aid the translation of the magnetic dynamic mass away from the equilibrium position by magnetic attraction between the one or more attractive magnetic elements and the magnetic dynamic mass;

wherein the magnetic repulsion and the magnetic attraction collectively exert a net magnetic repulsive force on the magnetic dynamic mass that resists the translation of the magnetic dynamic mass away from the equilibrium position;

wherein one of the repulsive magnetic system and the attractive magnetic system is a first dynamically variable magnetic system comprising:

at least one field manipulation actuator coupled to the one or more magnetic elements of the first dynamically variable magnetic system and configured to move the one or more magnetic elements of the first dynamically variable magnetic system to adjust the net magnetic repulsive force exerted on the magnetic dynamic mass;

wherein the vibration absorber further comprises:

a frequency sensor positioned to measure a vibration frequency of an object to which the vibration absorber is secured;

one or more processors communicatively coupled to each of the at least one field manipulation actuator and the frequency sensor; and a memory communicatively coupled to at least one of the processors, the memory storing computer-readable instructions executable by the one or more processors, wherein the computer-readable instructions when executed configure the one or more processors to collectively:

receive, from the frequency sensor, a vibration frequency signal associated with the object; and transmit, to each of the at least one field manipulation actuator, one or more commands to control movement of the one or more magnetic elements of the first dynamically variable magnetic system based on the vibration frequency signal.

2. The vibration absorber of claim 1, wherein the net magnetic repulsive force increases generally linearly with displacement of the magnetic dynamic mass from the equilibrium position.

3. The vibration absorber of claim 1, wherein the memory stores a plurality of predetermined resistance protocols and, in response to receiving the vibration frequency signal, the one or more processors are configured to:

select one of the plurality of resistance protocols that is associated with the received vibration frequency signal.

4. The vibration absorber of claim 3, wherein the one or more commands instruct each of the at least one field manipulation actuator to automate the selected resistance protocol.

5. The vibration absorber of claim 1, wherein:

the one or more repulsive magnetic elements comprise an outer ring magnet; and the magnetic dynamic mass comprises a dynamic inner ring magnet positioned within and oriented in repulsion to the outer ring magnet.

6. The vibration absorber of claim 1, wherein:

the magnetic dynamic mass comprises a dynamic magnetic element;

the one or more attractive magnetic elements comprise a first attractive magnet positioned away from the dynamic magnetic element in a first direction and a second attractive magnet positioned away from the dynamic magnetic element in a second direction opposite the first direction; and each of the first and second attractive magnets are oriented in attraction to the dynamic magnetic element.

7. The vibration absorber of claim 6, wherein:

the magnetic attraction occurs between the first attractive magnet and the dynamic magnetic element as the magnetic dynamic mass translates away from the equilibrium position in the first direction; and the magnetic attraction occurs between the second attractive magnet and the dynamic magnetic element as the magnetic dynamic mass translates away from the equilibrium position in the second direction.

8. The vibration absorber of claim 6, wherein the dynamic magnetic element is a dynamic magnet.

9. The vibration absorber of claim 6, wherein:

the attractive magnetic system is the first dynamically variable magnetic system; and the at least one field manipulation actuator is coupled to the first and second attractive magnets and configured to move the first and second attractive magnets to adjust the net magnetic repulsive force exerted on the magnetic dynamic mass.

10. The vibration absorber of claim 1, wherein the magnetic dynamic mass is coupled to and translatable along a linear track that guides the translation of the magnetic mass away from the equilibrium position.

11. A dynamically vibration absorber comprising:

a magnetic dynamic mass having an equilibrium position, wherein the magnetic dynamic mass is translatable away from the equilibrium position;

a repulsive magnetic system comprising one or more repulsive magnetic elements positioned to resist translation of the magnetic dynamic mass away from the equilibrium position by magnetic repulsion between the one or more repulsive magnetic elements and the magnetic dynamic mass; and an attractive magnetic system comprising one or more attractive magnetic elements positioned to aid the translation of the magnetic dynamic mass away from the equilibrium position by magnetic attraction between the one or more attractive magnetic elements and the magnetic dynamic mass, wherein the magnetic repulsion and the magnetic attraction collectively exert a net magnetic repulsive force on the magnetic dynamic mass that resists the translation of the magnetic dynamic mass away from the equilibrium position;

wherein one of the repulsive magnetic system and the attractive magnetic system is a first dynamically variable magnetic system comprising:

at least one field manipulation actuator coupled to the one or more magnetic elements of the first dynamically variable magnetic system and configured to move the one or more magnetic elements of the first dynamically variable magnetic system to adjust the net magnetic repulsive force exerted on the magnetic dynamic mass;

wherein the magnetic dynamic mass comprises a dynamic magnetic element;

wherein the one or more attractive magnetic elements comprise a first attractive magnet positioned away from the dynamic magnetic element in a first direction and a second attractive magnet positioned away from the dynamic magnetic element in a second direction opposite the first direction;

wherein each of the first and second attractive magnets are oriented in attraction to the dynamic magnetic element;

wherein the attractive magnetic system is the first dynamically variable magnetic system; and wherein the at least one field manipulation actuator is coupled to the first and second attractive magnets and configured to move the first and second attractive magnets to adjust the net magnetic repulsive force exerted on the magnetic dynamic mass.

12. The vibration absorber of claim 11, wherein:

the at least one field manipulation actuator comprises a first linear actuator coupled to the first attractive magnet and a second linear actuator coupled to the second attractive magnet;

the first linear actuator is operable to translate the first attractive magnet toward and away from the magnetic dynamic mass; and the second linear actuator is operable to translate the second attractive magnet toward and away from the magnetic dynamic mass.

13. The vibration absorber of claim 12, wherein:

translation of the first and second attractive magnets toward the magnetic dynamic mass brings the magnetic fields produced by each of the first and second attractive magnets closer to the magnetic dynamic mass when the magnetic dynamic mass is in equilibrium position; and translation of the first and second attractive magnets away from the magnetic dynamic mass moves the magnetic fields produced by each of the first and second attractive magnets farther from the magnetic dynamic mass when the magnetic dynamic mass is in equilibrium position.

14. The vibration absorber of claim 11, wherein:

the at least one field manipulation actuator comprises a first rotary actuator coupled to the first attractive magnet and a second rotary actuator coupled to the second attractive magnet;

the first rotary actuator is operable to rotate the first attractive magnet relative to the magnetic dynamic mass; and the second rotary actuator is operable to rotate the second attractive magnet relative to the magnetic dynamic mass.

15. The vibration absorber of claim 14, wherein rotation of the first and second attractive magnets relative to the magnetic dynamic mass changes an angle at which the magnetic field produced by each of the first and second attractive magnets is directed toward the magnetic dynamic mass.

16. The vibration absorber of claim 11, further comprising:

a frequency sensor positioned to measure a vibration frequency of an object to which the vibration absorber is secured;

one or more processors communicatively coupled to the current source and the frequency sensor; and a memory communicatively coupled to at least one of the processors, the memory storing computer-readable instructions executable by the one or more processors, wherein the computer-readable instructions when executed configure the one or more processors to collectively:

receive, from the frequency sensor, a vibration frequency signal associated with the object; and transmit, to the current source, one or more electrical signals to adjust the net magnetic repulsive force exerted on the magnetic dynamic mass based on the vibration frequency signal.

17. The vibration absorber of claim 16, wherein the memory stores a plurality of predetermined resistance protocols and, in response to receiving the vibration frequency signal, the one or more processors are configured to:

select one of the plurality of resistance protocols that is associated with the received vibration frequency signal.

18. A dynamically tuned vibration absorber comprising:

a magnetic dynamic mass having an equilibrium position, wherein the magnetic dynamic mass is translatable away from the equilibrium position;

a repulsive magnetic system comprising one or more repulsive magnetic elements positioned to resist translation of the magnetic dynamic mass away from the equilibrium position by magnetic repulsion between the one or more repulsive magnetic elements and the magnetic dynamic mass; and an attractive magnetic system comprising one or more attractive magnetic elements positioned to aid the translation of the magnetic dynamic mass away from the equilibrium position by magnetic attraction between the one or more attractive magnetic elements and the magnetic dynamic mass;

wherein the magnetic repulsion and the magnetic attraction collectively exert a net magnetic repulsive force on the magnetic dynamic mass that resists the translation of the magnetic dynamic mass away from the equilibrium position;

wherein one of the repulsive magnetic system and the attractive magnetic system is a dynamically variable magnetic system, and each of the one or more magnetic elements of the dynamically variable magnetic system is an electromagnet, and the net magnetic repulsive force exerted on the magnetic dynamic mass is adjustable based on an electrical current supplied to the one or more electromagnets of the dynamically variable magnetic system;

wherein the vibration absorber, further comprises:

a current source electrically coupled to the one or more electromagnets of the dynamically variable magnetic system and configured to supply the one or more electromagnets of the dynamically variable magnetic system with the electrical current;

a frequency sensor positioned to measure a vibration frequency of an object to which the vibration absorber is secured;

one or more processors communicatively coupled to the current source and the frequency sensor;

a memory communicatively coupled to at least one of the processors, the memory storing computer-readable instructions executable by the one or more processors, wherein the computer-readable instructions when executed configure the one or more processors to collectively;

receive, from the frequency sensor, a vibration frequency signal associated with the object; and transmit, to the current source, one or more electrical signals to adjust the net magnetic repulsive force exerted on the magnetic dynamic mass based on the vibration frequency signal.

19. The vibration absorber of claim 18, wherein the net magnetic repulsive force increases generally linearly with displacement of the magnetic dynamic mass from the equilibrium position.

20. The vibration absorber of claim 18, wherein:

the attractive magnetic system is the dynamically variable magnetic system and comprises the one or more electromagnets;

the one or more electrical signals transmitted to the current source instruct the current source to increase the electrical current supplied to the one or more electromagnets of the dynamically variable magnetic system to decrease the net magnetic repulsive force exerted on the magnetic dynamic mass; and the one or more electrical signals transmitted to the current source instruct the current source to decrease the electrical current supplied to the one or more electromagnets of the dynamically variable magnetic system to increase the net magnetic repulsive force exerted on the magnetic dynamic mass.

* * * * *